US012212908B2

(12) United States Patent
Zhang et al.

(10) Patent No.: US 12,212,908 B2
(45) Date of Patent: Jan. 28, 2025

(54) ACOUSTIC OUTPUT DEVICES

(71) Applicant: SHENZHEN SHOKZ CO., LTD., Guangdong (CN)

(72) Inventors: Lei Zhang, Shenzhen (CN); Zhen Wang, Shenzhen (CN); Liwei Wang, Shenzhen (CN); Peigeng Tong, Shenzhen (CN); Fengyun Liao, Shenzhen (CN); Xin Qi, Shenzhen (CN); Xianwei Shi, Shenzhen (CN); Shuailin Xie, Shenzhen (CN); Yunbin Chen, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 169 days.

(21) Appl. No.: 17/814,586

(22) Filed: Jul. 25, 2022

(65) Prior Publication Data

US 2022/0360873 A1 Nov. 10, 2022

Related U.S. Application Data

(63) Continuation of application No. PCT/CN2021/096377, filed on May 27, 2021.

(30) Foreign Application Priority Data

Apr. 9, 2021 (CN) ......................... 202110383452.2
Apr. 9, 2021 (CN) ........................ 202120727654.X

(51) Int. Cl.
*H04R 1/02* (2006.01)
*H04R 1/10* (2006.01)

(52) U.S. Cl.
CPC ........... *H04R 1/026* (2013.01); *H04R 1/1008* (2013.01); *H04R 1/1041* (2013.01); *H04R 1/105* (2013.01);

(Continued)

(58) Field of Classification Search
CPC .... H04R 1/026; H04R 1/1008; H04R 1/1041; H04R 1/105; H04R 1/1066; H04R 2420/07; H04R 2460/13
See application file for complete search history.

(56) References Cited

U.S. PATENT DOCUMENTS 8,255,013 B1 * 8/2012 Babella ............. H04M 1/72442
455/575.1
10,602,256 B1 * 3/2020 Leng ......................... H04R 5/02

(Continued)

FOREIGN PATENT DOCUMENTS

CN 2456390 Y 10/2001
CN 205336486 U 6/2016

(Continued)

OTHER PUBLICATIONS

International Search Report in PCT/CN2021/096377 mailed on Sep. 10, 2021, 10 pages.

(Continued)

*Primary Examiner* — Andrew Sniezek
(74) *Attorney, Agent, or Firm* — Metis IP LLC

(57) ABSTRACT

The present disclosure discloses an acoustic output device. The acoustic output device may include a speaker assembly, configured to convert audio signals into vibration signals; a functional assembly electrically connected to the speaker assembly; and a supporting structure, configured to be connected to the speaker assembly and the functional assembly, wherein the supporting structure includes a metal body therein, and the metal body may be electrically connected to the functional assembly.

17 Claims, 33 Drawing Sheets

(52) U.S. Cl.
CPC ....... *H04R 1/1066* (2013.01); *H04R 2420/07* (2013.01); *H04R 2460/13* (2013.01)

(56) References Cited

U.S. PATENT DOCUMENTS

| | | | | |
|---|---|---|---|---|
| 12,009,576 | B2 * | 6/2024 | Varma .................... | H01Q 21/28 |
| 2006/0193487 | A1 | 8/2006 | Mok et al. | |
| 2011/0135134 | A1 | 6/2011 | Essabar et al. | |
| 2014/0328508 | A1 | 11/2014 | Jacks et al. | |
| 2014/0334658 | A1 | 11/2014 | Wang et al. | |
| 2017/0353781 | A1 | 12/2017 | Choi et al. | |
| 2017/0359645 | A1 | 12/2017 | Chen et al. | |
| 2019/0373350 | A1 | 12/2019 | Yuen et al. | |
| 2019/0373353 | A1 | 12/2019 | Yuen et al. | |
| 2020/0045397 | A1 | 2/2020 | Wu et al. | |
| 2021/0076123 | A1 | 3/2021 | Zhang et al. | |
| 2022/0360873 | A1 | 11/2022 | Zhang et al. | |

FOREIGN PATENT DOCUMENTS

| | | | |
|---|---|---|---|
| CN | 106454607 | A | 2/2017 |
| CN | 106856579 | A | 6/2017 |
| CN | 106937222 | A | 7/2017 |
| CN | 107425281 | A | 12/2017 |
| CN | 107454492 | A | 12/2017 |
| CN | 111145670 | A | 5/2020 |
| CN | 111182426 | A | 5/2020 |
| CN | 111954142 | A | 11/2020 |
| CN | 214708013 | U | 11/2021 |
| JP | 2002112376 | A | 4/2002 |
| JP | 2011055177 | A | 3/2011 |

OTHER PUBLICATIONS

Written Opinion in PCT/CN2021/096377 mailed on Sep. 10, 2021, 8 pages.

Notice of Rejection in Japanese Application No. 2023-540620 mailed on Sep. 2, 2024, 11 pages.

* cited by examiner a b

ACOUSTIC OUTPUT DEVICES

CROSS-REFERENCE TO RELATED APPLICATIONS

This application is a Continuation of International Application No. PCT/CN2021/096377 filed on May 27, 2021, which claims priority to Chinese Patent Application No. 202110383452.2, filed on Apr. 9, 2021, and Chinese Patent Application No. 202120727654.X, filled on Apr. 9, 2021, the contents of which are hereby incorporated by reference.

TECHNICAL FIELD

The present disclosure generally relates to field of acoustic output technology, and in particular, to acoustic output devices.

BACKGROUND

With the development of acoustic output technology, acoustic output devices have been widely used. An acoustic output device is a portable audio output device realizing sound conduction within a specific range. With the popularity of acoustic output devices in people's daily life (e.g., socialization, entertainment, work, etc.), there is an increasing demand for the quality of the acoustic output devices. Taking earphones (e.g., open design headphones, in-ear headphones, over-ear headphones, etc.) as examples of the acoustic output devices, existing earphones are complicated because of the large number of assemblies in the speaker assemblies or functional assemblies, which may affect the wearing comfort. Therefore, it is desired to provide compact earphones with comfortable wearing. In addition, apart from excellent structural reliability, exterior quality, and wearing comfort, other qualities such as bass dive, treble penetration, and good battery life should further be met to fully ensure that users have good experiences in hearing and wearing when using the headphones.

SUMMARY

The embodiments of the present disclosure provide an acoustic output device. The acoustic output device may include a speaker assembly, configured to convert audio signals into vibration signals; a functional assembly electrically connected to the speaker assembly; and a supporting structure, configured to be connected to the speaker assembly and the functional assembly. The supporting structure may include a metal body therein, and the metal body is electrically connected to the functional assembly.

In some embodiments, the metal body may be an antenna of the acoustics output device.

In some embodiments, the supporting structure may include an ear hook assembly and a rear hook assembly. The ear hook assembly may be connected between the speaker assembly and the functional assembly. The rear hook assembly may be connected between two sets of functional assemblies.

In some embodiments, the a metal body is positioned within the rear hook assembly, and at least one end of the metal body may be electrically connected to the functional assembly.

In some embodiments, the functional assembly may include two sets of functional assemblies, and two ends of the metal body may be respectively electrically connected to the two sets of functional assemblies.

In some embodiments, the metal body may include a first sub-antenna and a second sub-antenna, the first sub-antenna and the second sub-antenna may be respectively electrically connected to a set of functional assembly of the two sets of functional assemblies, and the first sub-antenna and the second sub-antenna may be spaced apart.

In some embodiments, both a length of the first sub-antenna and a length of the second sub-antenna may be greater than or equal to a first length threshold.

In some embodiments, a metal body is positioned within the rear hook assembly, and one end of the metal body may be electrically connected to the functional assembly.

In some embodiments, a length of the metal body may be greater than or equal to a second length threshold.

In some embodiments, the supporting structure may be connected between the speaker assembly and the functional assembly to form the ear hook assembly of the acoustic output device, and the ear hook assembly may be configured to straddle and be supported on an ear of a user when the user is wearing the acoustic output device.

In some embodiments, an end of the metal body may be covered with a welding metal layer, and the metal body may be welded on a main control circuit board of the functional assembly through the welding metal layer.

In some embodiments, the welding metal layer may be a zinc plating layer.

In some embodiments, the supporting assembly may include a rear hook assembly, the rear hook assembly includes a metal body and metal connectors, and the metal connectors may be respectively sleeved and fixed on two ends of the metal body.

In some embodiments, a deformation of a first part of the metal body located inside a metal connector relative to a second part of the metal body located outside the metal connector may be less than or equal to a first deformation threshold.

In some embodiments, the deformation may be determined based on a first cross-sectional dimension $\varphi 1$ and a second cross-sectional dimension $\varphi 2$, wherein the first cross-sectional dimension $\varphi 1$ may be a dimension of a cross-section of the first part along a direction that passes a geometric center of the cross-section of the first part, and the second cross-sectional dimension $\varphi 2$ may be a dimension of a cross-section of the second part along the same direction that passes a geometric center of the cross-section of the second part.

In some embodiments, an outer surface of the first part may include a knurled structure.

In some embodiments, a ratio between a depth of the knurled structure and the first cross-sectional dimension $\varphi 1$ of the first part may be less than or equal to a first ratio threshold.

In some embodiments, the metal connector may include an installation hole, the metal body may be inserted into the installation hole, and the metal body may be connected to the metal connector by welding.

In some embodiments, an end of the metal body may be further exposed from an outer end face of the metal connector, a welding point of the metal body and the metal connector may be formed between an exposed part of the metal body and the outer end face of the metal connector.

In some embodiments, the metal connector may be connected to the metal body by die casting.

In some embodiments, the rear hook assembly may further include an elastic covering body, the elastic covering body may be configured to cover the metal body and further form a cavity covering part, at least part of the cavity covering part may be configured to cover an accommodating cavity, and the accommodating may be configured to accommodate a battery or the main control circuit board.

In some embodiments, the rear hook assembly may further include a wire, a length of the wire may be greater than a length of the metal body, and the wire extends from an end of the metal body to the other end of the metal body; the elastic covering body covers the wire by injection molding and includes a threading channel, the metal body passes through the threading channel, and a size of the threading channel may be configured to allow the metal body to move in the threading channel; or, the elastic covering body includes a threading channel, the metal body and the wire pass through the threading channel, and the size of the threading channel may be configured to allow the metal body and the wire to move in the threading channel.

In some embodiments, the cavity covering part may include a first covering part close to the metal connector and a second covering part departing from the metal connector, the first cover part and the second cover part may be respectively bonded to and fixed with the accommodating cavity, and a bonding strength between the second covering part and the accommodating cavity may be greater than that between the first covering part and the accommodating cavity.

In some embodiments, the second covering part may be internally injection-molded with a transition piece, and a bonding strength between the transition piece and the accommodating cavity may be greater than that between the second covering part and the accommodating cavity.

In some embodiments, the accommodating cavity may be made of plastic, and the transition piece may be made of metal or plastic.

In some embodiments, the first covering part may be fixedly connected to the accommodating cavity through a first colloid, the second covering part may be fixedly connected to the accommodating cavity through a second colloid, and a curing speed of the second colloid may be greater than a curing speed of the first colloid.

In some embodiments, the accommodating cavity may include a main cavity body and a cover plate, the main cavity body may be configured to form an accommodating space with an open end that opens at one end, and the cover plate may be configured at the open end of the main cavity body, the first covering part may be configured in a sleeve shape and may be sleeved on a periphery of the main cavity body and the cover plate, and the second covering part may be configured in strips and covers the cover plate.

In some embodiments, the open end of the main cavity body may be configured with an outer surface, an inner surface, and a transitional surface connecting the outer surface and the inner surface, the cover plate and at least part of an area of the transitional surface may be spaced apart, thereby forming a colloid space between the cover plate and the transitional surface, and the colloid space may be configured to accommodate the first colloid or the second colloid.

In some embodiments, the cover plate may include a main cover body and a collar flange connected to the main cover body, the main cover body may be configured on the outer surface and contacts the outer surface, the collar flange extends into the main cavity body, and the colloid space may be formed between a lower surface of the transitional surface and the main cover body and an outer surface of the collar flange.

In some embodiments, the transitional surface may be a flat surface, and may be connected to the outer surface and the inner surface at an obtuse angle, respectively, and an obtuse angle between the transitional surface and the inner surface may be less than that between the transitional surface and the inner surface.

In some embodiments, the main control circuit board may be in the accommodating cavity, at least one switch assembly may be configured on the main control circuit board, a switch assembly of the at least one switch assembly includes a first fixed part, a second fixed part and a switch body, the first fixed part may be attached to a main surface of the main control circuit board, the second fixed part may be bent and connected to the first fixed part, the second fixed part may be attached to a side surface of the main control circuit board, and the switch body may be configured on a side of the second fixed part that departs from the main control circuit board.

In some embodiments, the main cover body may be configured with at least one key hole, the ear hook assembly further includes a key assembly fixed on a side of the main cover body that departs from the collar flange, the key assembly may be configured to receive a pressure imposed by the user and triggers the switch assembly through a key hole of the at least one key hole, and a pressing direction of key assembly to the switch assembly may be parallel with the main surface of the main control circuit board.

In some embodiments, a count of the at least one switch assembly may be two, a count of the at least one key hole may be two, and a count of at least one soft key may be two, the at least one switch assembly, the at least one key hole, and the at least one soft key may be set in a manner of one-to-one correspondence, a middle convex part of each soft key of the at least one soft key may be provided with a blind hole, the edge connection of each soft key may be located between the main cover body and the covering part, the second covering part may be provided with avoidance holes corresponding to the key holes, the middle convex part of each soft key may be exposed through an avoidance hole of the avoidance holes, a hard key may include an integrated pressing part and insert columns, the pressing part may be located on a side of the second covering part that departs from the main cover body, a count of the insert columns may be two, and each of the insert columns may be inlaid in the blind hole.

BRIEF DESCRIPTION OF THE DRAWINGS

The present disclosure is further describable in terms of exemplary embodiments. These exemplary embodiments are describable in detail with reference to the drawings. These embodiments are non-limiting exemplary embodiments, in which like reference numerals represent similar structures throughout the several views of the drawings, and wherein.

DETAILED DESCRIPTION

Figure 1:
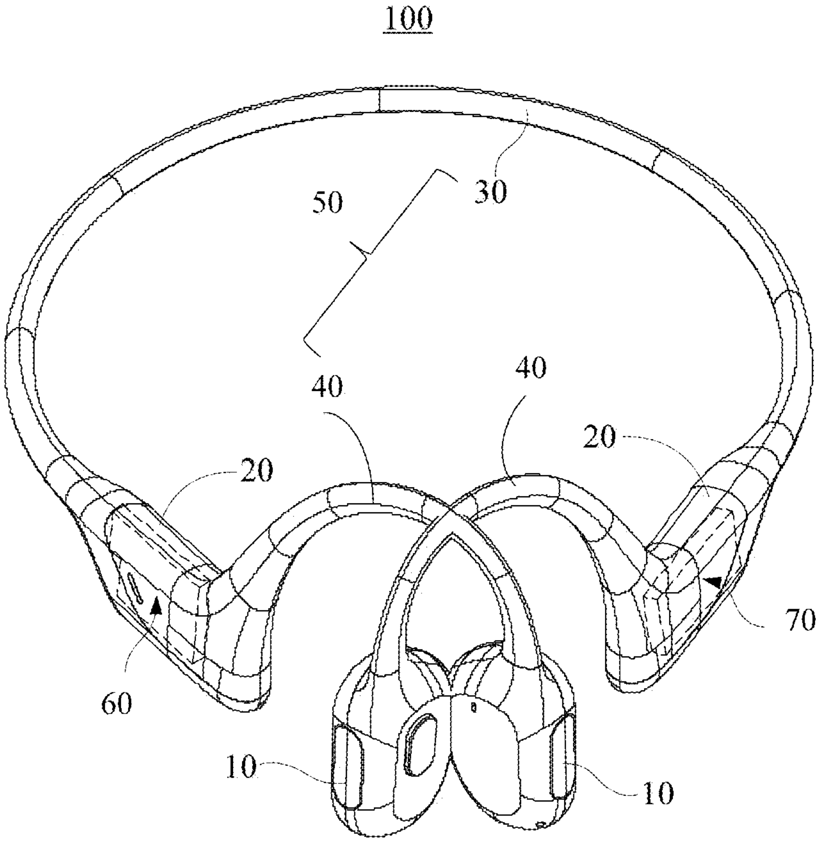
FIG. 1 is a schematic diagram illustrating a structure of an exemplary acoustic output device according to some embodiments of the present disclosure.

The technical solution of the present disclosure embodiment is more clearly described below, and the accompanying drawings need to be used in the description of the embodiments will be briefly described below. It will be apparent that the drawings in the following description are merely some examples or embodiments of the present disclosure, and those of ordinary skill in the art will apply the disclosure to other similar scenes according to the drawings without the premise of creative labor. Unless obviously obtained from the context or the context illustrates otherwise, the same numeral in the drawings refers to the same structure or operation.

It will be understood that the term "system," "engine," "unit," "module," and/or "block" used herein are one method to distinguish different assemblies, elements, parts, sections or assemblies of different levels in ascending order. However, the terms may be displaced by other expressions if they achieve the same purpose.

As used herein, the singular forms "a," "an," and "the" may be intended to include the plural forms as well, unless the context clearly indicates otherwise. It will be further understood that the terms "comprise," and/or "include," when used in the present disclosure, specify the presence of stated features, operations, and elements, but do not preclude the presence or addition of one or more other operations and elements in the method or device.

With the development of acoustic output technology, an acoustic output device, which is a portable audio output device realizing sound conduction within a specific range, has been widely used. For example, the acoustic output device has been an indispensable tool for work, socializing, and entertainment. In some embodiments, the acoustic output device may include a bone conduction earphone and an air conduction earphone based on different sound transmission manners of the sound acoustic output device. In some embodiments, the acoustic output device may include an open design headphone, an in-ear headphone, and an over-ear headphone based on different wearing modes or wearing locations. In some embodiments, a user may wear the acoustic output device via a fixed structure (e.g., an ear hook, a rear hook assembly, etc.), or on other parts of the user's body (e.g., the neck, a shoulder, etc.). In some embodiments, the acoustic output device may combine with other wearable devices (such as a smart helmet, glasses, etc.) to be worn on the head or other parts of the user. In some embodiments, when the acoustic output device is the bone conduction earphone, the acoustic output device may approach but not block the user's ears, so that the user may clearly hear the sound output by the acoustic output device and ensure a good perception of outside sound information at the same time. The bone conduction earphone may transform audios into mechanical vibrations of different frequencies, use human bones as media that transmit the mechanical vibrations, and then transmit sound waves to hearing nerves. In this way, the user may perceive sounds without going through the ear's external auditory canal and tympanic membrane.

In practice, to ensure that users have a good experience (e.g., hearing experience, wearing experience, etc.) when using acoustic output devices, requirements for structural reliability, wearing comfort, appearance, sound quality, and battery life, etc., are constantly increasing.

In some application scenarios, an antenna is usually needed for an acoustic output device (e.g., a wireless earphone) to send and receive signals. In some embodiments, the antenna of the acoustic output device may be configured in a speaker assembly or a functional assembly of the acoustic output device. However, as the speaker assembly needs to transform audio signals into vibration signals to transmit sounds to the user, the functional assembly needs to be electrically connected to the speaker assembly to perform the functions of controlling the sounds of the speaker assembly or a power supply to the speaker assembly, thus the speaker assembly and functional assembly have complicated assemblies and complex structures. Configuring an antenna in the speaker assembly or the functional assembly may increase the designing difficulty of the speaker assembly or the functional assembly, and may increase a size of the corresponding assembly. As a result, the aesthetic and wearing comfort of the device may be affected.

In addition, the acoustic output device may further require a supporting structure to facilitate the users wear. Specifically, the supporting structure may include an ear hook assembly and/or a rear hook assembly. The ear hook assembly may be used to connect the speaker assembly and the functional assembly, and to support the user's ears when the user is wearing the acoustic output device. The rear hook assembly may be used to connect the two sets of functional assemblies and support the user's head when the user is wearing the acoustic output device. In some embodiments, the ear hook assembly and/or the rear hook assembly may be configured with elastic assemblies to provide elastic force, and increase the rigidity and strength of the ear hook assembly and/or the rear hook assembly. In some embodiments, to facilitate the connection between the ear hook assembly and the speaker assembly and/or the connection between the functional assembly and rear hook assembly, connectors may be configured on both ends of the elastic assembly to be plugged and matched with the corresponding speaker assembly and the functional assembly. In some embodiments, the connectors may be plastic. When the plastic connectors are configured on the two ends of the elastic assembly, preprocessing, such as flattening of both ends of the elastic part may be required, which may lead to an embrittlement of the elastic part due to deformation. As a result, the reliability of the ear hook assembly and the rear hook assembly may decrease. In addition, considering the structural strength of the plastic connector, it may not be a good choice.

Embodiments of the present disclosure described an acoustic output device that may include a supporting structure configured to connect to the speaker assembly and the functional assembly. The supporting structure has a metal body therein. The metal body may be electrically connected to the functional assembly. Further, the rear hook assembly in the supporting structure may include the above metal body, a metal connector, and an elastic covering body. The elastic covering body may be configured to cover the metal body and further form a cavity covering part. The cavity covering part may cover an accommodating cavity in the functional assembly. The cavity covering part may be configured to accommodate a battery or a main control circuit board. The cavity covering part may include a first covering part close to the metal connector and a second covering part that departing from the metal connector. The first cover part and the second cover part may be respectively bonded to and fixed with the accommodating cavity. A bonding strength between the second covering part and the accommodating cavity may be greater than that between the first covering part and the accommodating cavity. In this way, the metal body may be configured in the supporting structure as an antenna to avoid configuring the antenna in the speaker assembly or the functional assembly, so that the speaker assembly or the functional assembly may be simplified, the metal body may be the elastic assembly to provide elasticity for the supporting structure (e.g., a rear hook assembly) and increase the rigidity and strength of the supporting structure. The metal connector may be small-sized or even avoid the preprocessing such as flattening of both ends of the elastic part, thereby avoiding the embrittlement of the elastic part due to deformation and increasing the reliability of the supporting structure. In addition, the metal connector may have excellent structural strength. The elastic covering body may be used as an outer layer of the functional assembly and the supporting structure (rear hook assembly, ear hook assembly) to touch the user's skin, which may improve the wearing comfort of the acoustic output device. Due to a difference between a bonding strength between the first covering part and the accommodating cavity and a bonding strength between the second covering part and the accommodating cavity, a relative location of the cavity covering part and the accommodating part may be adjusted when bonding the cavity covering part and the accommodating part to eliminate assembly errors between the cavity covering part and the accommodating part and improving an appearance of the acoustic output device.

These exemplary embodiments are describable in detail with reference to the drawings to describe the acoustic output device.

Figure 2:
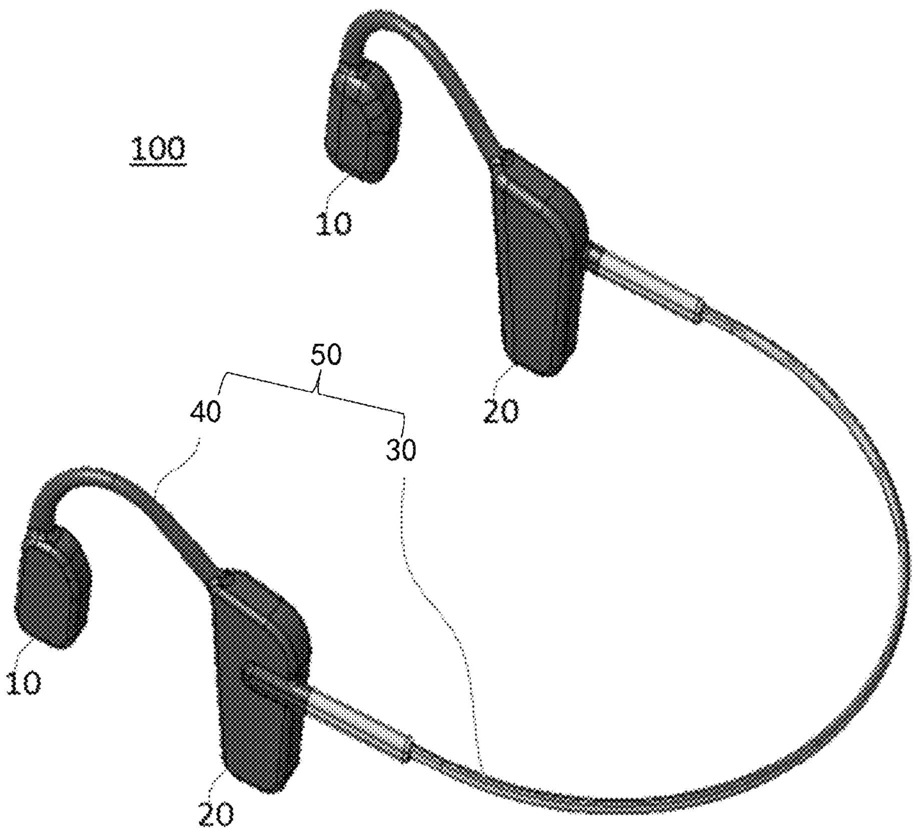
FIG. 2 is a schematic diagram illustrating a structure of an exemplary acoustic output device according to some embodiments of the present disclosure.

FIG. 1 is a schematic diagram illustrating a structure of an exemplary acoustic output device according to some embodiments of the present disclosure. FIG. 2 is a schematic diagram illustrating a structure of an exemplary acoustic output device according to some embodiments of the present disclosure.

In some embodiments, an acoustic output device 100 may be a headphone. When a user wears the acoustic output device 100, a weight of the acoustic output device 100 is mainly borne by the user's head. For example, the weight may be borne by the user's ears or the skull.

Referring to FIG. 1 and FIG. 2, the acoustic output device 100 may include speaker assemblies 10, functional assemblies 20, and a supporting structure 50. In some embodiments, the supporting structure 50 may include a rear hook assembly 30 and/or ear hook assemblies 40. The rear hook assembly 30 may be configured to connect between two functional assemblies 20, and an ear hook assembly 40 of the ear hook assemblies 40 may be configured to connect between a speaker assembly 10 and a corresponding functional assembly 20.

In some embodiments, the speaker assemblies 10 may be connected to the ear hook assemblies 40, and the speaker assemblies 10 may also be flexibly connected to the ear hook assemblies 40. In some embodiments, the ear hook assemblies 40 and the speaker assemblies 10 may be fixedly connected by gluing, snap-fitting, riveting, or integral injection molding, etc. In some embodiments, the ear hook assemblies 40 and the speaker assemblies 10 may further be flexibly connected through hinges or universal joints.

In some embodiments, referring back to FIG. 1 and FIG. 2, the acoustic output device 100 may include two speaker assemblies 10, two functional assemblies 20, and a supporting structure 50. The supporting structure 50 may include a rear hook assembly 30 and two ear hook assemblies 40, and the two ends of the rear hook assembly 30 may be respectively connected to one end of a corresponding functional assembly 20. The end of each functional assembly 20 departing from the rear hook assembly 30 may be electrically connected to a corresponding speaker assembly 10 through an ear hook assembly 40.

In some embodiments, the rear hook assembly 30 may be two ends of the rear hook assembly 30 may be respectively connected between the two functional assemblies 20 or between the two ear hook assemblies 40. The rear hook assembly 30 may be used to provide elasticity so that the two speaker assemblies 10 and/or two functional assemblies 20 may be clamped on both sides of the head of the user.

In some embodiments, the ear hook assemblies 40 may further be configured to be curved to hang between the ears and the head of the user, so that the wearing requirements of the acoustic output device 100 may be satisfied. The speaker assembly 10 may be used to convert audio signals into mechanical vibrations so that the user may hear sound through the acoustic output device 100. In some embodiments, the audio signals may be electrical signals.

Through the above configurations, when the user wears the acoustic output device 100, the two speaker assemblies 10 may be respectively located on the left and right sides of the user's head. The two speaker assemblies 10 may further press the user's head under the cooperative action of the two ear hook assemblies 40 and the rear hook assembly 30, so that the user may hear the sound output by the acoustic device 100.

In some embodiments, the functional assembly 20 and the corresponding ear-hook assembly 40 may be designed as an integration. For example, a shell of the functional assembly 20 and a shell of the corresponding ear hook assembly 40 in FIG. 1 may be manufactured in an integrative molding way. In some embodiments, the functional assembly 20 and the ear-hook assembly 40 may be separately designed. For example, the shell of the functional assembly 20 and the shell of the ear-hook assembly 40 may be manufactured first, and the shells of the functional assembly 20 and the ear-hook assembly 40 may be assembled by snapping, gluing, etc. It should be noted that as the functional assembly 20 and the ear-hook assembly 40 are designed as an integration, in the present disclosure, the functional assembly 20 and the ear hook assembly 40 may be described as a same assembly. For example, in some embodiments, the functional assembly 20 may be a part of the ear hook assembly 40 or the ear hook assembly 40 may be a part of the functional assembly 20.

In some embodiments, the supporting structure 50 may only include at least one ear hook assembly 40, and may not include the rear hook assembly 30. The two ear hook assemblies 40 may be hooked on the two ears of the user, respectively. The wearing requirements of the acoustic output device 100 (e.g., the acoustic output devices shown in FIG. 3) may be achieved as well.

Figure 3:
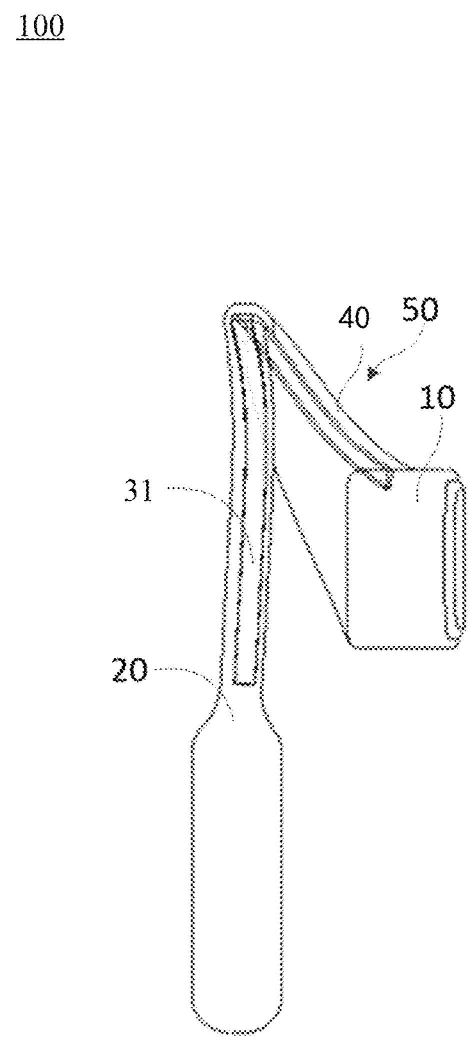
FIG. 3 is a schematic diagram illustrating a structure of an exemplary an acoustic output device with a supporting structure only including an ear hook according to some embodiments of the present disclosure.

FIG. 3 is a schematic diagram illustrating a structure of an exemplary acoustic output device with a supporting structure only including an ear hook according to some embodiments of the present disclosure. As shown in FIG. 3, the supporting structure 50 may be connected between a speaker assembly 10 and a functional assembly 20 to form an ear hook assembly 40 of the acoustic output device 100. When a user wears the acoustic output device 100, the ear hook assembly 40 may be configured to straddle and be supported on an ear of the user. Thus, the supporting structure 50 may only include the ear hook assembly 40, and may not include a rear hook assembly 30.

In some embodiments, as shown in FIG. 3, the acoustic output device 100 may include a speaker assembly 10, a functional assembly 20, and an ear hook assembly 40. The ear hook assembly 40 connects the speaker assembly 10 and the functional assembly 20, so that when the acoustic output device 100 is in a non-worn state (i.e., a natural state), the acoustic output device 100 may be bent in a three-dimensional (3D) space.

In other words, in the 3D space, the speaker assembly 10, the functional assembly 20 and the ear hook assembly 40 may not be on the same surface. In such a configuration, when the user wears the acoustic output device 100, the functional assembly 20 may be configured to be hooked between a backside of the ears and the head of the user. The speaker assembly 10 may touch the front side of the user's ears. The ear hook assembly 40 may be extended from the head to the outside of the head, and further work with the functional assembly 20 to provide the speaker assembly 10 with a pressing force on a front side of the ear, so that a user may wear the acoustic output device 100 on the ears.

In some embodiments, when the speaker assembly 10 and the functional assembly 20 of the acoustic output device 100 are integrally designed as one assembly, the acoustic output device 100 may not include the ear hook assembly 40, and may only include the rear hook assembly 30. The acoustic output device 100 may be configured around the user's head through the rear hook assembly 30, which may integrate the speaker assembly 10 and the functional assembly 20 and wrap the user's ears. Alternatively, the acoustic output device 100 may not include the rear hook assembly 30, and the ear hook assembly 40. The acoustic output device 100 may integrate the speaker assembly 10 and the functional assembly 20, and the user may directly put the acoustic output device 100 in the user's ear canal.

In some embodiments, a user may wear the acoustic output device 100 in other ways. For example, ear hook assembly 40 may cover or wrap the user's ears, and the rear hook assembly 30 may straddle the top of the user's head, etc.

Referring back to FIG. 1 and FIG. 2, the acoustic output device 100 may further include a main control circuit board 60 and a battery 70. The main control circuit board 60 and a battery 70 may be within an accommodating cavity (e.g., an accommodating cavity 21) of a same functional assembly 20. Alternatively, an accommodating cavity of each functional assembly 20 may include a main control circuit board 60 and a battery 70. Furthermore, the main control circuit board 60 and the battery 70 may be electrically connected to the two speaker assemblies 10 through the corresponding wires. The main control circuit board 60 may be configured to control the speaker assembly 10 to transform audio signals into mechanical vibrations. The battery 70 may be configured to provide electric energy for the acoustic output device 100. In some embodiments, the acoustic output device 100 may further include a sound conduction device, such as a microphone, a pickup, a communication assembly (e.g., a Bluetooth and an NFC (near-field communication), etc.), a sensor (e.g., an optical sensor, a vibration sensor, etc.). The sound conduction devices may further be connected to the main control circuit board 60 and the battery 70 to achieve the corresponding functions.

It should be noted that two speaker assemblies 10 are configured in the acoustic output device 100 described in the present disclosure, and two speaker assemblies 10 may convert the audio signals into mechanical signals (e.g., vibrations of an earphone core of the headphone) to facilitate acoustic output device 100 to achieve stereo sound. In some embodiments, in some other application scenarios where the requirement for stereo sound is not that high, such as hearing aids for patients, host live teleprompter, etc., the acoustic output device 100 may only include one speaker assembly 10.

Based on the above-mentioned descriptions, the speaker assembly 10 may be configured to convert audio signals into mechanical vibrations in a powered state, so that the user may hear the sound through the acoustic output device 100. In some embodiments, the speaker assembly 10 may apply bone conduction sound transmission. That is, the mechanical vibrations may directly act on the user's listening nerves through the user's bones and tissues as mediums. In some embodiments, the speaker assembly may apply air conduction. That is, the mechanical vibrations may act on a drum membrane of the user through the air as a medium, and then act on the listening nerves. For the sound heard by the user, the sound output by the speaker assembly 10 based on the bone conduction may be referred to as "bone conduction sound", and the sound output based on the air conduction may be referred to as "air conduction sound". In some embodiments, the speaker assembly 10 may transmit sounds via bone conduction. For example, the speaker assemblies in the bone conduction earphone may generate bone conduction sound. In some embodiments, the speaker assembly 10 may further transmit sounds via air conduction. For example, the speaker assemblies in the air conduction earphone may generate air conduction sound. In some embodiments, the speaker assembly 10 may further transmit sounds via bone conduction and air conduction at the same time. For example, the speaker assembly in the bone-air combination earphone may generate bone conduction sound and air conduction sound at the same time.

Figure 4:
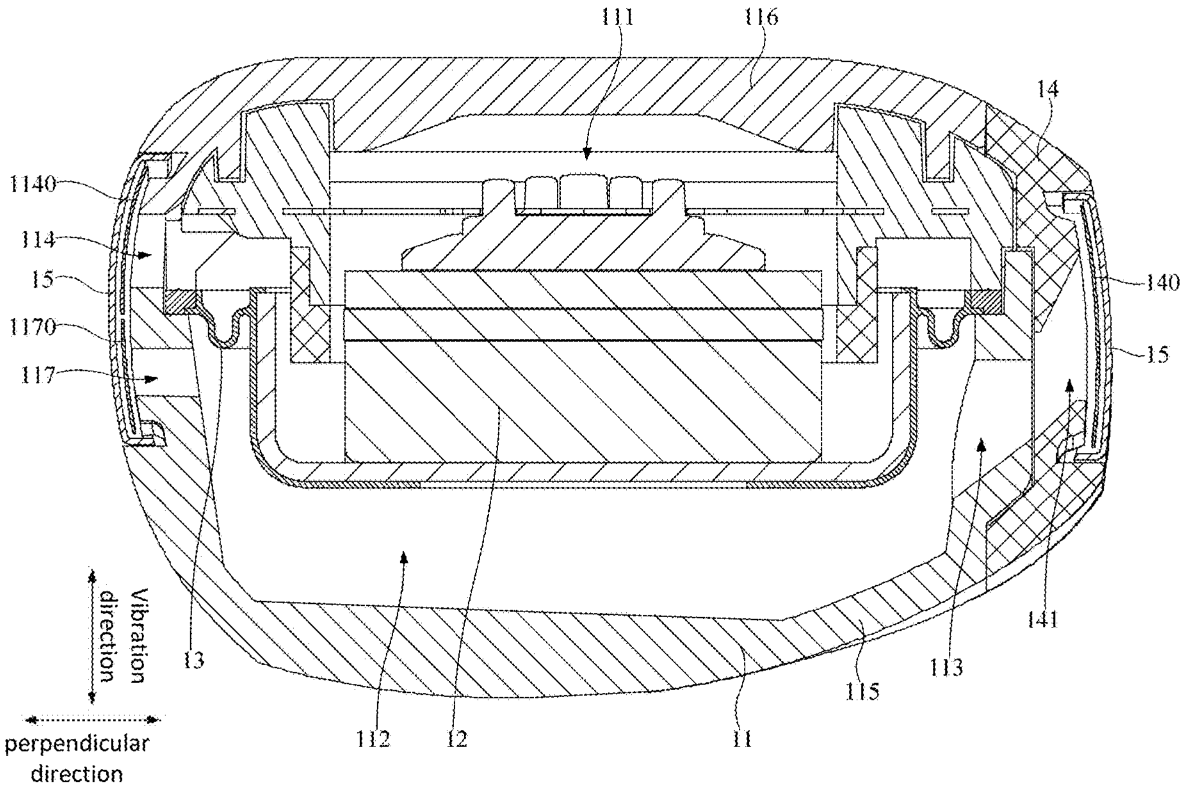
FIG. 4 is a schematic diagram illustrating an exemplary cross-section of a speaker assembly according to some embodiments of the present disclosure.

In some embodiments, the speaker assembly 10 may include a core housing and an earphone core. The core housing may be connected to one end of the ear hook assembly 40, and may be configured to accommodate the earphone core. The core housing of the speaker assembly 10 may include a first core housing part and a second core housing part. The first core housing part and the core housing part may be connected by snap connection or by means of fasteners or glue, and form a space to accommodate the earphone core. In some embodiments, core housing may be a core housing 11 shown in FIG. 4, and the earphone core may at least include a transducer 12 shown in FIG. 4. For example, the earphone core may include the transducer 12 and a diaphragm 13 as shown in FIG. 4. In some embodiments, the first core housing part and the second core housing part may be a front shell and a rear shell (e.g., a front shell 116 and a rear shell 115 in FIG. 4). The space formed to accommodate the earphone core by the first core housing part and the second core housing part may be an accommodating cavity.

In some embodiments, the ear hook assembly 40 may include a first ear hook part and a second ear hook part. The first ear hook part and the second ear hook part may be connected by snap connection or gluing, etc. The first ear hook part may be configured with a wiring slot to accommodate the wire from the functional assembly 20 to the speaker assembly 10, and the first ear hook part and the second ear hook part may be connected to avoid the exposure of the wire. The first ear hook part may be fixedly or flexibly connected to the first core housing part. The ear hook assembly 40 may further be other structures. For example, the ear hook assembly 40 may be a sleeve structure, etc.

FIG. 4 is a schematic diagram illustrating an exemplary cross-section of a speaker assembly according to some embodiments of the present disclosure. As shown in FIG. 1, FIG. 2, and FIG. 4, the speaker assembly 10 may include a core housing 11 and a transducer 12. The core housing 11 may be connected to one end of an ear hook assembly 40, and may touch the user's skin when the user is wearing the acoustic output device 100. Furthermore, the movement of the core housing 11 may form an accommodating cavity (not shown in the figures). The transducer 12 may be configured in the accommodating cavity and connect to the core housing 11. The transducer 12 may be configured to transform audio signals into mechanical vibrations when powered on, so that a skin touching area of the core housing 11 (e.g., a front bottom plate 1161 shown in FIG. 6) may generate bone conduction sound using the transducer 12. In this way, when the user wears the acoustic output device 100, the transducer 12 may transform the audio signals into mechanical vibration to drive the skin touching area of core housing 11 to mechanically vibrate. The mechanical vibration may then directly work on the user's listening nerves through the medium of the user's bones and tissues, and thereby the user hears the bone conduction sound through a speaker assembly 10.

In some embodiments, the speaker assembly 10 may further include a vibration diaphragm 13 connected between the transducer 12 and the core housing 11. The vibration diaphragm 13 may be configured to divide the inner space of the core housing 11 (the above-mentioned accommodating cavity) into a front cavity 111 near the skin touching area of the movement of the core housing 11 and the rear cavity 112 departing from the skin touching area departing from of the movement of the core housing 11. In other words, when the user wears a sound output device 100, the front cavity 111 may be closer to the user than the rear cavity 112. The core housing 11 may be configured with a sound hole 113 connected to the rear cavity 112, and the vibration diaphragm 13 may generate air conduction sounds transmitted to the human ears through the sound hole 113 during the relative movement of the transducer 12 and the core housing 11. In this way, the sound generated from the rear cavity 112 may be passed through the sound hole 113, and then act on the user's eardrum through the air as a medium, and thereby the user hears the air conduction sound through the speaker assembly 10.

In some embodiments, as shown in FIG. 4, when the transducer 12 makes the skin touching area of the core housing 11 move towards the user's face, the bone conduction sound may be enhanced. At the same time, the part corresponding to the skin touching area of the core housing 11 may move towards the user's face as well. The transducer 12 and the connected vibration diaphragm 13 may move away from the user's face due to the relationship between action and reaction forces, and squeeze the air in the rear cavity 112. Correspondently, the air pressure in the rear cavity 112 increases, thereby enhancing the sound coming out through the sound hole 113. The air conduction sound may be enhanced. In some embodiments, when the bone conduction sound generated by the speaker assembly 10 is enhanced, the air conduction sound generated is enhanced as well. Correspondingly, when the bone conduction sound is weakened, the air conduction sound is weakened as well. Therefore, the bone conduction sound and the air conduction sound generated by the speaker assembly 10 may share the same phase. That is, the air conduction sound and the bone conduction sounds may be enhanced or weakened simultaneously.

In some embodiments, as the front cavity 111 and the rear cavity 112 are separated by the structural parts such as the vibration diaphragm 13 and the transducer 12, the law of the changes of the air pressure in the front cavity 111 is exactly the opposite to that of the air pressure in the rear cavity 112. For example, when the transducer 12 and the connected vibration diaphragm 13 move toward the direction away from the user's face, the air in the rear cavity 112 may be squeezed, which increases the air pressure in the rear cavity 112. At the same time, a space volume of the front cavity 111 may increase, and the air pressure in the front cavity 111 will decrease. Therefore, the core housing 11 may be further configured with a pressure relief hole 114 connected to the front cavity 111, and pressure relief hole 114 may enable the front cavity 111 to connect with the external environment, so that the air may freely enter and outlet the front cavity 111. In this way, the changes of air pressures in the rear cavity 112 may not be blocked by the front cavity 111 as much as possible, and the acoustic expressiveness of the air conduction sound generated by the speaker assembly 10 may be effectively improved. In some embodiments, the pressure relief hole 114 may be staggered with the sound hole 113. That is, the pressure relief hole 114 may not be adjacent to the sound hole 113, so as to avoid muting phenomenon due to the opposite phases between the pressure relief hole 114 and the sound hole 113 as much as possible.

In some embodiments, an actual area of an outlet end of the sound hole 113 may be greater than or equal to a preset area threshold, so that the user may hear the air conduction sound. For example, the preset area threshold may be 7 $mm^2$, 8 $mm^2$, 9 $mm^2$, etc. In some embodiments, an actual area of an inlet end of the sound hole 113 may further be greater than or equal to the actual area of the outlet end.

It should be noted that as the structural parts such as the core housing 11 have a certain thickness, through holes, e.g., the sound hole 113 and the pressure relief hole 114 opened on the core housing 11, may have a certain depth. Relative to the accommodating cavity of the core housing 11, the through holes, e.g., the sound hole 113 and the pressure relief hole 114, may have an inlet end close to the accommodating cavity, and an outlet end apart from the accommodating cavity. Further, the actual area of the outlet end of the through holes in the present disclosure may be defined as an area of an end surface of the outlet.

Through the above modes, as the air conduction sound and the bone conduction sound generated by the speaker assembly 10 are originated from a same vibration source (that is, the transducer 12), and the phases of the air conduction sound and the bone conduction sound are the same, the air conduction sound and the bone conduction sound generated by the speaker assembly 10 may be enhanced simultaneously, so that users may hear stronger sound through the acoustic output device 100. The acoustic output device 100 may further save power, thereby extending battery life thereof. In addition, according to reasonable designs of the speaker assembly 10, the air conduction sound and the bone conduction sound may cooperate in a frequency range of a frequency response curve, so that the acoustic output device 100 may have excellent acoustic expressiveness in a specific frequency band. For example, a low-frequency band of the bone conduction sound may be compensated by the air conduction sound, and the middle frequency band and middle high-frequency band of the bone conduction sound may be compensated by the air conduction sound.

It should be noted that in the present disclosure, the frequency range corresponding to the low-frequency band may be 20-150 Hz, the frequency range corresponding to the medium frequency band may be 150-5000 Hz, and the frequency range corresponding to the high-frequency band may be 5-20 KHz. The frequency range corresponding to the middle-low-frequency band may be 150-500 Hz, and the frequency range corresponding to the middle-high-frequency band may be 500-5000 Hz.

Figure 5:
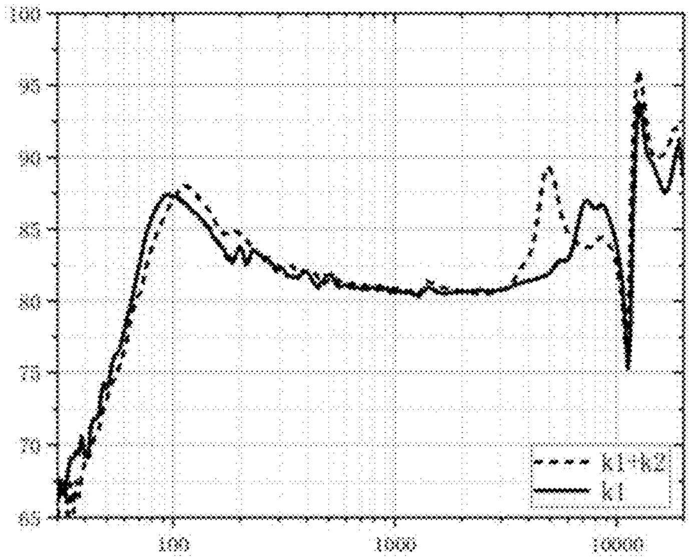
FIG. 5 is a schematic diagram illustrating exemplary frequency response curves of an acoustic output device with a vibration diaphragm and exemplary frequency response curves of an acoustic output device without a vibration diaphragm according to some embodiments of the present disclosure.

FIG. 5 is a schematic diagram illustrating exemplary frequency response curves of an acoustic output device with a vibration diaphragm and exemplary frequency response curves of an acoustic output device without a vibration diaphragm according to some embodiments of the present disclosure. Based on the above detailed description and as shown in FIG. 5, the skin touching area may generate the bone conduction sound under the action of a transducer 12, and the bone conduction sound may have a frequency response curve. The frequency response curve may have at least one resonance peak. In some embodiments, the peak resonance frequency of the above resonance peak may meet the relationship: $|f1-f2|/f1 \leq 50\%$. In addition, the difference between the peak resonance strength of the f1 and the peak resonance strength corresponding to the f2 may be less than or equal to 5 dB, wherein f1 denotes the peak resonance frequency of the above resonance peak when connecting a vibration diaphragm 13 with the transducer 12 and a core housing 11, f2 denotes the peak resonance frequency of the above resonance peak when the vibration diaphragm 13 disconnects with any one of the transducer 12 and the core housing 11. In other words, $|f1-f2|/f1$ may be used to measure the impact of the vibration diaphragm 13 on the transducer 12 driving the above skin touching area; the smaller the value is, the smaller the impact will be. In this way, on the basis of not affecting an original resonance system of the speaker assembly 10 as much as possible, by introducing the vibration diaphragm 13, a speaker assembly 10 may be able to put out a bone conduction sound and an air conduction sound with the same phase simultaneously, thereby improving the acoustic expressiveness of the speaker assembly 10 and save power, so that the battery life of the device may be extended.

In some embodiments, as shown in FIG. 5, the embodiments of the present disclosure may mainly examine the offset of the low-frequency band or middle low frequency band in the frequency response curve, that is, $f1 \leq 500$ Hz, so that the low frequency and the middle-low-frequency of the bone conduction sound may not be impacted as much as possible. The above offset may be less or equal to 50 Hz, that is, $|f1-f2|\leq 50$ Hz, so that the vibration diaphragm 13 does not affect the transducer 12 to drive the skin touching area as much as possible. In some embodiments, the above offset may be greater than or equal to 5 Hz, that is, $|f1-f2|\geq 5$ Hz, so that the vibration diaphragm 13 may have a certain structural strength and elasticity, thereby reducing fatigue deformation in use and extending the service life of the vibration diaphragm 13.

It should be noted that as shown in FIG. 5, the embodiment of the present disclosure may define that the skin touching area has a first frequency response curve when the vibration diaphragm 13 is connected to the transducer 12 and the core housing 11 (e.g., a dotted line shown as k1+k2 in FIG. 5), the skin touching area has a second frequency response curve when the vibration diaphragm 13 disconnects with one or both of the transducer 12 and the core housing 11 (e.g., a line shown as k1 in FIG. 5). Further, for the frequency response curve described in the present disclosure, the horizontal axis may represent the frequency, and a unit thereof is HZ; the vertical axis may represent strength, and the unit thereof is dB.

Figure 6:
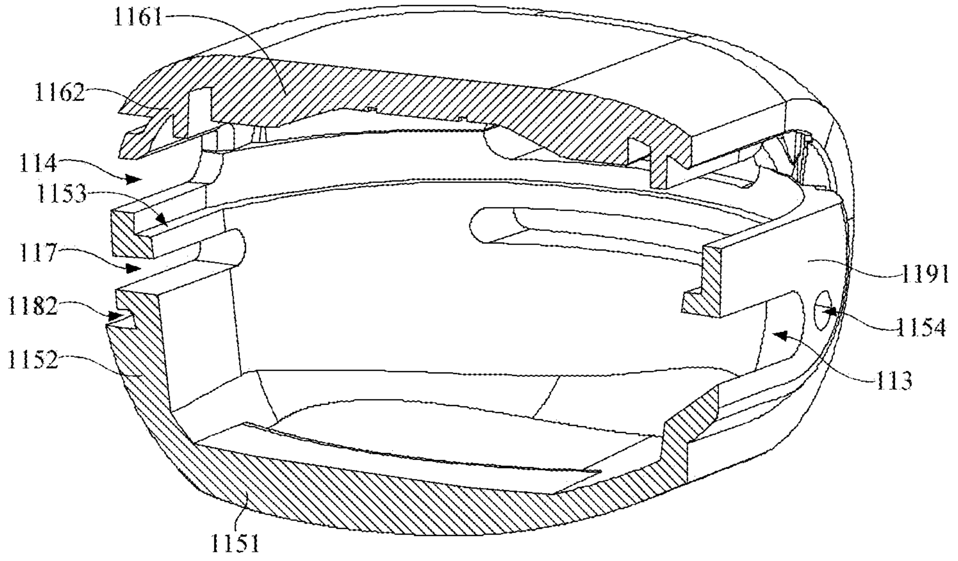
FIG. 6 is a schematic diagram illustrating an exemplary cross-section of a core housing according to some embodiments of the present disclosure.

FIG. 6 is a schematic diagram illustrating an exemplary cross-section of a core housing according to some embodiments of the present disclosure. As shown in FIG. 6 and FIG. 4, a core housing 11 may include a rear shell 115 and a front shell 116 connected to the rear shell 115. The rear shell 115 and the front shell 116 snap-fitted together to form an accommodating cavity for accommodating structural assemblies such as a transducer 12 and a vibration diaphragm 13. In some embodiments, the front shell 116 may be used to touch the user's skin to form a skin touching area with the core housing 11, that is, when the core housing 11 touches the user's skin, the front shell is 116 may be closer to the user than the rear shell 115. In some embodiments, the transducer 12 may be connected to the front shell 116 to facilitate the transducer 12 to drive the skin touching area of the core housing 11 to generate mechanical vibrations. In some embodiments, a sound hole 113 may be configured on the rear shell 115, and a pressure relief hole 114 may be configured on the front shell 116. By such configurations, the muting phenomenon due to the opposite phases therebetween may be avoided. In some embodiments, the vibration diaphragm 13 may be connected to the rear shell 115 or the front shell 116, and may further be connected at a splice between the rear shell 115 and the front shell 116.

In some embodiments, the rear shell 115 may include an integrated rear bottom plate 1151 and a rear cylindrical side plate 1152. The end departing from the rear bottom plate 1151 of the rear cylindrical side plate 1152 may be connected to the front shell 116. In some embodiments, the sound hole 113 may be on the rear cylindrical side plate 1152.

In some embodiments, an annular bearing platform 1153 may further be configured on the inner side surface of the core housing 11. For example, the annular bearing platform 1153 may be configured on the end of the rear cylindrical side plate 1152 departing from the rear bottom plate 1151. As shown in FIG. 5, the bottom plate 1151 may be used as a reference benchmark, and the annular bearing platform 1153 may be slightly lower than the end surface of the rear cylindrical side plate 1152 facing departs from the rear bottom plate 1151. As is shown in FIG. 2, in the vibration direction of the transducer 12, the sound hole 113 may be located between the annular bearing platform 1153 and the rear bottom plate 1151. In some embodiments, the cross-sectional area of the sound hole 113 may gradually shrink from the entrance of the sound hole 113 to its outlet (that is, the direction of the sound hole 113 towards the later mentioned direction of a sound conduction channel 141), so that the annular bearing platform 1153 may have sufficient thickness in the vibration direction of the transducer 12, thereby increasing the structural strength of the annular bearing platform 1153. In this way, when the rear shell 115 is buckled with the front shell 116, the front shell 116 may press and fix a coil support 121 mentioned later on the annular bearing platform 1153. In some embodiments, the vibration diaphragm 13 may be fixed on the annular bearing platform 1153, or may be pressed on the annular bearing platform 1153 by the coil support 121, and then connected to the core housing 11.

In some embodiments, the front shell 116 may include an integrated front bottom plate 1161 and front cylindrical side plate 1162. The end departing from the front bottom plate 1161 of the front cylindrical side plate 1162 may be connected to the rear shell 115. The area front bottom plate 1161 located may be simply regarded as the skin touching area described in the present disclosure. Correspondingly, the pressure relief hole 114 may be configured on the front cylindrical side plate 1162.

Figure 7:
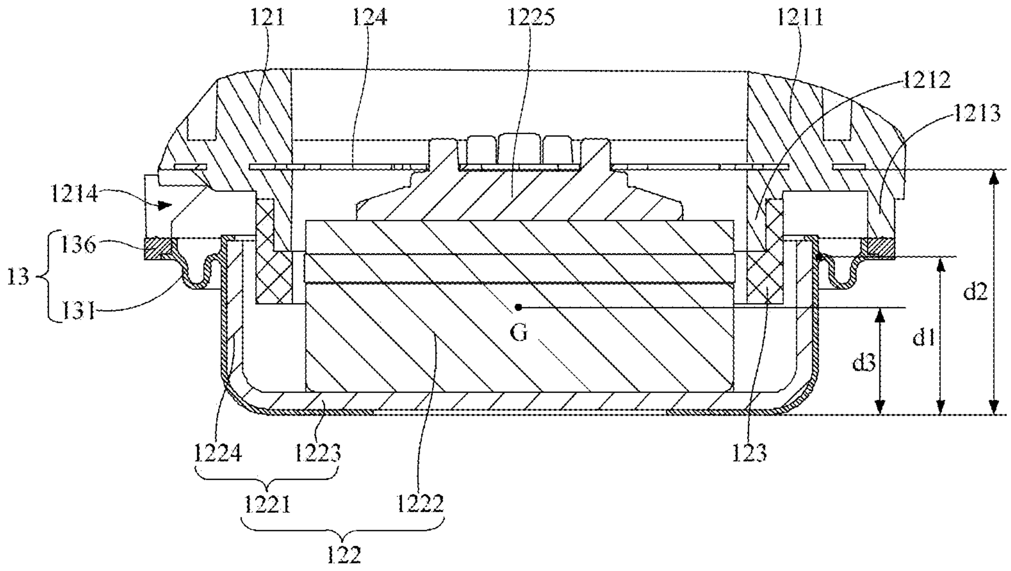
FIG. 7 is a schematic diagram illustrating an exemplary cross-section of a transducer according to some embodiments of the present disclosure.

FIG. 7 is a schematic diagram illustrating an exemplary cross-section of a transducer according to some embodiments of the present disclosure. As shown in FIG. 7 and FIG. 4, a transducer 12 may include a coil support 121, a magnetic circuit system 122, a coil 123, and a leaf spring 124. The coil support 121 and the leaf spring may be configured in a front cavity 111. The central area of the leaf spring 124 may be connected to the magnetic circuit system 122. The surrounding area of the leaf spring 124 may be connected to the core housing 11 through the coil support 121 to hang the magnetic circuit system 122 within the core housing 11. Further, the coil 123 may be connected to the coil support 121 and extend into the magnetic gap of the magnetic circuit system 122.

In some embodiments, the coil support 121 may include an annular main body part 1211 and a first cylindrical bracket part 1212, and one end of the first cylindrical bracket part 1212 may be connected to the annular main body part 1211. The annular main body part 1211 may be connected to the surrounding area of the leaf spring 124, and the annular main body part 1211 and the leaf spring 124 may form an integrated structure using a metal insert injection molding process. In some embodiments, the annular main body part 1211 may be connected to the front bottom plate 1161 through one or a combination of connection methods such as gluing, clipping, etc. In some embodiments, the coil 123 may be connected to the other end of the first cylindrical bracket part 1212 departing from the annular main body part 1211, so that the coil may extend into the magnetic circuit system 122. In some embodiments, a part of the vibration diaphragm 13 may be connected to the magnetic circuit system 122, and the other part may be connected to one or both of the rear shell 115 and the front shell 116.

In some embodiments, the coil support 121 may further include a second cylindrical bracket part 1213 connected to the annular main body part 1211, the second cylindrical bracket part 1213 surrounds the first cylindrical bracket part 1212, and extends to the side of the annular main body part 1211 in the same direction as the first cylindrical bracket part 1212. The second cylindrical bracket part 1213 and the annular main body part 1211 may be connected to the front shell 116 at the same time to increase the connection strength between the coil support 121 and the core housing 11. For example, the annular main body part 1211 may be connected to the front bottom plate 1161, and at the same time, the second cylindrical bracket part 1213 may be connected to the rear cylindrical side plate 1152. Correspondingly, the second cylindrical bracket part 1213 may have an avoidance hole 1214 communicating with the pressure relief hole 114 to prevent the second cylindrical bracket part 1213 from blocking the communication between the pressure relief hole 114 and the front cavity 111. At this time, a part of the vibration diaphragm 13 may be connected to the magnetic circuit system 122, and the other part may be connected to the other end of the second cylindrical bracket part 1213 departing from the annular main body part 1211, and then connected to the core housing 11. Through such configuration, after the speaker assembly 10 is assembled, the other end of the second cylindrical bracket part 1213 departing from the annular main body part 1211 may press the other part of the vibration diaphragm 13 on the annular bearing platform 1153.

In some embodiments, the first cylindrical bracket part 1212 and/or the second cylindrical bracket part 1213 may be a continuous and complete structure on the circumferential direction of the coil support 121 to increase the structural strength of the coil support 121. It may further be a partial discontinuous structure to avoid other structural parts.

In some embodiments, the magnetic circuit system 122 may include a magnetic hood 1221 and a magnetic body 1222, and the cooperation between the magnetic hood 1221 and the magnetic body 1222 may form a magnetic field. The magnetic hood 1221 may include an integrated bottom plate 1223 and cylindrical side plate 1224. In some embodiments, the magnetic body 1222 may be configured in the cylindrical side plate 1224 and may be fixed on the bottom plate 1223. The side of the magnetic body 1222 departing from the bottom plate 1223 may be connected to the central area of the leaf spring 124 through a connector 1225, and the coil 123 may extend into the magnetic gap between the magnetic body 1222 and the magnetic hood 1221. At this time, a part of the vibration diaphragm 13 may be connected to the magnetic hood 1221.

In some embodiments, the magnetic body 1222 may include only one magnet body or may be a magnetic set formed by a plurality of sub-magnet bodies. In some embodiments, the side of the magnetic body 1222 departing from the bottom plate 1223 may further include a magnetic plate (not marked in the figure).

Figure 8:
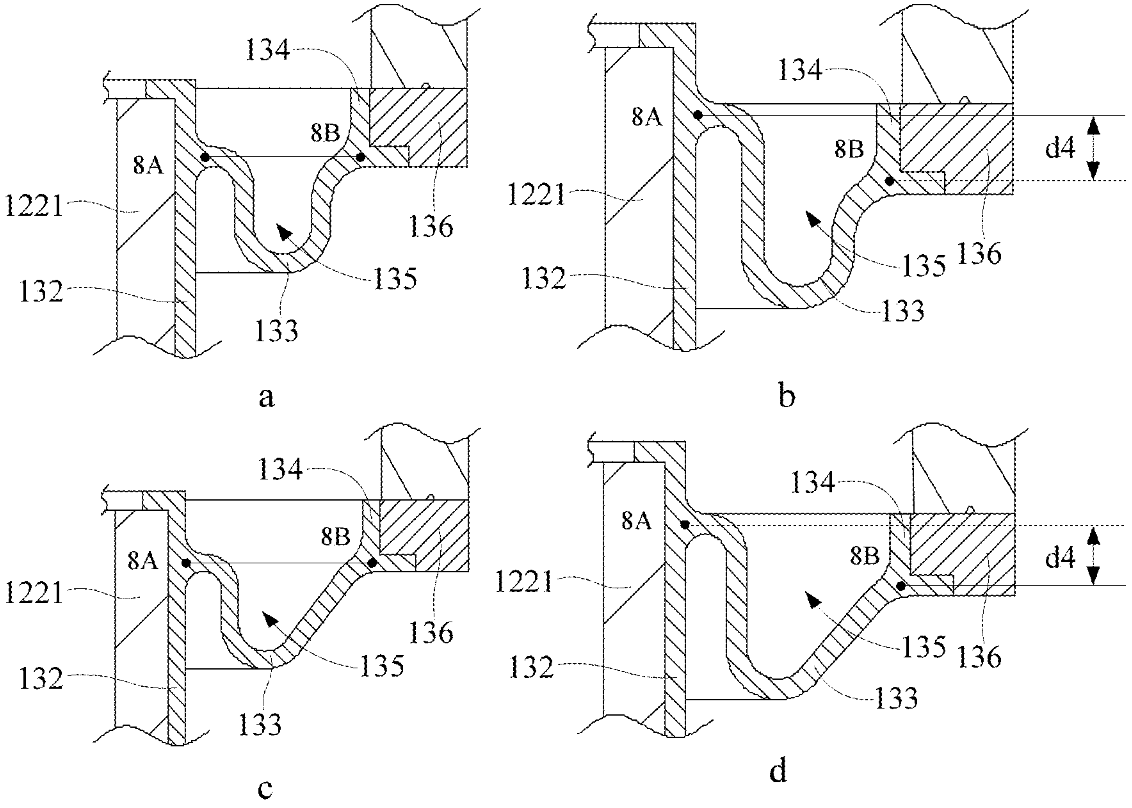
FIG. 8 is a schematic diagram illustrating exemplary part cross-sections of a plurality of vibration diaphragms according to some embodiments of the present disclosure.

FIG. 8 is a schematic diagram illustrating exemplary part cross-sections of a plurality of vibration diaphragms according to some embodiments of the present disclosure. As shown in FIG. 8, FIG. 7 and FIG. 4, a vibration diaphragm 13 may include a diaphragm main body 131, the diaphragm main body 131 may include an integrated first connection part 132, wrinkle part 133, and second connection part 134. The first connection part 132 surrounds a transducer 12, and connects to the transducer 12. The second connection part 134 surrounds a periphery of the first connection part 132, and may be spaced apart from the first connection part 132 in the vertical direction of the vibration direction of the transducer 12. The wrinkle part 133 may be located in the interval area between the first connection part 132 and the second connection part 134, and connects the first connection part 132 and the second connection part 134.

In some embodiments, the first connection part 132 may be configured like a cylinder and may be connected to a magnetic hood 1221. The second connection part 134 may be configured in an annular shape, and may be connected to the other end of the second cylindrical bracket part 1213 departing from the annular main body part 1211, and further connected to the core housing 11. As shown in FIG. 7, the connection point between the wrinkle part 133 and the first connection part 132 may be lower than the end surface where the cylindrical side plate 1224 departs from the bottom plate 1223.

In some embodiments, the wrinkle part 133 forms a depression area 135 between the first connection part 132 and the second connection 134, so that it may be easier for the first connection part 132 and the second connection 134 to move relative to the vibration direction of the transducer 12, which may reduce the effect of the vibration diaphragm 13 on the transducer 12. As shown in FIG. 3, the depression area 135 may depress towards the rear cavity 112. Of course, the depression area 135 may further depress towards the front cavity 111, which is, the opposite of the depression direction of the depression area 135 shown in FIG. 3.

In some embodiments, there may be a plurality of depression areas 135, for example, the count thereof may be two, three, four, etc., and the plurality of depression areas 135 may be distributed apart in the vertical direction of the vibration direction of the transducer 12. In some embodiments, the depth of each depression area 135 in the vibration direction of the transducer 12 may be exactly the same. In some embodiments, the depth of each depression area 135 in the vibration direction of the transducer 12 may not be the same or may be completely different. The embodiments of the present disclosure take an example of only one depression area 135.

In some embodiments, the material of the diaphragm main body 131 may be any one or the combinations of polycarbonate (PC), polyamides (PA), acrylic-butadiene-styrene (ABS), Polystyrene (PS), High Impact Polystyrene (HIPS), Polypropylene (PP), Polyethylene Terephthalate (PET), Polyvinyl Chloride, PVC), Polyurethanes (PU), polyethylene (PE), Phenol Formaldehyde (PF), urea-formaldehyde (UF), Melamine-Formaldehyde (MF), Polyarylate (PAR), Polyetherimide (PEI), Polyimide (PI), Polyethylene Naphthalate Two Formic Acid Glycol Ester, Pen), Polyetheretherketone (Peek), silicone, etc. PET may be a kind of thermoplastic polyester, which is well formed. The vibration diaphragm made from it is often called Mylar diaphragm; PC has a strong impact resistance, making the size stable after forming; PAR may be the advanced version of PC, mainly for environmental considerations; PEI may be softer than PET and has higher internal damping; PI has high temperature resistance, higher molding temperature, and needs long processing time; PEN has high strength and is harder, which is characterized by coloring, dyeing, and coating; PU may be used as the damping layer or folding ring of composite materials, which has high elasticity and high internal damping; PEEK may be a newer material with friction and fatigue resistance. It should be noted that composite materials may generally take into account the characteristics of a variety of materials. Common composite materials include double-layer structure (general hot pressure PU, increase internal resistance), three-layer structure (sandwich structure, with damping layer PU in the middle, acrylic glue, UV glue, pressure-sensitive glue), five-layer structure (two layers of film adhesive through double-sided glue, the double-sided glue has a base layer, usually made of PET).

In some embodiments, the vibration diaphragm 13 may further include a reinforcing ring 136, and the hardness of the reinforcing ring 136 may be greater than the hardness of the diaphragm main body. In some embodiments, the reinforcing ring 136 may be configured like a ring, its ring width may be greater than or equal to 0.4 mm, and the thickness may be less than or equal to 0.4 mm. In some embodiments, the reinforcing ring 136 may be connected to the second connection part 134, so that the second connection part 134 may be connected to the core housing 11 through the reinforcing ring 136. In this way, the structural strength of the edge of the vibration diaphragm 13 may be increased, thereby increasing the connection intensity between the vibration diaphragm 13 and the core housing 11.

It should be noted that configuring the reinforcing ring 136 as a ring is mainly to facilitate the adaptation of the ring structure of the second connection part 134. In some embodiments, the reinforcing ring 136 may be a continuous complete ring or a discontinuous segmented ring in terms of structure. Further, after the speaker assembly 10 is assembled, the other end of the second cylindrical bracket part 1213 departing from the annular main body part 1211 may press the reinforcing ring 136 on the annular bearing platform 1153.

In some embodiments, the first connection part 132 may be injection-molded on the outer peripheral surface of the magnetic hood 1221, the reinforcing ring 136 may be injection-molded on the outer peripheral surface of the second connection part 134, so that the connection mode between the reinforcing ring 136 and the second connection part 134 may be simplified and the connection intensity therebetween may be strengthened. The first connection part 132 may cover the cylindrical side plate 1224, or further cover the bottom plate 1223 to increase the touching area between the first connection part 132 and the magnetic circuit system 122, thereby increasing the binding strength between the two. Similarly, the second connection part 134 may be connected to the inner ring surface and an end surface of the reinforcing ring 136 to increase the touching area between the second connection part 134 and the reinforcing ring 136, thereby increasing the bonding strength between the second connection part 134 and the reinforcing ring 136.

As shown in FIG. 8, (a) to (d) of FIG. 8 mainly illustrates various structural deformations of the diaphragm main body 131, the main difference between them lies on the specific structure of the wrinkle part 133. For FIG. 8 (*a*), the wrinkle part 133 may be configured as a symmetrical structure, and the connection points formed by its two ends, the first connection part 132 and the second connection part 134 may further be on the same surface. For example, the projections of the two connection points on the vibration direction of the transducer 12 may coincident. For FIG. 8 (*b*), the wrinkle part 133 may further be configured as a symmetrical structure for most part, but the connection points formed by its two ends, the first connection part 132 and the second connection part 134 may not be on the same surface. For example, the projection of the two connection points on the vibration direction of the transducer 12 may be staggered from each other. For FIG. 8 (*c*), the wrinkle part 133 may be configured as an asymmetric structure, but the connection points formed by its two ends, the first connection part 132 and the second connection part 134 may further be on the same surface. For FIG. 8 (*d*), the wrinkle part 133 may be configured as an asymmetric structure, and the connection points formed by its two ends, the first connection part 132 and the second connection part 134 may not be on the same surface.

Based on the above descriptions, for the vibration diaphragm 13, with the premises of a certain structural strength to ensure its basic structure and fatigue resistance, the softer the diaphragm main body 131 is, the easier for it to deform, and the smaller its impact on the transducer 12 may be. In some embodiments, the thickness of the diaphragm main body 131 may be less than or equal to a first thickness threshold. For example, the thickness of the diaphragm main body 131 may be less than or equal to 0.2 mm. For another example, the thickness of the diaphragm main body 131 may be less than or equal to 0.1 mm. The elastic deformation of the diaphragm main body 131 may occur mainly in the wrinkle part 133. Therefore, the thickness of the wrinkle part 133 may be less than the thickness of the other parts of the diaphragm main body 131. In some embodiments, the thickness of the wrinkle part 133 may be less than or equal to a second thickness threshold. In some embodiments, the second thickness threshold may be less than or equal to the first thickness threshold. For example, the thickness of the wrinkle part 133 may be less than or equal to 0.2 mm. For another example, the thickness of the wrinkle part 133 may be less than or equal to 0.1 mm. In the embodiments of the present disclosure, the diaphragm main body 131 may be an equal thickness structure for exemplary illustration.

Figure 9:
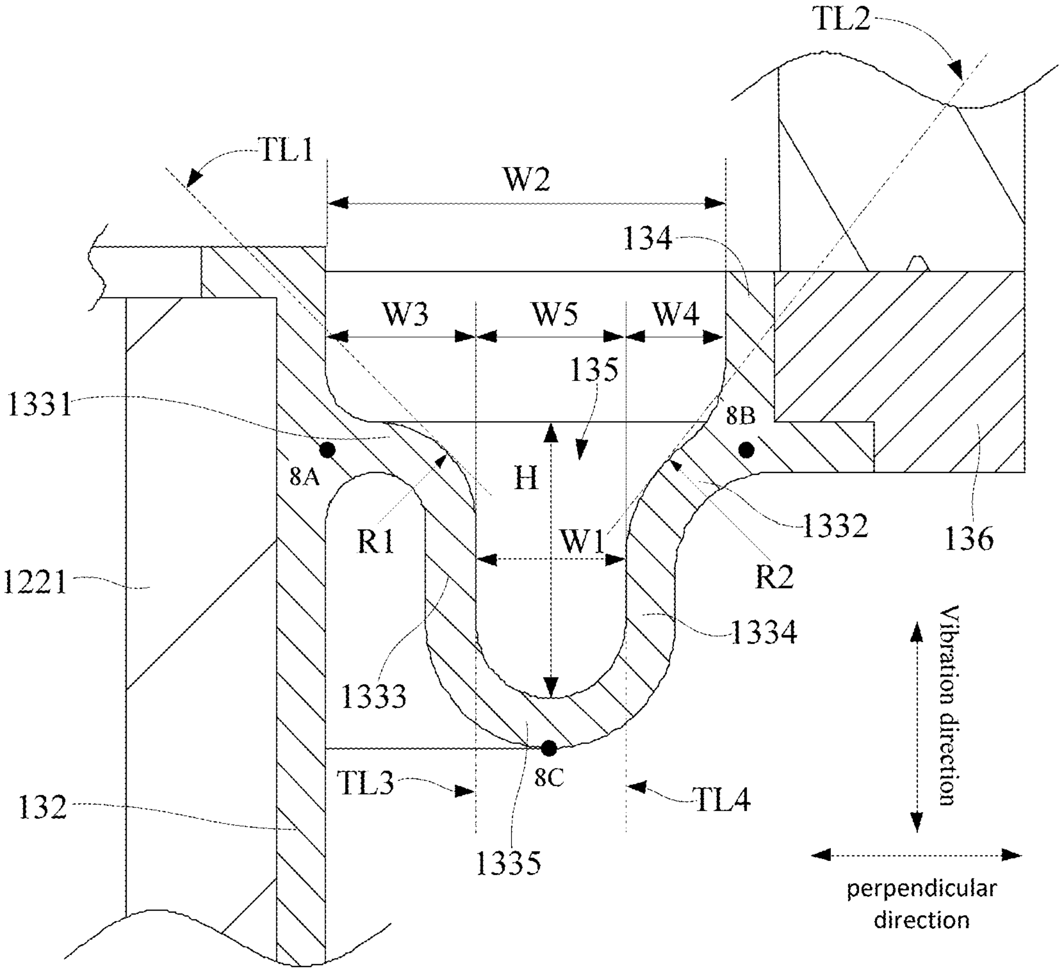
FIG. 9 is a schematic diagram illustrating an exemplary cross-section of a vibration diaphragm according to some embodiments of the present disclosure.

FIG. 9 is a schematic diagram illustrating an exemplary cross-section of a vibration diaphragm according to some embodiments of the present disclosure. As shown in FIG. 9, in the vibration direction of a transducer 12, a depression area 135 may have a depth H. In the vertical direction of the vibration direction of the transducer 12, the depression area 135 may have a half deep width W1, and a first connection part 132 and a second connection part 134 may have a distance W2, wherein, $0.2 \leq W1/W2 \leq 0.6$, this may ensure the size of deformable area on the wrinkle part 133, and may further avoid the structural interference between the wrinkle part 133 and the first connection part 132 and/or the core housing 11. In some embodiments, $0.2 \leq H/W2 \leq 1.4$, this may ensure that size of deformable area on the wrinkle part 133, make the wrinkle part 133 soft enough, and may avoid the structural interference between the wrinkle part 133 and the first connection part 132 and/or the core housing 11, and avoid the wrinkle part 133 being difficult to vibrate due to its excessive self-weight.

It should be noted that the half deep width W1 refers to the width of the depression area 135 at the depth of ½H.

In some embodiments, the wrinkle part 133 may include an integrated first transition section 1331, second transition section 1332, third transition section 1333, fourth transition section 1334, and fifth transition section 1335. One end of the first transition section 1331 and the second transition section 1332 may be respectively connected to the first connection part 132 and the second connection part 134, and extends toward each other. One end of the third transition section 1333 and the fourth transition section 1334 may be respectively connected to the other end of the first transition section 1331 and the second transition section 1332, and the two ends of the fifth transition section 1335 may be respectively connected to the other end of the third transition section 1333 and the fourth transition section 1334. At this time, each of the above transition section may be concentrated to form the depression area 135. In the direction from the connection point (e.g., point 8A) between the first transition section 1331 and the first connecting portion 132 to the reference location point (e.g., point 8C) which is farthest away from the first connection part 132 of the wrinkle part 133, the angle between the tangent line (e.g., dotted line TL1) of the first transition section 1331 toward the side of the depression area 135 and the vibration direction of the transducer 12 may gradually decrease. In some embodiments, in the direction from the connection point between the second transition section 1332 and the second connection part 134 (e.g., point 8B) to the above reference location point, the angle between the tangent line (e.g., dotted line TL2) of the second transition section 1332 toward the side of the depression area 135 and the vibration direction of the transducer 12 may gradually decrease, so that the depression area 135 may be depressed toward the rear cavity 112. In some embodiments, the angle between the tangent line (e.g., dotted line TL3) of the third transition section 1333 toward the side of the depression area 135 and the vibration direction of the transducer 12 may remain unchanged or gradually increase. In some embodiments, the angle between the tangent line (e.g., dotted line TL4) of the fourth transition section 1334 toward the side of the depression area 135 and the vibration direction of the transducer 12 may remain unchanged or gradually increase. At this time, the fifth transition section 1335 may be set in arc.

In some embodiments, the fifth transition section 1335 may be configured in arc shape, and the arc radius may be greater than or equal to a preset radius threshold. For example, the preset radius threshold may be 0.2 mm. Combining (a) or (b) in FIG. 8, the angle between the tangent line of the third transition section 1333 toward the side of the depression area 135 and the vibration direction of the transducer 12 may be zero. In some embodiments, the angle between the tangent line of the fourth transition section 1334 toward the side of the depression area 135 and the vibration direction of the transducer 12 may be zero. At this time, the arc radius of the fifth transition section 1335 may be equal to half of the half deep width W1 of the depression area 135. Of course, combining (c) or (d) in FIG. 8, the angle between the tangent line of the third transition section 1333 toward the side of the depression area 135 and the vibration direction of the transducer 12 may be zero. The angle between the tangent line of the fourth transition section 1334 toward the side of the depression area 135 and the vibration direction of the transducer 12 may be a fixed value greater than zero. At this time, the fourth transition section 1334 may be tangent to the fifth transition section 1335.

In some embodiments, the projection length of the first transition section 1331 in the vertical direction of the vibration direction of the transducer 12 may be defined as W3. The projection length of the second transition section 1332 in the aforesaid vertical direction may be defined as W4. The projection length of the fifth transition section 1335 in the aforesaid vertical direction may be defined as W5, wherein $0.4 \leq (W3+W4)/W5 \leq 2.5$.

In some embodiments, the first transition section 1331 and the second transition section 1332 may be configured in arc respectively. To avoid excessive partial bending of the wrinkle part 133, and increase the reliability of the vibration diaphragm 13, the arc radius R1 of the first transition section 1331 may be greater than or equal to a first radius threshold. For example, the arc radius R1 of the first transition section 1331 may be greater than or equal to 0.2 mm. The arc radius R2 of the second transition section 1332 may be greater than or equal to a second radius threshold. For example, the arc radius R2 of the second transition section 1332 may be greater than or equal to 0.3 mm. Of course, in some other embodiments, the first transition section 1331 may include connected arc section and flat section. The above arc section may be connected to the third transition section 1333, the above flat section may be connected to the first connection part 132, and the second transition section 1332 may be similar to the first transition section 1331.

Based on the above detailed description and as shown in FIG. 9, the thickness of the main diaphragm body 131 may be 0.1 mm. For example, $W1 \geq 0.9$ mm, 0.3 mm$\leq H \leq$1.0 mm, $W3+W4 \geq 0.3$ mm. In some embodiments, when 0.3 m$\leq$W3+W4$\leq$1.0 mm, W2 or W5$\geq$0.4 mm. When 0.4 mm$\leq$W3+W4$\leq$0.7 mm, W2 or W5$\geq$0.5 mm. In some embodiments, W2 or W5=0.4 mm, W3=0.42 mm, W4=0.45 mm, H=0.55 mm.

As shown in FIG. 9 and FIG. 7, in the vibration direction of the transducer 12, the distance from the connection point (e.g., point 8A) between the wrinkle part 133 and the first connection part 132 to the outer end surface of a magnetic circuit system 122 away from a front cavity 111 may be defined as d1. The distance from the central area of a leaf spring 124 to the outer end surface of a magnetic circuit system 122 away from a front cavity 111 may be defined as d2, wherein $0.3 \leq d1/d2 \leq 0.8$. At this time, as the value of the distance d2 may be relatively certain, the value of distance d1 may be adjusted based on d2, so that the specific locations of the connection between the wrinkle part 133 and the first connection part 132 may be adjusted. Furthermore, the distance from the geometric center (such as point G) of a magnetic circuit system 122 to the outer end surface of the magnetic circuit system 122 away from the front cavity 111 may be defined as d3, wherein, $0.7 \leq d1/d3 \leq 2$. At this time, as the value of the distance d3 may be relatively certain, the value of d1 may further be adjusted based on d3, so that the specific locations of the connection between the wrinkle part 133 and the first connection part 132 may be adjusted. In this way, one end of the magnetic circuit system 122 may be connected to a core housing 11 through the leaf spring 124 and a coil support 121, and the other end may be connected to the core housing 11 through the vibration diaphragm 13. That is, the leaf spring 124 and the vibration diaphragm 13 may fix the two ends of the magnetic circuit system 122 on the core housing 11 in the vibration direction of the transducer 12, so that the stability of the magnetic circuit system 122 may be greatly improved.

In some embodiments, $d1 \geq d3$, so that in the vibration direction of the transducer 12, as shown in FIG. 4, at least part of the sound hole 113 may be located between the above connection point and the above outer end surface. In this way, while increasing the stability of the magnetic circuit system 122 as much as possible, the volume of the rear cavity 112 may further be reserved as much as possible to increase the acoustic expressiveness of a speaker assembly 10. Meanwhile, enough design space on the location and size of the sound hole 113 on the location of the core housing 11 may be given, so that the sound hole 113 may be configured flexibly.

Based on the above descriptions, and as shown in FIG. 7, the side of a bottom plate 1223 departing from the side plate 1224 may be a reference basis. The distance d1 may further be regarded as the distance between the second connection part 134 and the bottom plate 1223, the distance d2 It may further be regarded as the distance between the leaf spring 124 and the bottom plate 1223, the distance d3 may further be regarded as the distance between the geometric center of a magnetic body 1222 and the bottom 1223. In some embodiments, d1=2.85 mm, d2=4.63 mm, d3=1.78 mm.

In some embodiments, the distance between the respective projections of the connection point (e.g., point 8A) between the first connection part 132 and the wrinkle part 133 and the connection point (e.g., point 8B) between the second connection part 134 and the wrinkle part 133 in the vibration direction of the transducer 12 may be defined as d4, wherein $0 \leq d4/W2 \leq 1.8$. At this time, the specific location of the connection between the wrinkle part 133 and the first connection part 133 may further be adjusted. Combining (a)

or (c) in FIG. 8, the projections of connection point between the first connection part 132 and the wrinkle part 133 and the connection point between the second connection part 134 and the wrinkle part 133 may coincide in the vibration direction of the transducer 12, that is, d4=0. Of course, Combining (b) or (d) in FIG. 8, the projections of connection point between the first connection part 132 and the wrinkle part 133 (e.g., point 8A) and the connection point between the second connection part 134 and the wrinkle part 133 (e.g., 8B) may be staggered in the vibration direction of the transducer 12, that is, d4>0.

Figure 10:
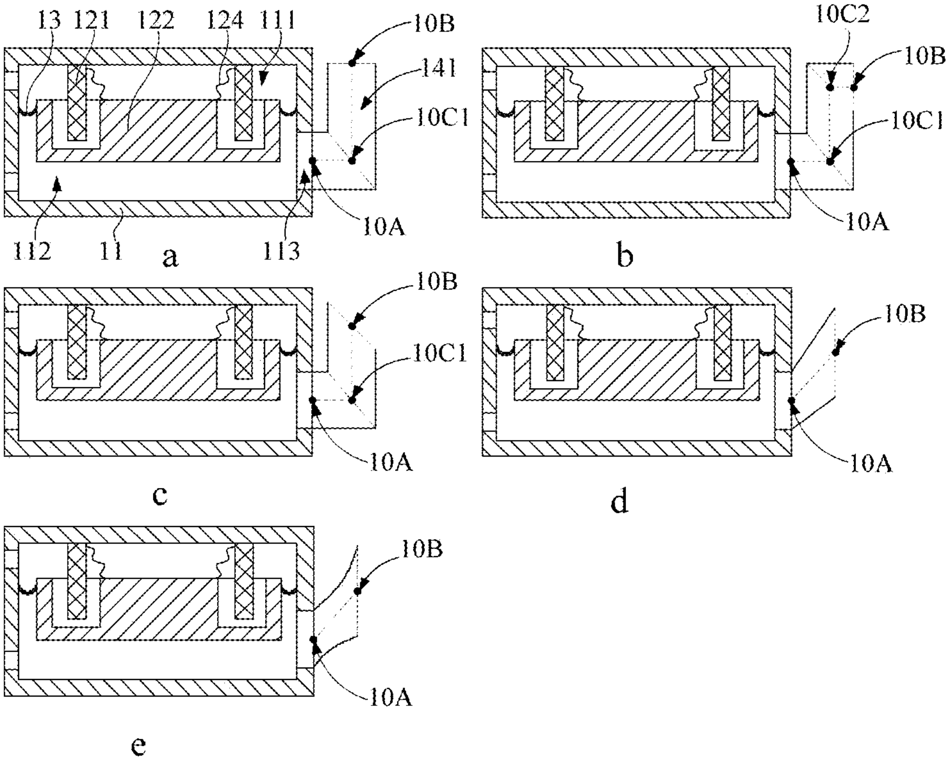
FIG. 10 is a schematic diagram illustrating an exemplary sound conduction part according to some embodiments of the present disclosure.

FIG. 10 is a schematic diagram illustrating an exemplary sound conduction part according to some embodiments of the present disclosure. As shown in FIG. 10 and FIG. 4, a speaker assembly 10 may further include a sound conduction assembly 14 connected to a core housing 11. The sound conduction assembly 14 may include a sound conduction channel 141, and the sound conduction channel 141 may be connected to a sound hole 113, and may be used to guide the above air conduction sound to human ears. In other words, the sound conduction assembly 14 may be used to change the transmission path/direction of the above air conduction sound, then change the directivity of the above air conduction sound, and further increase the intensity of the above air conduction sound. In some embodiments, the sound conduction assembly 14 may further make the actual output position of the air guide sound from the acoustic output device 100 further depart from the rear end surface of the core housing 11 opposite to its skin touching area (such as the area where a rear bottom plate 1151 locates) to improve the possible sound leakage at the rear bottom plate 1151. The sound leakage may lead to an inversion cancellation to the sound from a sound hole 113. In this way, when a user is wearing the acoustic output device 100, the user may hear the air conduction sound.

In some embodiments, to ensure sound quality, the frequency response curve should be relatively flat in the wider frequency band, that is, the resonance peak needs to be at a higher frequency position as much as possible. The frequency response curve of the air conduction sound output from the sound hole 113 to the acoustic output device 100 has a resonance peak. The peak resonance frequency of the resonance peak may be greater than or equal to a first frequency threshold. For example, the peak resonance frequency may be greater than or equal to 1 kHz. For another example, the peak resonance frequency may be greater than or equal to 2 kHz, so that the acoustic output device 100 may have a good voice output effect. For another example, the peak resonance frequency may be greater than or equal to 3.5 kHz, so that the acoustic output device 100 may have a good music output effect. For another example, the peak resonance frequency may be further greater than or equal to 4.5 kHz.

Based on the above descriptions, in some embodiments, the sound conduction channel 141 may communicate with a rear cavity 112 through the sound hole 113, and they may form a typical Helmholtz resonance cavity structure. Based on the Helmholtz resonance cavity model, the relations between the resonant frequency f, the volume V of the rear cavity 112, the sectional area S of the sound conduction channel 141, the equivalent radius R and its length L may meet the formula: $F \propto f \propto [S/(VL+1.7VR)]^{1/2}$. Obviously, when the volume of the rear cavity 112 is fixed, increase the sectional area of the sound conduction channel 141 and/or decrease the length of the sound conduction channel 141 may both help to increase resonant frequency, and drive the above air conduction sound to move to high frequency.

In some embodiments, the length of the sound conduction channel 141 may be less than or equal to a preset length threshold. For example, the length of sound conduction channel 141 may be less than or equal to 7 mm. For another example, the length of the sound conduction channel 141 may be between 2 mm and 5 mm. In the vibration direction of the transducer 12, the distance between the outlet of the sound conduction channel 141 and the rear end surface of the core housing 11 departing from the above-mentioned skin touching area may be greater than or equal to a preset distance threshold. For example, the preset distance threshold may be 3 mm, thereby avoiding the inversion cancellation of the air conduction sound from the outlet of the sound conduction channel 141 due to the sound leakage generated by the rear end surface of the core housing 11.

In some embodiments, the cross-sectional area of the sound conduction channel 141 may be greater than or equal to a first area threshold. For example, the cross-sectional area of the sound conduction channel 141 may be greater than or equal to 4.8 $mm^2$. For another example, the cross-sectional area of the sound conduction channel 141 may be greater than or equal to 8 $mm^2$. In some embodiments, as shown in FIG. 3, the cross-sectional area of the sound conduction channel 141 may gradually increase along the direction of the transmission of the above air conduction sound (that is, in the direction away from the sound hole 113), making the sound conduction channel 141 like a horn, which may further extend towards the front shell 116 to guide the above air conduction sound. In some embodiments, the cross-sectional area of the inlet end of the sound conduction channel 141 may be greater than or equal to a second area threshold. For example, the cross-sectional area of the inlet end of the sound conduction channel 141 may be greater than or equal to 10 $mm^2$. For another example, the cross-sectional area of the inlet end of the sound conduction channel 141 may be greater than or equal to 15 $mm^2$.

In some embodiments, the ratio between the volume of the sound conduction channel 141 and the volume of the rear cavity 112 may be between 0.05 and 0.9. The volume of the rear cavity 112 may be less than or equal to a first volume threshold. For example, the volume of the rear cavity 112 may be less than or equal to 400 $mm^3$. For another example, the volume of the rear cavity 112 may be between 200 $mm^3$ and 400 $mm^3$.

In some embodiments, the sound conduction channel 141 may be configured like a horn. The length of the sound conduction channel 141 may be 2.5 mm, and the cross-sectional areas of the inlet and outlet ends of the sound conduction channel 141 may be 15 $mm^2$ and 25.3 $mm^2$, respectively. Furthermore, the volume of the rear cavity 112 may be 350 $mm^3$.

As shown in FIG. 10, the various structural deformations of the sound conduction channel 141 is shown from (a) to (e). The main difference among them lies on the specific structure of the sound conduction channel 141. For (a) to (c) in FIG. 10, the sound conduction channel 141 may be simply regarded as a bending configuration; for (d) to (e) in FIG. 10, the sound conduction channel 141 may be simply regarded as a direct configuration. Obviously, there may be a certain difference between the above air conduction sound due to the structural differences of the sound conduction channel 141, to be more specific:

For (a) in FIG. 10, the sound direction of the sound conduction channel 141 points to the user's face, which may increase the distance from the outlet end of the sound conduction channel 141 to the rear end surface, and optimize the directivity and strength of the above air conduction sound.

For (b) in FIG. 10, the sound direction of the sound conduction channel 141 points to the user's auricle, making the above air conduction sound more likely to be collected into the ear canal by the auricle, and then optimizes the strength of the above air conduction sound.

For (c) in FIG. 10, the sound direction of the sound conduction channel 141 points to the user's ear canal, and it may further optimize the strength of the above air conduction sound. At the same time, the outlet end of the sound conduction channel 141 adopts the oblique outlet mode, which frees the actual area of the outlet of the sound conduction channel 141 from the restriction of the cross-sectional area of the sound conduction channel 141, and increases the cross-sectional area of the sound conduction channel 141, and may be conductive to the output of the above air conduction sound.

For (d) in FIG. 10, the wall surface of the sound conduction channel 141 is a plane, which is convenient for mold release during the production process.

For (e) in FIG. 10, the wall surface of the sound conduction channel 141 is a curved surface, which is conducive to the acoustic impedance matching between the sound conduction channel 141 and the atmosphere, and benefits the output of above air conduction sound.

It should be noted that the cross-sectional area of a certain point of the sound conduction channel 141 refers to the minimum area that may be intercepted when intercepting the sound conduction channel 141 through this point. Further, a straight-through sound conduction channel means that from any one of the inlet and outlet end of the sound conduction channel 141, the entire of the other may be observed. In some embodiments, for the straight-through sound conduction channels shown in (d) to (e) in FIG. 10, the length of the sound conduction channel 141 may be calculated as follows: first the geometric center of the inlet end of the sound conduction channel 141 (such as point 10A) and the geometric center of its outlet (e.g., point 10B) may be determined; then connect the above geometric centers to form a line segment 10A-10B. The length of the line segment may be simply regarded as the length of the sound conduction channel 141. Correspondingly, a bent sound conduction channel means that from any one of the inlet and outlet end of the sound conduction channel 141, the entire of the other may not be observed, or only a part of the other end may be observed. In some embodiments, for the bent sound conduction channels shown in (a) to (c) in FIG. 10, the bent sound conduction channel may be divided into two or more straight-through sound conduction sub-channels, and the sum of the length of the straight-through sound conduction sub-channels may be used as the length of the bent sound conduction channel. For example, in (a) to (c) in FIG. 10, the geometric centers of the surface where the intermediate bend is located (such as point 10C1, 10C2) may be determined, and then the above geometric centers may be connected to form a line segment 10A-10C1-10B (or 10A-10C1-10C2-10B), the length of this segment may be simply regarded as the length of the sound conduction channel 141.

In some embodiments, as shown in FIG. 4, the outlet of the sound conduction channel 141 may generally be covered with an acoustic resistance net 140. On the one hand, the acoustic resistance net 140 may be used to adjust the acoustic resistance of the air conduction sound output by the sound hole 113 to the external part of the acoustic output device 100, so as to weaken the peak resonant frequency of the resonant peak of the above air conduction sound in the middle-high-frequency band or high-frequency band, smoothing the frequency resonant curve, and achieve a good listening effect. On the other hand, it may further separate the rear cavity 112 from the outside to a certain extent, so as to increase the waterproof and dustproof performance of the speaker assembly 10. The acoustic resistance of the acoustic resistance net 140 may be less than or equal to 260 MKsrayls. Specifically, a porosity of the acoustic resistance net 140 may be greater than or equal to 13%; and/or, the pore size may be greater than or equal to 18 μm.

Figure 11:
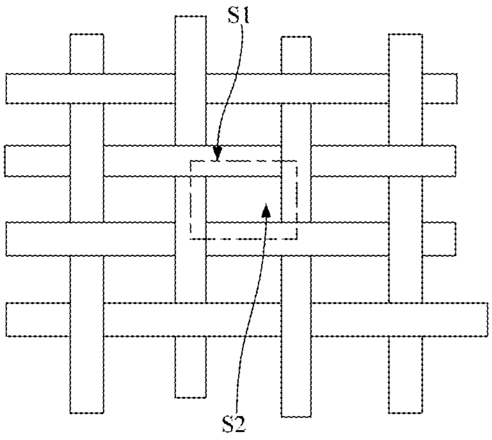
FIG. 11 is a schematic diagram illustrating a top view of an exemplary acoustic resistance net according to some embodiments of the present disclosure.

FIG. 11 is a schematic diagram illustrating a top view of an exemplary acoustic resistance net according to some embodiments of the present disclosure. In some embodiments, as shown in FIG. 11, an acoustic resistance net 140 may be woven from the gauze. Factors such as the diameter and density of the gauze will affect the acoustic resistance of the acoustic resistance net 140. In some embodiments, every four mesh threads intersecting with each other among the plurality of gauze wires arranged at intervals in the longitudinal direction and the intervals in the lateral direction may be enclosed to form a pore. The area of the area surrounded by the central lines of the gauze net may be defined as S1, and the area of the area actually surrounded by the edge of the gauze net (i.e., the pore) may be defined as S2. Then the porosity may be defined as S2/S1. Further, the pore size may be expressed as the distance between any two adjacent gauze net, such as the edge length of the pores.

In some embodiments, the active area of a specific through hole or opening introduced below in the present disclosure may be defined as the product of its actual area and the porosity of the acoustic resistance network covered. For example, when the outlet end of the sound conduction channel 141 is covered with the acoustic resistance net 140, the active area of the outlet end of the sound conduction channel 141 may be the product of the actual area of the sound conduction channel 141 and the porosity of the acoustic resistance net 140. When the outlet end of the sound conduction channel 141 is not covered with the acoustic resistance net 140, the active area of the outlet end of the sound conduction channel 141 may be the actual area of the outlet end of the sound conduction channel 141. In some embodiments, the active area of the outlet end of the pores such as pressure relief holes and sound-tuning holes mentioned in the following descriptions may further be defined as the product of the actual area and the corresponding pore rate, which will not be repeated here.

Based on the above descriptions, apart from hearing the bone conduction sound, the user may mainly hear the air conduction sound output through a sound hole 113 and the sound conduction channel 141 to the outside of an acoustic output device 100, instead of the air conduction sound output through the pressure relief holes 114 to the outside of an acoustic output device 100. Therefore, the active area of the outlet end of the sound conduction channel 141 may be designed to be larger than the pressure relief hole 114.

In some embodiments, the size of the pressure relief hole 114 may affect the smoothness of exhausting of a front cavity 111, and affect the vibration difficulty of the vibration diaphragm 13, and further affect the acoustic expressiveness of the air conduction sound output through a sound hole 113 to the outside of an acoustic output device 100. Therefore, when the active area of the outlet end of the sound conduction channel 141 is fixed, for example, the actual area of the outlet end of the sound conduction channel 141 and/or the porosity of the acoustic resistance net 140 may be fixed, combining the table below to adjust the active area of the outlet end of the pressure relief hole 114, such as the actual area of the outlet end of the pressure relief hole 114 and/or the acoustic resistance of the acoustic resistance net 140 covered on the outlet end. In this way, the air conduction sound output through the sound hole 113 to the outside of the acoustic output device 100 may be changed. In the present disclosure, the situation when the acoustic resistance is 0 may be simply regarded as no acoustic resistance net is covered.

| frequency response curve | Actual area/mm$^2$ | Acoustic resistance/MKSrayls | porosity |
|---|---|---|---|
| 10-1 | 31.57 | 0 | 100% |
| 10-2 | 2.76 | 0 | 100% |
| 10-3 | 2.76 | 1000 | 3% |

Figure 12:
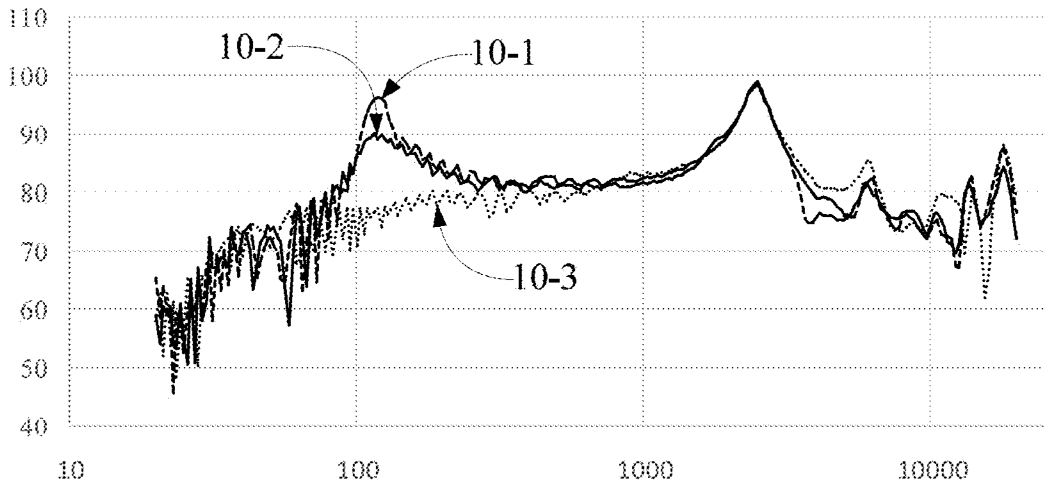
FIG. 12 is a schematic diagram illustrating exemplary frequency response curves of air conduction at sound conduction parts according to some embodiments of the present disclosure.

FIG. 12 is a schematic diagram illustrating exemplary frequency response curves of air conduction at sound conduction parts according to some embodiments of the present disclosure. As shown in FIG. 12, as the actual area of the outlet end of the pressure relief hole 114 increases, the exhausting of the front cavity 111 may be smoother, and the peak resonance strength of the low frequency band or the middle low frequency band may increase significantly. When the outlet end of the pressure relief hole 114 includes an acoustic resistance net 1140, the exhausting of the front cavity 111 may be affected to a certain extent, so that the middle low frequency of the air conduction sound output through a sound hole 113 to the outside of an acoustic output device 100 may decrease, and the frequency response curve may be relatively flat.

In some embodiments, combining the table below to adjust the actual area of the outlet end of the pressure relief hole 114 and the acoustic resistance of the acoustic resistance net 1140 covered on it. In this way, different sizes of pressure relief holes 114 and acoustic resistance nets 1140 with different acoustic resistance may be combined, and the frequency response curves of the air conduction sound output through the sound hole 113 to the outside of the acoustic output device 100 may be generally consistent. Among them, if the acoustic resistance nets 1140 with a porosity of 14% may be simply regarded as a single-layer net, then the acoustic resistance nets 1140 with a porosity of 7% may simply be regarded as a double-layer net.

| Frequency response curve | | Actual area/mm$^2$ | Acoustic resistance/MKSrayls | porosity | Layer No. |
|---|---|---|---|---|---|
| 11-1 | 12-1 | 2.76 | 0 | 100% | 0 |
| 11-2 | 12-2 | 31.57 | 145 | 14% | 1 |
| 11-3 | 12-3 | 71.48 | 290 | 7% | 2 |

Figure 13:
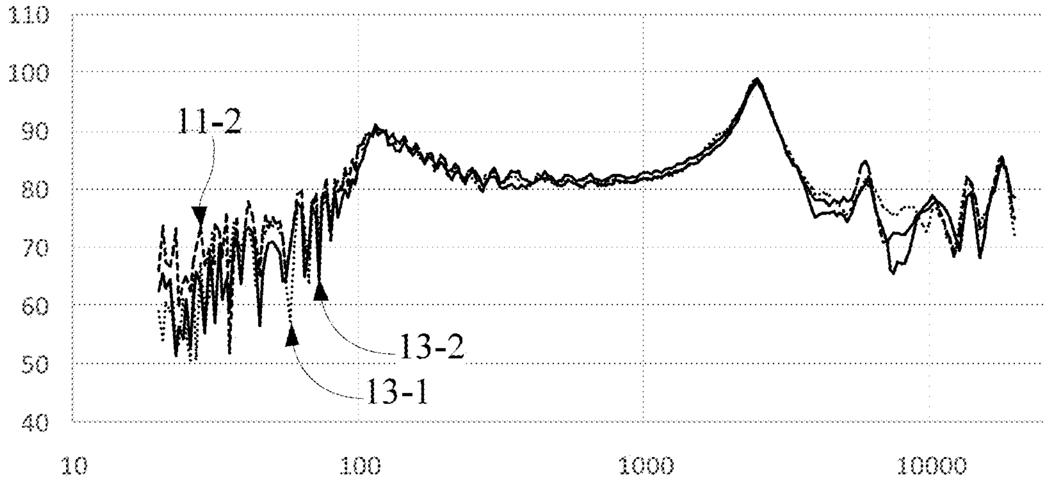
FIG. 13 is a schematic diagram illustrating exemplary frequency response curves of air conduction at sound conduction parts according to some embodiments of the present disclosure.
Figure 14:
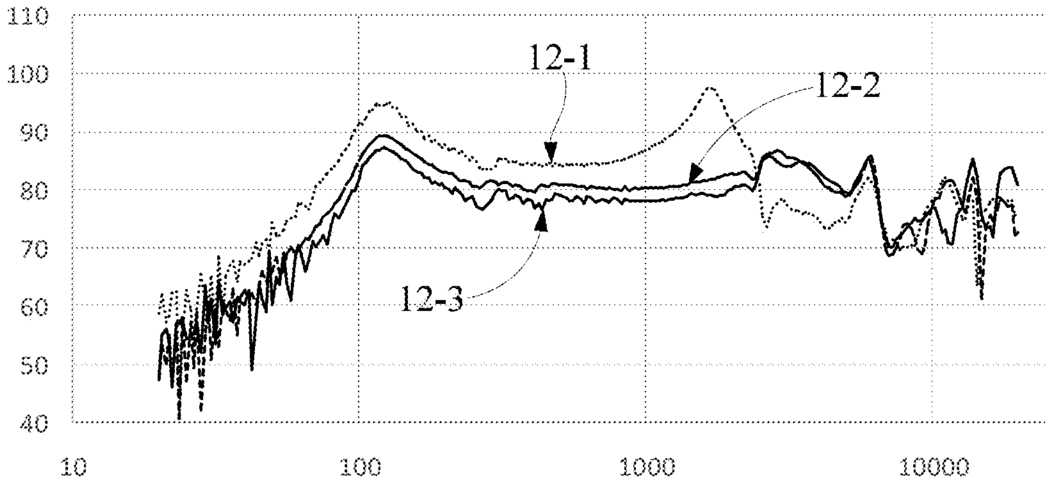
FIG. 14 is a schematic diagram illustrating exemplary frequency response curves of air conduction at pressure relief holes according to some embodiments of the present disclosure.

FIG. 13 is a schematic diagram illustrating exemplary frequency response curves of air conduction at sound conduction parts according to some embodiments of the present disclosure. FIG. 14 is a schematic diagram illustrating exemplary frequency response curves of air conduction at pressure relief holes according to some embodiments of the present disclosure. As shown in FIG. 13, the larger the actual area of the outlet end of the pressure relief hole 114 is, the larger the acoustic resistance of the corresponding acoustic resistance net will be, so that the active areas of the outlet end of the pressure relief hole 114 may be roughly consistent, and the smoothness of the exhausting of the front cavity 111 may be roughly the same, and then the frequency response curves of the air conduction sound output through the sound hole 113 to the outside of the acoustic output device 100 may be generally consistent. However, as shown in FIG. 14, although the frequency response curves of the air conduction sound output through the sound hole 113 to the outside of the acoustic output device 100 may be generally consistent, the frequency response curves of the air conduction sound output through the pressure relief hole 114 to the outside of the acoustic output device 100 may not be consistent, that is, the sound leakage of the pressure relief hole 114 may be different. With the increase of the actual area of the outlet end of the pressure relief hole 114 and the increase of the acoustic resistance of the acoustic resistance net 1140, the frequency response curve of the air conduction sound output through the pressure relief hole 114 to the outside of the acoustic output device 100 may move down as a whole. That is to say, the sound leakage of the pressure relief hole 114 may be weakened accordingly. In other words, when ensuring the frequent response curve of the air conduction sound at the sound conduction assembly 14 remains unchanged, the size of the pressure relief hole 114 may be increased as much as possible, and at the same time the acoustic resistance of the acoustic resistance net 1140 on the pressure relief hole 114 may be increased, to minimize the sound leakage at the pressure relief hole 114. It may be seen that on the premise of ensuring the active area of the outlet end of the pressure relief hole 114 is less than or equal to 2.76 mm$^2$, the sound leakage at the pressure relief hole 114 may be decreased through increasing the actual area of the outlet end of the pressure relief hole 114 and the porosity of the acoustic resistance net 1140.

It should be noted that as the size of the core housing 11 is limited, a single pressure relief hole 114 may not be too large. In some embodiments, there may be at least one or at least two pressure relief holes 114, such as the three holes in the following description.

Based on the above detailed description, in some embodiments, the active area of the outlet end of the sound conduction channel 141 may be greater than the active area of the outlet end of each pressure relief hole 114, so that users may hear the air conduction sound output through the sound hole 113 to the outside of the acoustic output device 100. Based on the definition of the active area, the actual area of the outlet end of the sound conduction channel 141 may be greater than the actual area of the outlet end of each pressure relief hole 114. Further, the active area of the outlet end of the sound conduction channel 141 may be greater than or equal to the total active area of the outlet end of all the pressure relief holes 114. The ratio between the total active area of the outlet ends of all pressure relief holes 114 and the active area of the outlet end of the sound conduction channel 141 may be greater than or equal to a third area threshold. For example, the ratio between the total active area of the outlet ends of all pressure relief holes 114 and the active area of the outlet end of the sound conduction channel 141 may be greater than or equal to 0.15. For another example, the active area of the outlet end of the comprehensive pressure relief hole 114 may be greater than or equal to 2.5 mm$^2$. In this way, to ensure the smooth exhausting of the front cavity 111, and further to improve the acoustic expressiveness of the air conduction sound output through the sound hole 113 to the outside of the acoustic output device 100, and to reduce the sound leakage at the pressure relief hole 114.

In some embodiments, the actual area of the outlet end of the sound conduction channel 141 may be greater than or equal to a fourth area threshold. For example, the actual area of the outlet end of the sound conduction channel 141 may be greater than or equal to 4.8 $mm^2$. For another example, the actual area of the outlet end of the sound conduction channel 141 may be greater than or equal to 8 $mm^2$. Correspondingly, the total actual area of the outlet ends of all pressure relief holes 114 may be greater than or equal to a fifth area threshold. For example, the total actual area of the outlet ends of all pressure relief holes 114 may be greater than or equal to 2.6 $mm^2$. For another example, the total actual area of the outlet ends of all pressure relief holes 114 may be greater than or equal to 10 $mm^2$. In some embodiments, when the count of pressure hole 114 is one, the total actual area of the outlet end of all pressure relief holes 114 may be the area of the outlet end of one pressure relief hole 114. The situation of a sound-tuning hole 117 may be similar. In some embodiments, the actual area of the outlet end of the sound conduction channel 141 may be 25.3 $mm^2$. There may be three pressure relief holes, such as the first pressure relief hole 1141, the second pressure relief hole 1142, and the third pressure relief hole 1143 mentioned in the later descriptions, the actual areas thereof may be 11.4 $mm^2$, 8.4 $mm^2$, 5.8 $mm^2$, respectively.

In some embodiments, the outlet end of the sound conduction channel 141 may be covered with the acoustic resistance net 140, and at least part of the outlet end of the pressure relief hole 114 may be covered with an acoustic resistance net 1140. The porosity of the acoustic resistance net 1140 may be less than or equal to the porosity of the acoustic resistance net 140. In some embodiments, the porosity of the acoustic resistance net 140 may be greater than or equal to a preset gap rate threshold. For example, the porosity of the acoustic resistance net 140 may be greater than or equal to 13%. For another example, the porosity of the acoustic resistance net 140 may be greater than or equal to 7%.

Figure 15:
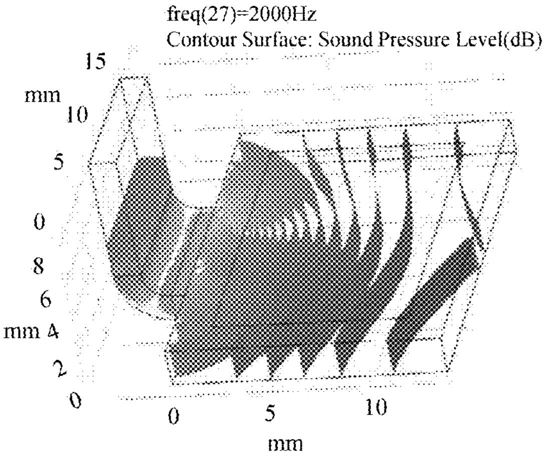
FIG. 15 illustrates sound pressure distributions of a rear wall before and after setting a sound hole on a speaker assembly according to some embodiments of the present disclosure.
Figure 15:
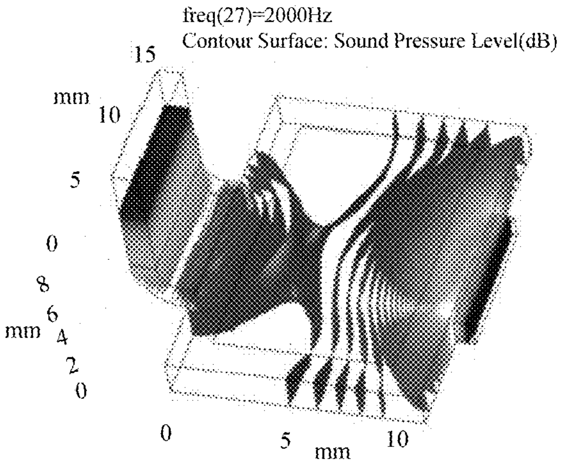

Based on the above descriptions, the sound conduction channel 141 communicates with a rear cavity 112 through the sound hole 113. They may form a typical Helmholtz resonance cavity structure and have a resonance peak. We may study the distribution of sound pressure in the rear cavity 112 when the Helmholtz resonance cavity structure is resonated. FIG. 15 illustrates sound pressure distributions of a rear wall before and after setting a sound hole on a speaker assembly according to some embodiments of the present disclosure. Combining (A) in FIG. 15, a high-pressure area away from the sound hole 113 and a low-pressure area close to the sound hole 113. Further, when the Helmholtz resonance cavity structure is resonated, it may be considered that a standing wave appears in the rear cavity 112. The wavelength of the standing wave may be corresponding to the size of the rear cavity 112. For example, the deeper the cavity 112 is, that is, the longer the distance between the low-pressure area and the high-pressure area is, the longer wavelength of the standing wave will be. Combining (b) in FIG. 15, by destroying the high-pressure area, such as the configuring the through hole communicating with the rear cavity 112 in the high-pressure area, so that the sound should be reflected in the high-pressure area may not be reflected, and the above standing wave may not be formed. At this time, when the Helmholtz resonance cavity structure is resonated, the high-pressure area in the rear cavity 112 will move in the direction near the low-pressure area, so that the wavelength of the standing wave may be shorter, and the resonance frequency of the Helmholtz resonance cavity structure may be improved.

Please continue to see FIG. 4, a machine shell body 11 may further be configured with a sound-tuning hole 117 communicating with the rear cavity 112. Under the same conditions, the high-pressure area configured by the sound-tuning hole 117 in the rear cavity 112 may most effectively destroy the high-pressure area. Of course, the sound-tuning hole 117 may further be at any area between the high-pressure area and the low-pressure area within the rear cavity 112. Exemplarily, the sound-tuning hole 117 may be configured on the rear shell 115, and it may be configured on both sides of the transducer 12 opposite to the sound hole 113 and its sound conduction assembly 14.

Figure 16:
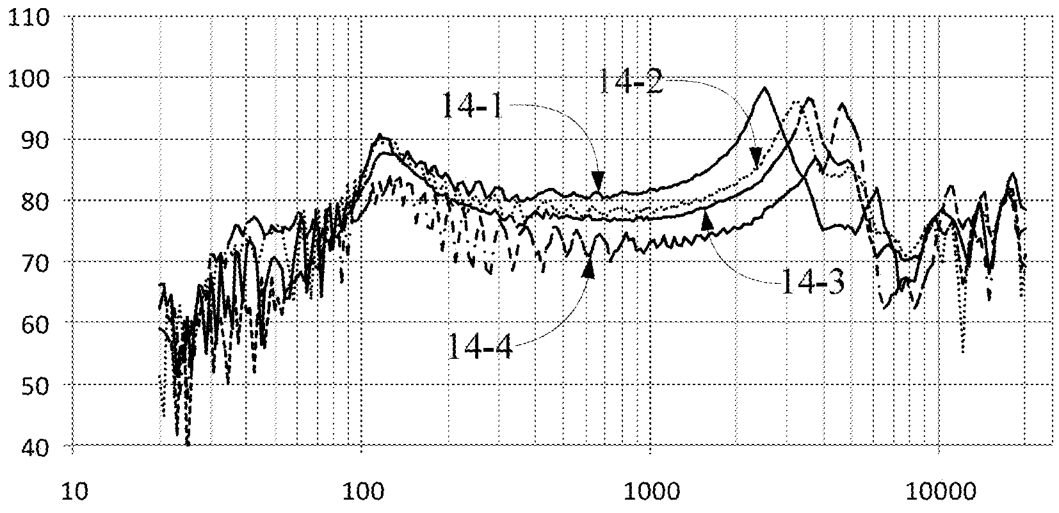
FIG. 16 is a schematic diagram illustrating exemplary frequency response curves of air conduction at sound conduction parts according to some embodiments of the present disclosure.

FIG. 16 is a schematic diagram illustrating exemplary frequency response curves of air conduction at sound conduction parts according to some embodiments of the present disclosure. As shown in FIG. 16, the frequency response curve of the outer air condition sound output through a sound hole 113 to the outside of an acoustic output device 100 has a resonance peak. Combining the following table, in the case of no acoustic resistance net, adjusting the actual area of the outlet end of a sound-tuning hole 117, the degree of damage of the sound-tuning hole to the above high-pressure area may be adjusted, and then then adjust the peak resonance frequency of the resonance peak. When the actual area of the outlet end of the sound-tuning hole 117 is 0, it may be regarded as a closure of the sound-tuning hole 117.

| Frequency curve | Actual area/$mm^2$ |
|---|---|
| 14-1 | 0 |
| 14-2 | 1.7 |
| 14-3 | 2.8 |
| 14-4 | 28.44 |

As shown in FIG. 16, the larger the actual area of the outlet end of the sound-tuning hole 117 is, the more obvious the damage effect on the above high-pressure area will be, and the higher the peak resonance frequency of the resonance peak will be. The peak resonance frequency of the resonance peak when the sound-tuning hole 117 is open may offset towards the high frequency compared to the peak resonance frequency of the resonance peak when the sound-tuning hole 117 is closed. The offset maybe greater or equal to a first preset offset threshold. For example, the offset may be greater than or equal to 500 Hz. For another example, the above offset may be greater than or equal to 1 kHz. In some embodiments, the peak resonance frequency of the resonance peak when the sound-tuning hole 117 is open may be greater than or equal to 2 kHz, so that the acoustic output device 100 has a good music output. In some embodiments, the peak resonance frequency may be greater than or equal to a first frequency threshold. For example, the peak resonance frequency may be greater than or equal to 3.5 kHz, so that the acoustic output device 100 has a good music output effect. For another example, the peak resonance frequency may be greater or equal to 4.5 kHz.

In some embodiments, as the size of the core housing 11 is limited, a single sound-tuning hole 117 may not be too large. In some embodiments, there may be at least one sound-tuning hole, such as the two sound-tuning holes in the following description.

In some embodiments, in addition to hearing the bone conduction sound, the user may mainly hear the air conduction sound output through the sound hole 113 to the outside of the acoustic output device 100, instead of the air conduction sound output through the sound-tuning hole 117 to the outside of the acoustic output device 100. Therefore, the active area of the outlet end of the sound conduction channel 141 may be designed to be larger than the sound-tuning hole 117.

As shown in FIG. 16 and FIG. 15, as the sound-tuning hole 117 is added in the rear cavity 112, a part of sound may leak from the sound-tuning hole 117, that is, a sound leakage may form at the sound-tuning hole 117. As a result, the frequency response curve of the air conduction sound output through the sound hole 113 to the outside of the acoustic output device 100 may move down as a whole. For this reason, As shown in FIG. 3, at least part of the outlet of the sound-tuning holes 117 may be covered with an acoustic resistance net 1170 to destroy the high-pressure area in the rear cavity 112 and avoid sound leakage from the sound-tuning hole 117 as much as possible. Combining the following table, by adjusting the active area of the outlet end of the sound-tuning hole 117, such as the actual area of the outlet end of the sound-tuning hole 117 and/or the acoustic resistance of the sound resistance net 1170 covered on it, the air conduction sound output through the sound hole 113 to the outside of the acoustic output device 100 may be changed.

| Frequency response curve | Sound resistance/MKSrayls |
|---|---|
| 15-1 | No sound-tuning hole |
| 15-2 | 0 |
| 15-3 | 145 |

Figure 17:
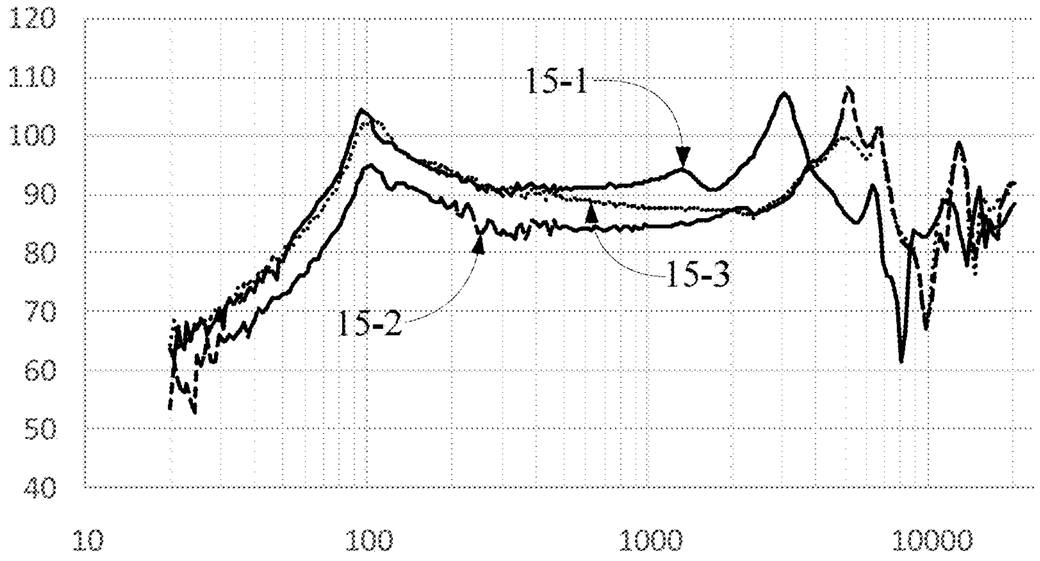
FIG. 17 is a schematic diagram illustrating exemplary frequency response curves of air conduction at sound conduction parts according to some embodiments of the present disclosure.

FIG. 17 is a schematic diagram illustrating exemplary frequency response curves of air conduction at sound conduction parts according to some embodiments of the present disclosure. As shown in FIG. 17, the outlet of a sound-tuning hole 117 is added with an acoustic resistance net 1170. This may ensure that there is no significant reflected sound (that is, there is no standing wave, no hard sound field boundary) at the sound-tuning hole 117 in a rear cavity 112, making the high-pressure area in the rear cavity 112 move inside. This may further avoid sound leakage from the sound-tuning hole 117 to a certain extent, so that more sound may be output through a sound hole 113 to the outside of an acoustic output device 100. Furthermore, the peak resonance intensity of the middle low frequency band may increase significantly, and the volume of the air conduction sound may increase. The peak resonance strength of the high-frequency band may further reduce to a certain extent, so that the frequency response curve may be flatter in the high frequency band, and the high frequency sound quality may be more balanced.

Based on the above detailed description, in some embodiments, an active area of the outlet end of the sound conduction channel 141 may be greater than the active area of the outlet end of each sound-tuning hole 117, so that users may hear the air conduction sound output through the sound hole 113 to the outside of the acoustic output device 100. Based on the definition of the active area, the actual area of the outlet end of the sound conduction channel 141 may be greater than the active area of the outlet end of each sound-tuning hole 117. In some embodiments, the active area of the outlet end of the sound conduction channel 141 may be greater than the sum of the active area of the outlet ends of all sound-tuning holes 117. The ratio between the sum of the active area of the outlet ends of all sound-tuning holes 117 and the active area of the outlet end of the sound conduction channel 141 may be greater than or equal to 0.08. In some embodiments, the sum of the active area of the outlet ends of all sound-tuning holes 117 may be greater than or equal to 1.5 $mm^2$. In some embodiments, when there is only one sound-tuning hole 117, the sum of the active area of the outlet end of all sound-tuning holes 117 equals to the active area of the outlet end of a sound-tuning hole 117. The situation of a pressure relief hole 114 may be similar. In this way, the peak resonance frequency of the resonant peak of the air conduction sound output through a sound hole 113 to the outside of an acoustic output device 100 may be offset to the high frequency as much as possible, and the sound leakage at the sound-tuning hole 117 may be reduced.

In some embodiments, the sum of the actual area of the outlet ends of all sound-tuning holes 117 may be greater or equal to 5.6 $mm^2$. In some embodiments, there may be two sound-tuning holes 117, such as a first sound-tuning hole 1171 and a second sound-tuning hole 1172 mentioned in the following description. The actual area of the outlet ends may be 7.6 $mm^2$ and 5.6 $mm^2$, respectively.

In some embodiments, the outlet end of the sound conduction channel 141 may be covered with an acoustic resistance net 140, and at least part of the outlet of the sound-tuning holes 117 may be covered with an acoustic resistance net 1170. The pore rate of the acoustic resistance net 1170 may be less than or equal to the pore rate of 140 acoustic resistance net. In some embodiments, the pore rate of the acoustic resistance net 140 may be greater than or equal to 13%, and the porosity of the acoustic resistance net 1170 may be less than or equal to 16%.

Based on the above descriptions, for the pressure relief hole 114 and the sound hole 113, the phases of the air conduction sounds output through the two to the outside of the acoustic device 100 may be opposite, making the pressure relief hole 114 and the sound hole 113 staggered as much as possible, so as to avoid the coherent cancellation of the air-conducted sound output to the outside of the acoustic output device 100 through the two. To this end, the pressure relief hole 114 may stay away from the sound hole 113 as much as possible. For sound-tuning hole 117 and sound hole 113, if the area where sound hole 113 locates is simply regarded as a low-pressure area within the rear cavity 112, then the area in the rear cavity 112 that is farthest from the area where the sound hole 113 is located may simply be regarded as the high-pressure area in the rear cavity 112. The sound-tuning hole 117 may preferably be arranged in the high-pressure area in the rear cavity 112 to destroy the original high-pressure area and move it to the low-pressure area. To this end, the sound-tuning hole 117 may stay away from the sound hole 113 as much as possible.

In some embodiments, as a front cavity 111 communicates with the pressure relief hole 114, the acoustic hole 117 communicates with the rear cavity 112, so that the phases of the air conduction sound output through the pressure relief hole 114 and the sound-tuning hole 117 to the outside of the acoustic output device 100 may be reversed. Therefore, the sound leakage from the pressure relief hole 114 and the sound-tuning hole 117 may be reduced by coherent cancellation. In some embodiments, at least part of the pressure relief holes 114 and at least part of the sound-tuning holes 117 may be arranged next to each other to create the condition for coherent cancellation. To coherently cancel the sound leakage of the pressure relief holes 114 and the sound-tuning holes 117, the distance between the two should be as small as possible. For example, the minimum distance between the outlines of the outlet ends of the pressure relief holes 114 and the sound-tuning holes 117 may be less than or equal to 2 mm. In addition, the peak resonance frequency and/or peak resonance strength of the resonance peaks of the air conduction sound output through the pressure relief hole 114 and the sound-tuning hole 117 to the outside of the acoustic output device 100 should be matched as much as possible. However, in the actual product design, due to the specific structure and craft tolerance, it is generally difficult to control the peak resonance frequency and/or peak resonance strength of the resonance peaks of the two air conduction sounds to be exactly the same. Therefore, in the designing process, it should be ensured that the peak resonance frequency and/or peak resonance strength of the resonance peaks of the two air conduction sounds may not differ too much.

Figure 18:
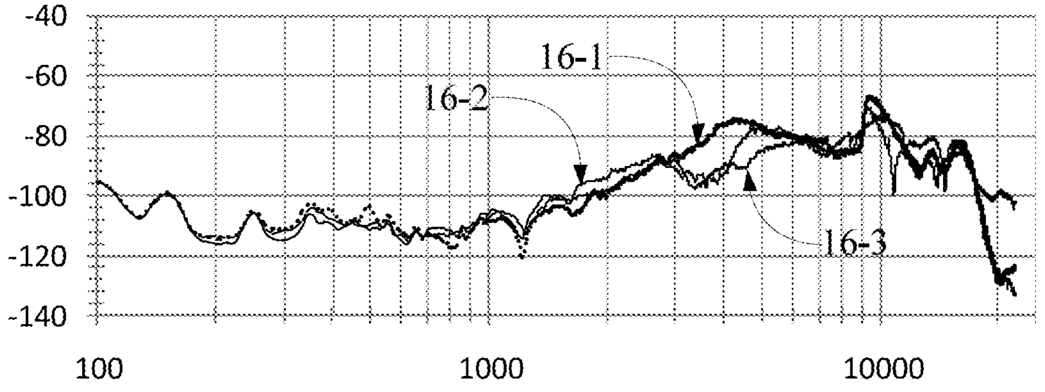
FIG. 18 is a schematic diagram illustrating exemplary frequency response curves of sound leakages of a speaker assembly according to some embodiments of the present disclosure.

FIG. 18 is a schematic diagram illustrating exemplary frequency response curves of sound leakages of a speaker assembly according to some embodiments of the present disclosure. As shown in FIG. 18, the frequency response curve of the air conduction sound output through the pressure relief hole 114 to the outside of the acoustic output device 100 has a first resonance peak f1, and the frequency response curve of the air conduction sound output through the sound-tuning hole 117 to the outside of the acoustic output device 100 has a second resonance peak f2. Combining the table below, the peak resonance frequency of the first resonance peak and the peak resonance frequency of the second resonance peak may be greater than or equal to 2 kHz, respectively, and $|f1-f2|/f1 \leq 60\%$. As the difference between the peak resonance frequency of the first resonance peak and the peak resonance frequency of the second resonance peak gradually decreases, the band width that may reduce sound leakage may be wider, that is, the frequency response curve may become relatively flat, which means that the sound leakage of the acoustic output device 100 is reduced, and the effect of coherent cancellation of the air conduction sounds output through the pressure relief hole 114 and the sound-tuning hole 117 to the outside of the acoustic output device 100 may be good. For example, the peak resonance frequency of the first resonance peak and the peak resonance frequency of the second resonance peak may be greater than or equal to 3.5K respectively, and $|f1-f2| \leq 2$ kHz. In this way, the air conduction sounds output through the pressure relief hole 114 and the sound-tuning hole 117 to the outside of the acoustic output device 100 may be coherently cancelled in the high frequency.

| Frequency response curve | peak resonance frequency of f1/Hz | peak resonance frequency of f2/Hz |
|---|---|---|
| 16-1 | 3500 | 5600 |
| 16-2 | 4500 | 5600 |
| 16-3 | 5000 | 5600 |

Furthermore, as a front cavity 111 is arranged with a coil support 121, a leaf spring 124 and other structural assemblies in it, the wavelength of the standing wave of the front cavity 111 may be relatively long; the sound-tuning holes 117 and sound hole 113 may destroy the high-pressure area of each other, so that the wavelength of the standing wave in the rear cavity 112 may be relatively short. In this way, the peak resonant frequency of the first resonant peak may be generally less than the peak resonant frequency of the second resonant peak. In some embodiments, to make the air conduction sounds output through the pressure relief hole 114 and the sound-tuning hole 117 to the outside of the acoustic output device 100 coherently cancel, the peak resonance frequency of the first resonance peak should be offset to the high frequency as much as possible, so that it may be further close to the second resonance peak. To this end, based on the Helmholtz resonance cavity model, among the adjacently arranged pressure relief holes 114 and sound-tuning holes 117, the active area of the outlet end of the pressure relief hole 114 may be larger than that of the sound-tuning hole 117. The ratio between the active area of the outlet end of the pressure relief hole 114 and the active area of the outlet end of the sound-tuning hole 117 in the adjacently arranged pressure relief holes 114 and the sound-tuning holes 117 may be less than or equal to 2. In some embodiments, in the adjacently arranged pressure relief holes 114 and the sound-tuning holes 117, the actual area of the outlet end of the pressure relief hole 114 may be larger than that of the sound-tuning hole 117. Furthermore, the outlet ends of the adjacently arranged pressure relief holes 114 and the sound-tuning holes 117 may further be covered with acoustic resistance nets 1140 and acoustic resistance nets 1170, and the porosity of acoustic resistance nets 1140 may be greater than that of acoustic resistance nets 1170.

Figure 19:
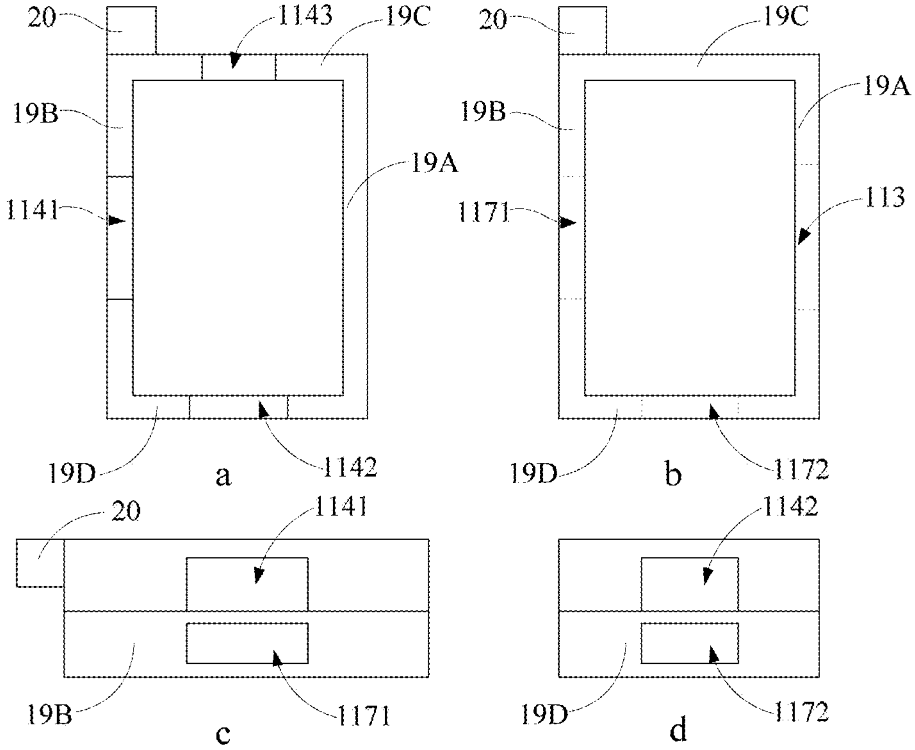
FIG. 19 is a schematic diagram illustrating an exemplary speaker assembly according to some embodiments of the present disclosure.

FIG. 19 is a schematic diagram illustrating an exemplary speaker assembly according to some embodiments of the present disclosure. As shown in FIG. 19 (*a*), pressure relief holes 114 may include a first pressure relief hole 1141 and a second pressure relief hole 1142. The first pressure relief hole 1141 may be arranged away from the sound hole 113 compared to the second pressure relief hole 1142. At this time, the active area of the outlet end of the first pressure relief hole 1141 may be greater than that of the second pressure relief hole 1142. In this way, the balance between the size of a core housing 11 and the exhausting requirement of the front cavity 111 may be achieved. At the same time, the first pressure relief hole 1141 with larger exhaust volume may be kept as far away from the sound hole 113 as possible, so that the impacts of sound leakage at the pressure relief hole 114 on the sound hole 113 may be reduced. In some embodiments, the pressure relief hole 114 may further include a third pressure relief hole 1143. The first pressure relief hole 1141 may be arranged away from the sound hole 113 compared to the third pressure relief hole 1143. The active area of the outlet end of the second pressure relief hole 1142 may be greater than that of the third pressure relief hole 1143.

In some embodiments, As shown in FIG. 19 (*a*) and FIG. 4, the sound hole 113 and the first pressure relief hole 1141 may be arranged on opposite sides of the transducer 12; the second pressure relief hole 1142 and the third pressure relief hole 1143 may be arranged opposite to each other, and between the sound hole 113 and the first pressure relief hole 1141.

In some embodiments, at least part of the outlet end of the pressure relief hole 114 may be covered with an acoustic resistance net 1140 to facilitate the adjustment of the active area of the outlet end of the pressure relief hole 114. In this embodiment, the outlet ends of the pressure relief holes 114 are respectively covered with acoustic resistance nets 1140 with the same acoustic resistance as an example for illustrative description. In this way, the acoustic expressiveness and the waterproof and dustproof performance of the acoustic output device 100 may be improved, and the situation where mixing of the acoustic resistance net 1140 due to too many types of specifications may be avoided. In some embodiments, the active area of the outlet end of the pressure relief holes 114 may be obtained by adjusting the corresponding actual area. For example, the actual area of the outlet end of the first pressure relief hole 1141 may be greater than that of the second pressure relief hole 1142, the actual area of the outlet end of the second pressure relief hole 1142 may be greater than that of the third pressure relief hole 1143.

In some embodiments, as shown in FIG. 19 (*b*), the sound-tuning holes 117 may include a first sound-tuning hole 1171 and a second sound-tuning hole 1172. The first sound-tuning hole 1171 may be arranged further away from the sound hole 113 compared to the second sound-tuning hole 1172. At this time, the active area of the outlet end of the first sound-tuning hole 1171 may be greater than that of the second sound-tuning holes 1172, so that the high-pressure area within the rear cavity 112 may be destroyed. In this way, the balance between the size of the core housing 11 and the requirement of the sound-tuning hole destroying the high-pressure area of rear cavity 112 may be achieved, the resonance frequency of the air conduction sound at the sound hole 113 may be as high as possible, and the first sound-tuning hole 1171 with a relatively large degree of damage may be kept as far away as possible from the sound hole 113.

In some embodiments, As shown in FIG. 19 (*b*) and FIG. 4, the sound hole 113 and the first sound-tuning hole 1171 may be located on the opposite sides of the transducer 12; the second sound-tuning hole 1172 may be between the sound hole 113 and the first sound-tuning hole 1171.

In some embodiments, at least part of the outlet end of the tuning hole 117 may be covered with an acoustic resistance net 1170 to facilitate adjusting the active area of the outlet end of the sound-tuning hole 117. In the embodiments of the present disclosure, the outlet ends of the sound-tuning holes 117 may be respectively covered with acoustic resistance nets 1170 with the same acoustic resistance as an example for illustrative description. In this way, the acoustic expressiveness and the waterproof and dustproof performance of the acoustic output device 100 may be improved, and the situation where mixing of the acoustic resistance net 1170 due to too many types of specifications may be avoided. In some embodiments, the active area of the outlet end of the sound-tuning holes 117 may be obtained by adjusting the corresponding actual area. For example, the actual area of the outlet end of the first sound-tuning hole 1171 may be larger than that of the second sound-tuning hole 1172. In some embodiments, the actual area of the outlet end of the first sound-tuning hole 1171 may be larger than or equal to a sixth area threshold. For example, the actual area of the outlet end of the first sound-tuning hole 1171 may be larger than or equal to 3.8 $mm^2$. The actual area of the outlet of the second sound-tuning hole 1172 may be larger than or equal to a seventh area threshold. For example, the actual area of the outlet end of the second sound-tuning hole 1172 may be larger than or equal to 2.8 $mm^2$.

In some embodiments, Combining (c) and (d) in FIG. 19, the first pressure relief hole 1141 and the first sound-tuning hole 1171 may be adjacently arranged, the second pressure relief hole 1142 and the second pressure relief hole 1142 may further be adjacently arranged. In this way, the air conduction sounds output through the first pressure relief hole 1141 and the first sound-tuning hole 1171 to the outside of the acoustic output device 100 may be coherently cancelled, the air conduction sounds output through the second pressure relief hole 1142 and the second sound-tuning hole 1172 to the outside of the acoustic output device 100 may be coherently cancelled.

In some embodiments, the active area of the outlet end of the first pressure relief hole 1141 may be larger than that of the first sound-tuning hole 1171, so that the peak resonance frequency of the resonant peak of the air conduction sound output through the first pressure relief hole 1141 to the outside of the acoustic output device 100 may be offset to the high frequency as much as possible to approach the peak resonance frequency of the air conduction sound output through the first sound-tuning hole 1171 to the outside of the acoustic output device 100 as much as possible, so that the air conduction sounds output through the first pressure relief hole 1141 and the first sound-tuning hole 1171 to the outside of the acoustic output device 100 may be coherently cancelled. In some embodiments, the active area of the outlet end of the second pressure relief hole 1142 may be greater than that of the second sound-tuning hole 1172, which will not be repeated here.

In some embodiments, similar to the sound-tuning holes 117 destroying the high-pressure area within the rear cavity 112, the second pressure relief hole 1142 and the third pressure relief hole 1143 may destroy the high-pressure area within the front cavity 111, reducing the wavelength of the standing waves in the front cavity 111, and further enabling the peak resonance frequency of the resonant peak of the air conduction sound output through the first pressure relief hole 1141 to the outside of the acoustic output device 100 may be offset to the high frequency, so that it may be coherently cancelled with the air conduction sound output through the first tuning-hole 1171 to the outside of the acoustic output device 100. For example, the offset may be greater than or equal to 500 Hz, while the peak resonance frequency of the resonance peak may be greater than or equal to 2 kHz. For another example, the offset may be greater than or equal to 1 kHz. In some embodiments, the peak resonance frequency of the resonant peak of the air conduction sound output through the second pressure relief hole 1142 to the outside of the acoustic output device 100 may further be offset to the high frequency. In short, the frequency response curve of the air conduction sound output through the pressure relief hole 114 arranged adjacently to the sound-tuning hole 117 to the outside of the acoustic device 100 may have a first resonance peak, the peak resonance frequencies of the resonance peaks of the pressure relief holes 114 other than the pressure relief holes 114 arranged adjacent to the sound adjustment holes 117 when the pressure relief holes 114 are in the open state are compared with the peak resonance frequencies of the resonance peaks when the other pressure relief holes 114 are in the closed state Shift to high frequencies. The peak resonance frequency of the resonance peaks when the pressure relief hole 114 is open may be greater than or equal to 2 kHz.

As shown in FIG. 19 and FIG. 4, the core housing 11 may include a first side wall 19A and a second side wall 19B arranged on opposite sides of the transducer 12, and a third side wall 19C and a fourth side wall 19D, which connect the first side wall 19A and may be arranged separately to each other. In short, the core housing 11 may be simplified into a rectangular frame. Of course, the third side wall 19C and the fourth side wall 19D may further be arranged in arcs, so that the core housing 11 may be configured like a runway. The first side wall 19A may be closer to the human ear compared to the second side wall 19B. The third side wall 19C may be closer to an ear hanger assembly 40 than the fourth side wall 19D. Further, the sound hole 113 may be configured on the first side wall 19A, so that users may hear the air conduction sound output through the sound hole 113 and the sound conduction channel 141 to the outside of the acoustic output device 100. The first pressure relief hole 1141 and the first sound-tuning hole 1171 may be configured on the second side wall 19B, respectively, so that they may be far away from the sound hole 113. Correspondingly, the second pressure relief hole 1142 and the second sound-tuning hole 1172 may be configured on one of the third side wall 19C and the fourth side wall 19D, and the third pressure relief hole 1143 may be configured on one of the third side wall 19C and the fourth side wall 19D.

Based on the above descriptions, and As shown in FIG. 4 and FIG. 19, in some embodiments, the pressure relief hole 114 may enable the front cavity 111 to communicate with the outside of the acoustic output device 100, and the sound-tuning hole 117 may enable the rear cavity 112 to communicate with the outside of the acoustic output device 100; and at least part of the pressure relief holes 114 and at least part of the sound-tuning holes 117 may further be arranged adjacently, the distance between the pressure relief holes 114 and the sound-tuning holes 117 may be less than or equal to 2 mm. The second pressure relief 1142 may be adjacent to the second sound-tuning hole 1172. In some embodiments, a speaker assembly 10 may further include a protective cover 15, and the protective cover 15 may be covered in a periphery of the pressure relief holes 114 and the sound-tuning holes 117. The protective cover 15 may be woven from metal wires. The diameter of the metal wires may be 0.1 mm, and a hole number (or hole count) of protective cover 15 may be 90-100, so that it has a certain structural strength and good air permeability. In this way, foreign objects may be prevented from intruding into a core module 10, and the acoustic expressiveness of the acoustic output device 100 may not be affected. In this way, the protective cover 15 may further cover the adjacent pressure relief holes 114 and sound-tuning holes 117 at the same time, that is, "one cover covers two holes", which greatly reduces the material and improves the appearance quality of the acoustic output device 100.

Figure 20:
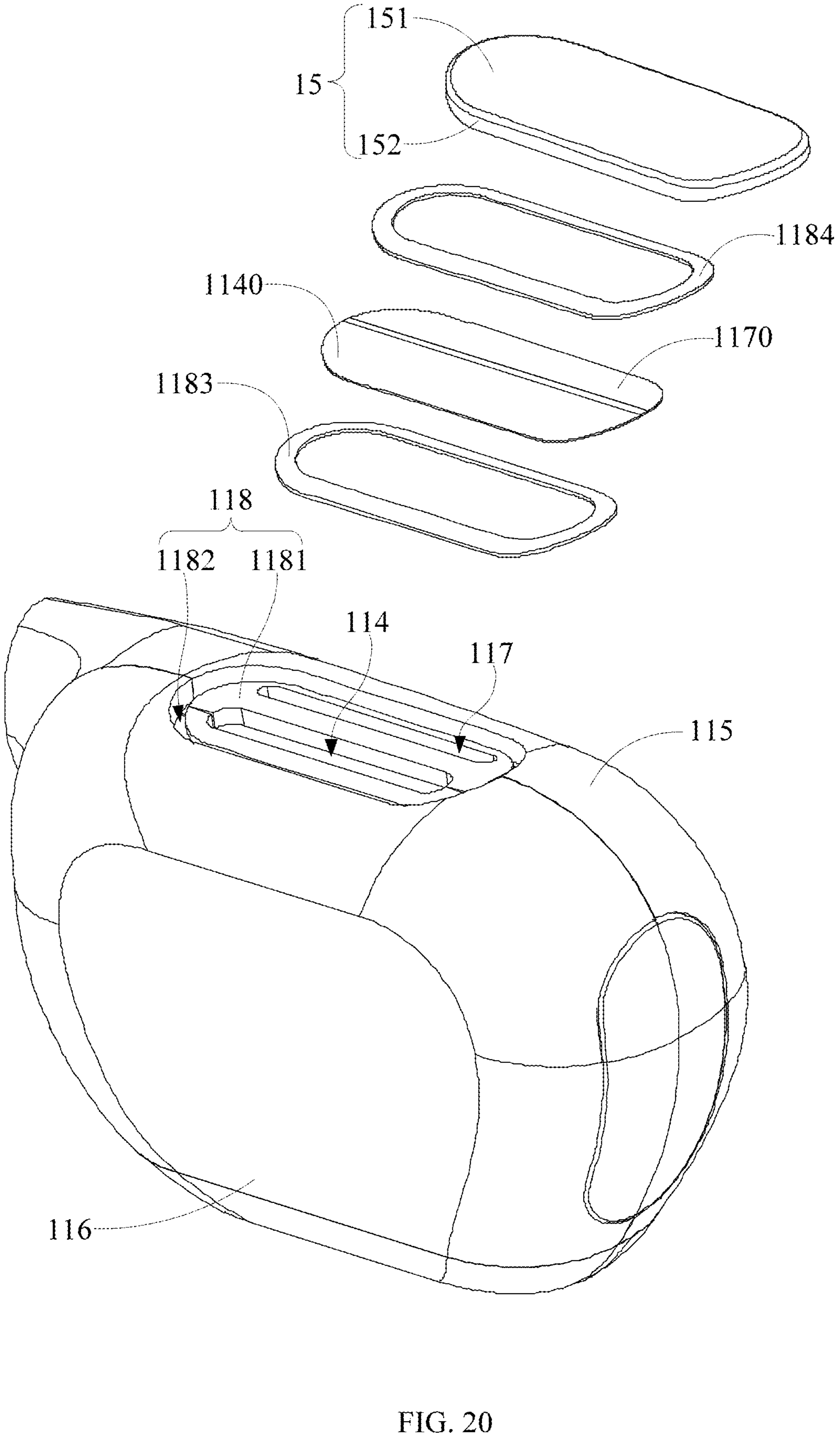
FIG. 20 is a schematic diagram illustrating an exploded view of a speaker assembly according to some embodiments of the present disclosure.

FIG. 20 is a schematic diagram illustrating an exploded view of a speaker assembly according to some embodiments of the present disclosure. In some embodiments, as shown in FIG. 20, an outer surface of a core housing 11 may be configured with an accommodating area 118, which communicates with the outlet ends of adjacently arranged pressure relief hole 114 and sound-tuning hole 117. At this time, a protective cover 15 may be configured like a plate, and may be fixed in the accommodating area 118 in one or the combinations of the connection modes, including clamping, gluing, welding, and other connection modes. For example, the protective cover 15 may be to glued or welded to the bottom of the accommodating area 118 to cover the pressure relief hole 114 and the sound-tuning hole 117. The outer surface of the protective cover 15 may be flush with the outer surface of the core housing 11 or may have a have a circular arc transition to improve the appearance quality of the acoustic output device 100.

In some embodiments, there may further be a boss 1181 within the accommodating area 118, which may be spaced apart from the sidewall of the accommodating area 118 to form an accommodating slot 1182 surrounding the boss 1181. The width of the accommodating slot 1182 may be less than or equal to 0.3 mm. At this time, the outlet end of the pressure relief hole 114 and the sound-tuning hole 117 may be located at the top of the boss 1181, that is, the accommodating slot 1182 may surround the pressure relief hole 114 and the sound-tuning hole 117. Correspondingly, the protective cover 15 may include a main cover plate 151 and an annular side plate 152, and the annular side plate 152 may be connected to the edge of the main cover plate 151 by bending to extend toward the side of the main cover plate 151. The height of the annular side plate 152 compared with the main cover plate 151 may be between 0.5 mm and 1.0 mm. In this way, when the protective cover 15 is fixed in the accommodating area 118, the annular side plate 152 may further be inserted and fixed in the accommodating slot 1182 to improve the connection intensity between the protective cover 15 and the core housing 11. For example, the annular side plate 152 may be fixedly connected to the core housing 11 through the colloid (not shown in the figure) in the accommodating slot 1182. In some embodiments, the main cover plate 151 may further be connected to the top of the boss 1181 by welding. The top of the boss 1181 may be slightly lower than the outer surface of the core housing 11. For example, the difference between the top of the boss 1181 and the core housing 11 may be equal to the thickness of the main cover plate 151.

Based on the above descriptions, and As shown in FIG. 20 and FIG. 4, the outlet end of the pressure relief hole 114 and the sound-tuning hole 117 may further be respectively covered with an acoustic resistance net 1140 and an acoustic resistance net 1170, so that the active area of the pressure relief hole 114 and the sound-tuning hole 117 may be adjusted and the acoustic expressiveness of the acoustic output device 100 may be improved. At this time, the acoustic resistance net 1140 and acoustic resistance net 1170 may be fixed at the top of the boss 1181 through a first annular film 1183, and the protective cover 15 may be then fixed in the accommodating area 118. The first annular film 1183 may surround the pressure relief hole 114 and the sound-tuning hole 117 to reveal the outlet ends of the two. Further, the main cover plate 151 may further be fixed on the acoustic resistance net 1140 and acoustic resistance network 1170 through a second annular film 1184. The ring width of the first annular film 1183 and the second annular film 1184 may be between 0.4 mm and 0.5 mm, respectively, and the thicknesses thereof may be less than or equal to 0.1 mm, respectively. Of course, in some embodiments, the acoustic resistance net 1140 and the acoustic resistance network 1170 may further be pre-fixed on the protective cover 15 to form a structural assembly, and then the structure assembly may be fixed in the accommodating area 118. For example, the acoustic resistance net 1140 and the acoustic resistance net 1170 may be fixed on the same side of the main cover plate 151 through the second annular film 1184, and may be surrounded by the annular side plate 152, and further form a structural assembly with the protective cover 15. At least part of the acoustic resistance net 1140 and acoustic resistance net 1170 may be staggered, so that the outlet ends of the adjacent pressure relief hole 114 and the sound-tuning holes 117 may be covered, and the distance therebetween may be easily adapted.

It should be noted that As shown in FIG. 4, the end of a sound conduction assembly 14 departs from the core housing 11 fixedly arranged with the acoustic resistance net 140 and the corresponding protective cover 15 adopting modes the same with or similar to the modes above, so that the sound resistance net 140 may be covered at the outlet end of the sound conduction channel 141, and being covered by the corresponding protective cover 15.

Figure 21:
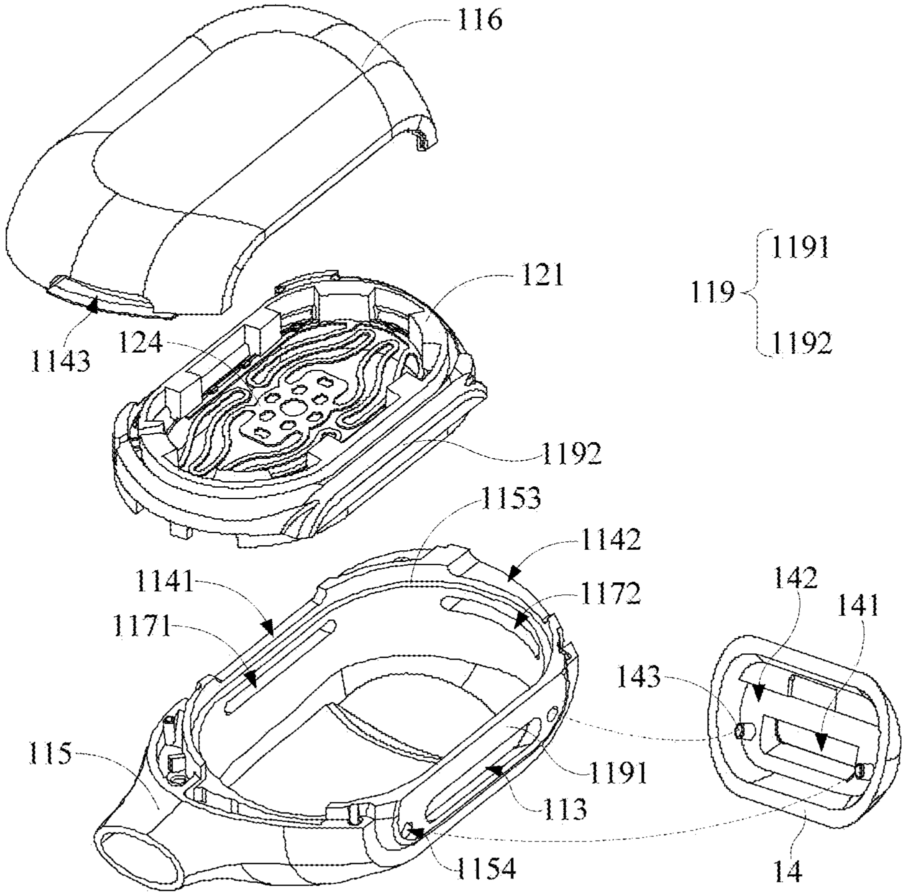
FIG. 21 is a schematic diagram illustrating an exploded view of a speaker assembly according to some embodiments of the present disclosure.

FIG. 21 is a schematic diagram illustrating an exploded view of a speaker assembly according to some embodiments of the present disclosure. As shown in FIG. 21 and FIG. 4, a coil support 121 may be exposed from the side of a front shell 116 in a direction perpendicular to the snapping direction of a rear shell 115 and the front shell 116. In other words, As shown in FIG. 5, for the front shell 116, the side of the front cylindrical side plate 1162 adjacent to a sound hole 113 or a sound conduction assembly 14 may be at least partially cut off to form an avoidance area for an exposed coil support 121. In some embodiments, the sound conduction assembly 14 may be snapped at the exposed part of the coil support 121 and the outside of the rear shell 115, and make a sound conduction channel 141 communicate with the sound hole 113. In this way, the side of the front shell 116 adjacent to the sound conduction channel 14 may not completely wrap the coil support 121, which may not only prevent a speaker assembly 10 from being too thick partly, but also does not hinder the fixing between the sound conduction assembly 14 and a core housing 11.

In some embodiments, the exposure part of the coil support 121 and the outer side surface of the rear shell 115 may cooperate to form a boss 119. The boss 119 may include a first sub-boss 1191 at the rear shell 115 and a second sub-boss 1192 at the coil support 121. At this time, the sound hole 113 may all be arranged at the rear shell 115, and the outlet end of the sound hole 113 may be located at the top of the first sub-boss 1191. Correspondingly, a depression area 142 may be provided on the side of the sound conduction assembly 14 facing the coil support 121 and the rear shell 115. At this time, the inlet end of the sound conduction channel 141 may be connected to the bottom of the depression area 142. In this way, when the sound conduction assembly 14 is assembled with the core housing 11, the boss 119 may be embedded in the depression area 142, enabling the sound conduction channel 141 to communicate with the sound hole 113. As shown in FIG. 3, the height of the boss 119 and the depth of the depression area 142 may satisfy the following relationship: when the top of the boss 119 touches the bottom of the depression area 142, the end surface of the sound conduction assembly 14 may just touch the core housing 11, or a gap may be left between them to improve the air impermeability between the sound conduction channel 141 and the sound hole 113. In some embodiments, an annular sealing part (not shown in the figure) may further be provided between the top of the boss 119 and the bottom of the depression area 142.

In some embodiments, one of the rear shell 115 and the sound conduction assembly 14 may be configured with a jack 1154. Correspondingly, there may be a post 143 on the other. The post 143 may be inserted and fixed in the jack 1154 to improve the accuracy and reliability of the assembly of the sound conduction assembly 14 and the core housing 11. In some embodiments, the jack 1154 may be set in the rear shell 115, and may be located at the first sub-boss 1191, the post 143 may be set in the sound conduction assembly 14, and may be located in the depression area 142.

It should be noted that, as shown in FIG. 21, the sound conduction assembly 14 and the core housing 11 may be assembled along the direction shown in the dotted line in FIG. 21.

In some embodiments, for example, the speaker assembly 10 may not include a vibration diaphragm 13, the front shell 116 may press the coil support 121 on an annular bearing platform 1153 to improve the reliability of the assembling of the speaker assembly 10. Specifically, the front shell 116 may press the other end of a second cylindrical bracket 1213 departs from the annular main body part 1211 on the annular bearing platform 1153.

In some other embodiments, for example, the speaker assembly 10 may include the vibration diaphragm 13, the front shell 116 may press the coil support 121 and the connected vibration diaphragm 13 on the annular bearing platform 1153 to improve the reliability of the assembling of the speaker assembly 10. The vibration diaphragm 13 may be connected to the other end of the second cylindrical bracket 1213 departing from the annular main body part 1211 through a reinforcing ring 136. Specifically, the front shell 116 may press the reinforcing ring 136 on the annular bearing platform 1153 through the second cylindrical bracket 1213.

In some embodiments, as shown in FIG. 21 and FIG. 6, the sound-tuning hole 117 may be arranged in the rear shell 115 in the form of a complete through hole. The pressure relief hole 114 may be arranged in the front shell 116 in the form of incomplete notch, and forms a complete hole by splicing and fitting the rear shell 115 and the front shell 116. In this way, it may be easy to reduce the distance between the adjacent pressure relief hole 114 and the sound-tuning hole 117, and may help to make the actual area of the outlet end of the pressure relief hole 114 greater than that of the sound-tuning hole 117.

Figure 22:
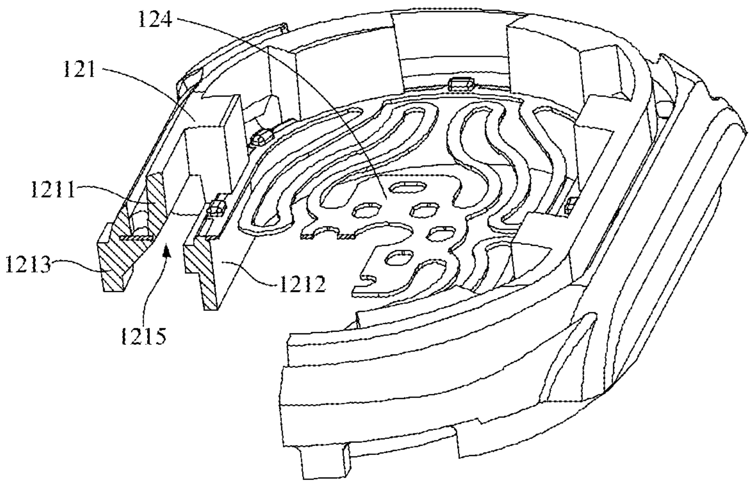
FIG. 22 is a schematic diagram illustrating an exemplary structure of a coil holder according to some embodiments of the present disclosure.

FIG. 22 is a schematic diagram illustrating an exemplary structure of a coil holder according to some embodiments of the present disclosure. In some embodiments, As shown in FIG. 22 and FIG. 4, a communication hole 1215 may be configured at the connection between an annular main body part 1211 and a first cylindrical bracket part 1215, so that the air in the front cavity 111 may not need to bypass a coil support 121 and a coil 123 in the process of being discharged, but directly passes through the coil support 121. In this way, the exhausting efficiency of the front cavity 111 may be improved, and the wavelength of the standing waves in the front cavity 111 may be reduced, so that the peak resonance frequency of the air conduction sound output to the outside of the acoustic output device 100 through the pressure relief hole 114 may be offset to high frequency. In some embodiments, the communication holes 1215 may all be located at the annular main body part 1211 or the first cylindrical bracket part 1212. In some embodiments, the count of communication holes 1215 may be multiple, and may be set apart along the circular direction of the coil assembly. The cross-sectional area of each communication hole 1215 may be greater than or equal to an eighth area threshold. For example, the cross-sectional area of each communication hole 1215 may be greater than or equal to 2 $mm^2$. For another example, the cross-sectional area of the communication hole 1215 adjacent to a first pressure relief hole 1141 may be greater than or equal to 3 $mm^2$, and the cross-sectional area of the communication hole 1215 adjacent to a second pressure relief hole 1142 and a third pressure relief hole 1143 respectively may be greater than or equal to 2.5 $mm^2$.

Figure 23:
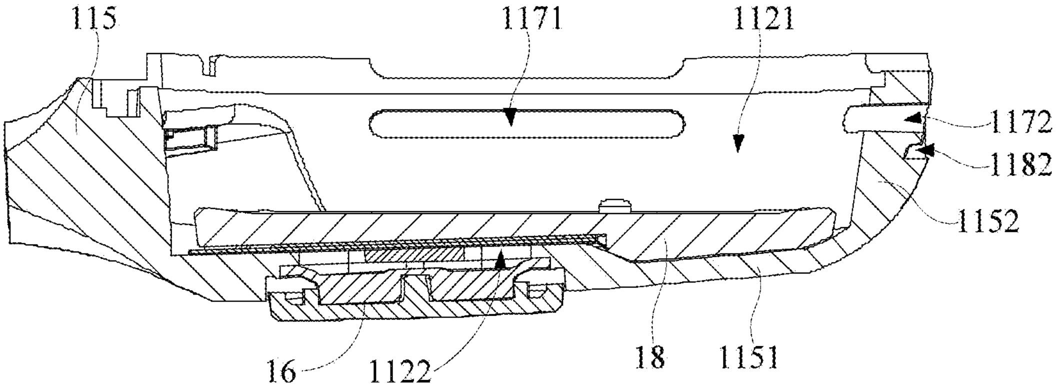
FIG. 23 is a schematic diagram illustrating an exemplary cross-section of a speaker assembly according to some embodiments of the present disclosure.
Figure 24:
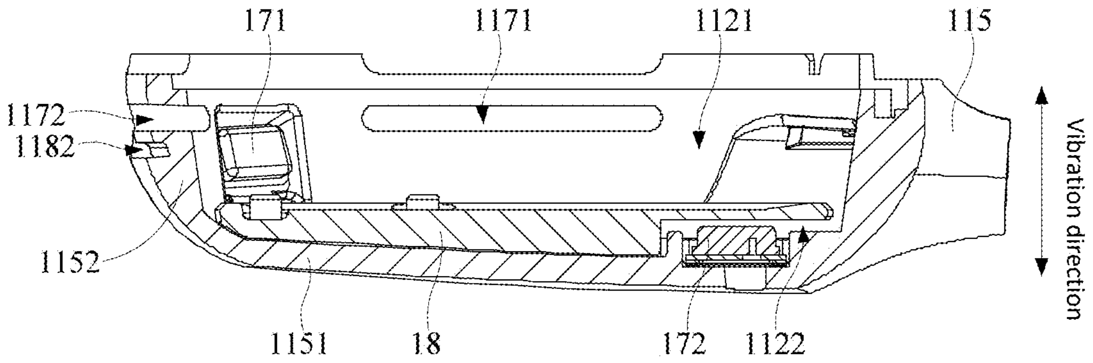
FIG. 24 is a schematic diagram illustrating an exemplary cross-section of s speaker assembly according to some embodiments of the present disclosure.

FIG. 23 is a schematic diagram illustrating an exemplary cross-section of a speaker assembly according to some embodiments of the present disclosure. FIG. 24 is a schematic diagram illustrating an exemplary cross-section of s speaker assembly according to some embodiments of the present disclosure. Please continue to see FIG. 1 and FIG. 2. An acoustic output device 100 may include two speaker assemblies 10, which may respectively be located in the left and right side of the user's head when the user is wearing the acoustic output device 100. As shown in FIG. 23 and FIG. 24, the embodiments of the present disclosure may define: when a user is wearing the acoustic output device 100, among the two speaker assemblies 10, the one located on the left side of the user's head refers to a left speaker assembly, as shown in FIG. 23; the one located on the right side of the user's head refers to a right speaker assembly, as shown in FIG. 24. In some embodiments, in addition to configuring a transducer 12 and other structural assemblies related to vocalization, the speaker assembly 10 may further configure other auxiliary devices such as function keys and microphones to enrich and expand the functions of the acoustic output device 100. In some embodiments, based on the general usage habits of users, the function keys may be placed in the left speaker assembly, and the microphone may be placed in the right speaker assembly. The volumes of function keys and microphones may be different. Of course, the auxiliary devices may be distributed in other ways, for example, a microphone may be respectively configured in the left speaker assembly and the right speaker assembly, which are not listed here.

In some embodiments, as shown in FIG. 23, the speaker assembly 10 may include functional keys 16 configured in accommodating cavity in the core housing 11, and the functional keys 16 may be exposed from the rear shell 115 to receive the user's pressing operations. The trigger direction of function keys 16 may be roughly consistent with the vibration direction of the transducer 12.

In some embodiments, as shown in FIG. 24, the speaker assembly 10 may include a first microphone 171 configured in the core housing 11. The first microphone 171 may collect the sound outside the speaker assembly 10. The angle between the vibration direction of the first microphone 171 and the vibration direction of the transducer 12 may be between 65 degrees and 115 degrees. In this way, the mechanical resonance of the first microphone 171 with the vibration of the transducer 12 may be avoided, and the sound pickup effect of the speaker assembly 10 may be improved.

In some embodiments, the speaker assembly 10 may further include a second microphone 172 configured in the accommodating cavity of the core housing 11. The second microphone 172 may collect the sound outside the speaker assembly 10. The angle between the vibration direction of the second microphone 172 and the vibration direction of the transducer 12 may be between 65 degrees and 115 degrees. In this way, the second microphone 172 and the first microphone 171 may receive two different sounds, and they may receive the same sound from two different directions, thereby improving the functions of noise reduction, voice calls of the acoustic output device 100. In some embodiments, the acoustic output device 100 may further include a processing circuit integrated on the main control circuit board 60 (not shown in the figure). The processing circuit may take the first microphone 171 as a main microphone, such as use it to collect the user's voices, and use the second microphone 172 as an auxiliary microphone, such as use it to collect the environmental sound where the user is located, and use the sound signals collected by the second microphone 172 to perform noise reduction on the sound signals collected by the first microphone 171. The first microphone 171 and the second microphone 172 may be welded on the same flexible circuit board to simplify the wiring structure of the speaker assembly 10. For example, the vibration direction of the first microphone 171 and the vibration direction of the transducer 12 may be perpendicular to each other. The vibration direction of the second microphone 172 and the vibration direction of the first microphone 171 may be perpendicular to each other.

Based on the above descriptions, in some embodiments, the speaker assembly 10 may further include a vibration diaphragm 13 connected between the transducer 12 and the core housing 11, so that the speaker assembly 10 may produce bone conduction sound and air conduction sound at the same time. As shown in FIG. 23 (or FIG. 24) and FIG. 4, the speaker assembly 10 may further include a partition 18, which may be configured in a rear cavity 112 so that the auxiliary assemblies may be separated from the rear cavity 112, and the space where the rear cavity 12 locates may not be affected by the auxiliary assemblies. Therefore, the wall surface of the rear cavity 112 may be as smooth and round as possible, thereby improving the acoustic expressiveness of the air conduction sound of the acoustic output device 100. At this time, the transducer 12 may be located on the side of the partition 18 facing the side of a front cavity 111.

In some embodiments, the partition 18 may separate the rear cavity 112 into a first sub-rear cavity 1121 near the front cavity 111 and a second sub-rear cavity 1122 departing from the front cavity 111. A sound hole 113 and a sound-tuning hole 117 may respectively communicates with the first sub-rear cavity 1121. The functional keys 16, the second microphone 172 and other auxiliary devices may be configured in the second sub-rear cavity 1122; the first microphone 171 may be configured in the first sub-rear cavity 1121. In some embodiments, the function keys 16 and the second microphone 172 may be respectively fixed between the left speaker assembly, a rear bottom plate 1151 of the right speaker assembly and the corresponding partitions 18. Correspondingly, the first microphone 171 may be fixed in the groove (not marked in the figure) of a rear cylindrical side plate 1152 of the right speaker assembly to avoid the collisions between the transducer 12 and the first microphone 171 during the working vibration process of the transducer 12, thereby increasing the reliability of the speaker assembly 10. For the left speaker assembly, the partition 18 may be used to take the pressure on the functional keys 16 implemented by the user.

In some embodiments, the partition 18 may further be used to regulate the size of the first sub-rear cavity 1121, so that the volume of the first sub-rear cavity 1121 of the left speaker assembly may be the same with that of the right speaker assembly. In this way, the frequency response curves of the air conduction sounds output respectively from the left speaker assembly and the right speaker assembly may converge, thereby improving the acoustic expressiveness of the acoustic output device 100.

It should be noted that subject to force majeure factors such as machining accuracy and assembly accuracy, etc., "the volume of the first sub-rear cavity of the left speaker assembly may be the same with that of the right speaker assembly" may allow a certain difference. In some embodiments, the difference between the volume of the first sub-rear cavity of the left speaker assembly and the right speaker assembly may be less than or equal to a preset difference threshold. For example, the difference between the volume of the first sub-rear cavity of the left speaker assembly and the right speaker assembly may be less than or equal to 10%. For another example, the difference between the volume of the first sub-rear cavity of the left speaker assembly and the right speaker assembly may be less than or equal to 5%. For another example, the difference between the volume of the first sub-rear cavity of the left speaker assembly and the right speaker assembly may be less than or equal to 1%.

In some embodiments, colloid (not shown in the figure) may be filled in the second sub-rear cavity 1122. The filling rate of the colloid in the second sub-rear cavity 1122 may be greater than or equal to 90%, making the second sub-rear cavity 1122 as solid as possible. In this way, the second sub-rear cavity 1122 may not be a hollow structure, and may form acoustic resonances with the first sub-rear cavity 1121, thereby improving the acoustic expressiveness of acoustic output device 100.

In some embodiments, the partition 18 may be made of light translucent materials; correspondingly, the colloid to be filled may be light curing colloid, which may be cured under light. The partition 18 may be pre-fixed with the help of a heat stake and the rear shell 115. In some embodiments, the gap between the side of the partition 18 and the rear shell 115 may further be filled with light curing colloid. In some embodiments, the grooves of the rear cylindrical side plate 1152 may further be filled with light curing colloid or other colloids after accommodating the second microphone 172.

In some embodiments, as shown in FIG. 23 (or FIG. 24) and FIG. 4, in the vibration direction of the transducer 12. The outer end surface of the magnetic hood 1221 departing from the front cavity 111 may be spaced from the partition plate 18 to avoid collisions between the two when they work at the transducer 12. Besides that, the distance between the central area of an outer end surface 45 of the magnetic hood 1221 and the partition 18 may be greater than the distance between the edge area of the outer end surface of the magnetic hood 1221 and the partition plate 18, which means that the central area of the first sub-rear cavity 1121 is emptier than its edge area, which may facilitate the flow of air in the first sub-rear cavity 1121. For the magnetic hood 1221, the center area of its surface of bottom plate 1223 facing the partition plate 18 may be depressed in the direction away from the partition 18 to form an arc surface; and/or, for the partition 18, the center area of the surface of the partition 18 facing the magnetic hood 1221 may be depressed in the direction away from the magnetic hood 1221 to form an arc surface.

Through the structure configurations to the acoustic assembly 10 in the above embodiments, its acoustic expressiveness may be improved, and the battery life, the appearance quality and the wearing comfort of the device may be improved as well. In addition, a metal body may be configured in the supporting structure 50 of the acoustic output device 100. The metal body may not only provide elasticity for the supporting structure 50 so that the supporting structure 50 may adapt to different shapes of heads and ears when the user wears the device, and ensure that the supporting structure 50 will not be easily damaged when deformed, so as to improve its durability. In addition, the metal body may further provide the supporting structure 50 with rigidity to be supported on the user's head or ears when they wear the device. At the same time, in some cases, for example, when the acoustic output device 100 is a wireless headphone, the metal body may further receive and emit signals as an antenna of acoustic output device 100. So that there is no need to configure antennas within the functional assembly 20 or the speaker assembly 10, thereby reducing the assemblies in the functional assembly 20 or the speaker assembly 10, preventing the two from being too large. The structures thereof may be further simplified as well. The metal body and the related structures will be explained in detail below.

In some embodiments, the metal body may include the supporting structure 50, and the metal body may be connected to the functional assembly 20 as an antenna for the acoustic output device 100.

Specifically, metal bodies may be configured in a rear hook assembly 30 and/or an ear hook 40, and the metal bodies may be electrically connected to the functional assembly 20 to be an antenna for acoustic output device 100. The metal body has a certain length, which may be used to transfer the changing current and the changing magnetic field, thereby realizing the transmission and receiving of the signals like an antenna.

In some embodiments, a metal body may be configured within the rear hook assembly 30, and at least one end of the metal body may be electrically connected to the function assembly 20. In some embodiments, the metal body 31 may be monolithic, one end of the metal body may be electrically connected to one set of functional assemblies 20, and the other end may not be not connected to another set of functional assemblies 20, or the two ends of the metal body may be respectively electrically connected to a corresponding functional assembly 20. In some embodiments, the metal body may further be split and connects with a functional assembly 20 respectively.

Figure 25:
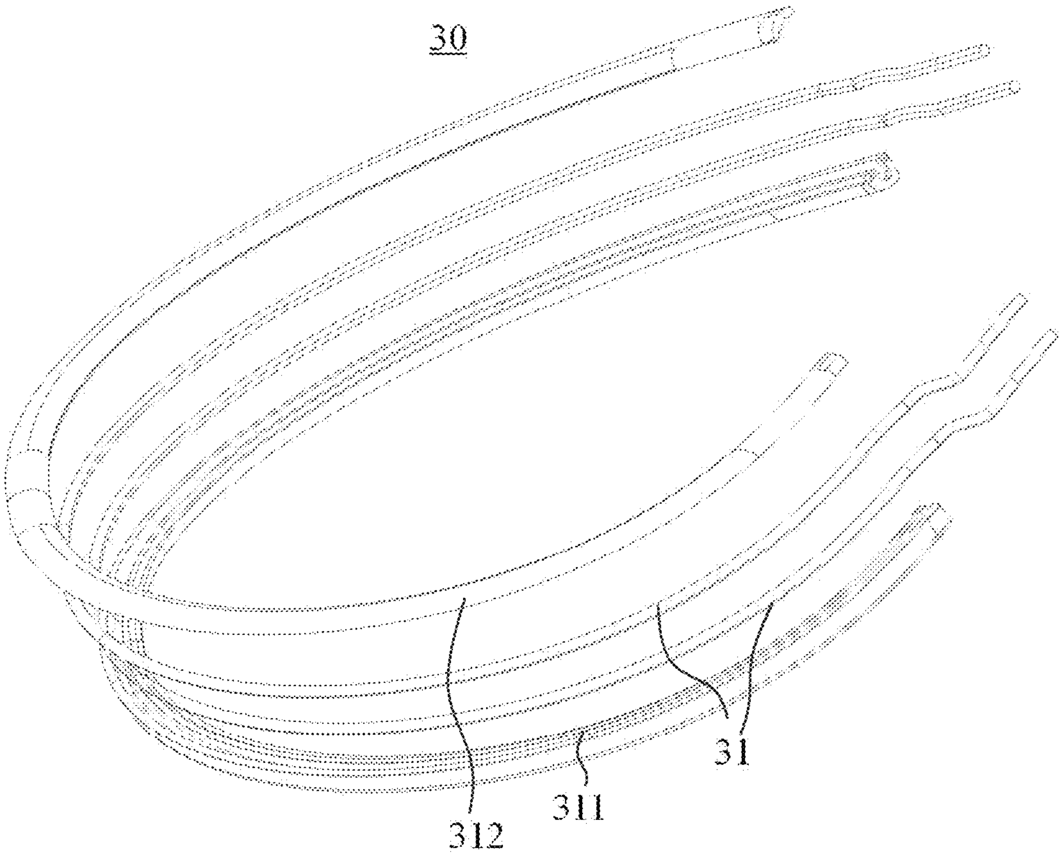
FIG. 25 is a schematic diagram illustrating an exploded view of a rear hook assembly according to some embodiments of the present disclosure.

FIG. 25 is a schematic diagram illustrating an exploded view of a rear hook assembly according to some embodiments of the present disclosure. Referring to FIG. 25, a rear hook assembly 30 includes a first rear hanging shell 301, a second rear hanging shell 302 and a metal body 31, the metal body 31 may be located in a space formed by the buckle of the first rear hanging shell 301 and the second rear hanging shell 302, the metal body 31 may be electrically connected to the functional assembly 20 to be an antenna of an acoustic output device 100, that is, the metal body 31 configured in the rear hook assembly 30 may be used as an antenna to send and receive communication signals, which may avoid arranging an antenna in the functional assembly 20 or the speaker assembly 10, which may reduce the volume of the functional assembly 20 or the speaker assembly 10, and facilitates the streamlined arrangement of the functional assembly 20 and the ear hook assembly 40.

In some embodiments, the metal body 31 may be a whole metal wire, and the two ends of the metal body 31 may be electrically connected to two functional assemblies 20, respectively. In some embodiments, the length of the metal body 31 may be greater than or equal to a first length threshold to facilitate sending and receiving signals. The first length threshold may be determined according to the length of the metal body 31 and/or the corresponding length when the metal body 31 may send and receive communication signals when metal body 31 is an antenna. In some embodiments, the length of the rear hook assembly 30 may be designed based on human engineering (e.g., the size of the human head outline, etc.). In some embodiments, the range of the first length threshold may include 35 mm~50 mm. In some embodiments, the range of the first length threshold may include 35 mm~40 mm. In some embodiments, the first length threshold may be 35 mm, that is, the length of the metal body 31 may be greater than or equal to 35 mm. By setting the length of the metal body 31 to greater than or equal to the first length threshold, the metal body 31 may not only be used as an antenna to facilitate sending and receiving signals, but also be used as an elastic piece in the rear hook assembly 30 to provide elasticity, and to increase the rigidity and strength of the ear hook assembly 40. More descriptions about the use of the metal body 31 as an elastic piece in the rear hook assembly 30 to provide elasticity may be found elsewhere in the present disclosure (e.g., FIG. 31, FIG. 32, and the related descriptions).

In some embodiments, the metal body 31 may be split. Specifically, the metal body 31 may include a first sub-antenna (not shown in the figure) and a second sub-antenna (not shown in the figure). The first sub-antenna and the second sub-antenna may be electrically connected to the functional assembly 20, and the first sub-antenna and the second sub-antenna may be spaced apart. In this embodiment, the first sub-antenna and the second sub-antenna may be arranged in the rear hook assembly 30, and a length of the first sub-antenna and a length of the second sub-antenna may be greater than or equal to the first length threshold. For example, the length of the first sub-antenna and the length of the second sub-antenna may be greater than 35 mm, which may facilitate sending and receiving signals.

In some embodiments, the metal body 31 may be arranged in an ear hook assembly 40, and one end of the metal body 31 may be electrically connected to the functional assembly 20 to be used to send and receive communication signals as the antenna of the acoustic output device 100. Specifically, the metal body 31 may be a whole metal wire, and the two ends of the metal body 31 may be connected to two functional assemblies 20, respectively. In some embodiments, the length of the metal body 31 may be greater than or equal to a second length threshold to facilitate sending and receiving signals. In some embodiments, the second length threshold may be determined according to the length of the ear hook assembly 40 and/or the corresponding length when the metal body 31 may send and receive communication signals when metal body 31 is an antenna. In some embodiments, the length of the ear hook assembly 30 may be designed based on human engineering (e.g., the size of the human head outline, etc.). In some embodiments, the range of the second length threshold may include 35 mm~50 mm. In some embodiments, the range of the second length threshold may include 35 mm~40 mm. In some embodiments, the second length threshold may be 35 mm, that is, the length of the metal body 31 may be greater than or equal to 35 mm. By setting the length of the metal body 31 to greater than or equal to the second length threshold, the metal body 31 may not only be used as an antenna to facilitate sending and receiving signals, but also be used as an elastic piece in the ear hook assembly 40 to provide elasticity, and to increase the rigidity and strength of the ear hook assembly 40. In some embodiments, the second length threshold may be the same with or different from the first length threshold.

In some embodiments, to facilitate the electrical connection of the metal body 31 and the functional assemblies 20, a layer of welding metal at the end of the metal body 31 (e.g., the end of the metal body 31 connected to the function assembly 20), so that the metal body 31 may be welded on a circuit board (e.g., a main control circuit board 60) in the functional assembly 20 through the welded metal layer.

In some embodiments, the metal body 31 may be a titanium wire. The titanium wire not only has good conductivity, which facilitates sending and receiving signals, and it may provide elasticity and rigidity for a supporting structure 50 with a light weight. Correspondingly, the welding metal layer may be a zinc plating layer. In this way, it may solve the problem that titanium wire is difficult to be directly welded on the circuit board. The titanium wire may be connected to the circuit board through welding a welding metal layer that is easy for circuit board welding on the end part.

In some embodiments, the metal body 31 may further be metals such as spring steel, titanium alloy, titanium-nickel alloy or chrome-molybdenum steel, and the welding metal layer may further be a copper plating layer. The present disclosure does not have specific restrictions on this.

In some embodiments, a pin header may be configured on the end of the metal body 31 connected to the functional assembly 20, and a corresponding female header may be configured on the circuit board of the functional assembly 20. This not only facilitates the electrical connection between the metal body 31 and the functional assembly 20, but also facilitates the removal of the metal body 31 from the circuit board on the functional assembly 20.

In some embodiments, when the supporting structure 50 of the acoustic output device 100 only includes ear hook assembly 40, and does not include the rear hook assembly 30 (e.g., the acoustic output device 100 may be the acoustic output device in FIG. 3, more about the supporting structure 50 of the acoustic output device 100 only includes ear hook assembly 40, and does not include the rear hook assembly 30 may be referred to in FIG. 3 and related descriptions), a metal body 31 may be configured in the supporting structure 50, that is, a metal body 31 may be configured in the ear hook assembly 40, and the metal body 31 may be electrically connected to the functional assembly 20 as an antenna of the acoustic output device 100.

In some embodiments, the metal body 31 may further be used to improve the structural strength of the acoustic output device 100. In some embodiments, the section of the metal body 31 may be round.

Figure 26:
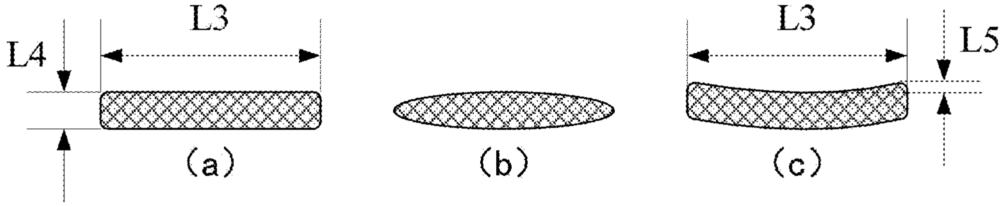
FIG. 26 is a schematic diagram illustrating an exemplary cross-section of a metal body according to some embodiments of the present disclosure.

FIG. 26 is a schematic diagram illustrating an exemplary cross-section of a metal body according to some embodiments of the present disclosure. In some embodiments, as shown in FIG. 3 and FIG. 26, a metal body 31 may be a flat tablet structure so that the metal body 31 has different deformation capabilities in all directions. The section of the metal body 31 may be a rounded rectangle shown in FIG. 26 (*a*), or the oval shape shown in FIG. 26 (*b*). In some embodiments, the ratio value between the long edge (or long axis, L3) and the short edge (or short axis, L4) of the metal body 31 may be within a preset range. Furthermore, as shown in FIG. 26 (*c*), if the section of the metal body 31 is a rounded rectangle shown in FIG. 26 (*a*), the metal body 31 may further be made into a circular arc shape in the direction of the short axis through processes such as stamping and pre-bending, etc., which makes the metal body 31 store a certain elastic potential energy. Specifically, the original state of the metal body 31 may be curled, after being straightened, it may be made into an arc shape in the short axis direction through a stamping process, so that the metal body 31 may store a certain internal stress and maintain a straight shape, becoming "memory wire". When subjected to a small external force, the curled state will be restored, so that a hook-shaped part 11 may fit and wrap around the human ears. In some embodiments, the ratio value between the arc height (L5) and the long side (L3) of the metal body 31 may be within a preset range.

Through the above mode, under the action of the metal body 31 with a flat tablet structure, the ear hook assembly 40 may have a strong rigidity, so that the cooperation of the speaker assembly 10 and the functional assembly 20 may form an effective elastic clamping to the user's ears; the functional assemblies 20 may have strong elasticity due to its bending in the length direction, so that the functional assembly 20 has a strong elasticity to effectively press on the ears or head of the user.

Therefore, the metal body 31 may not only be used as an antenna of an acoustic output device 100, but also improve the structural strength of the acoustic output device 100. In some embodiments, the metal body 31 may be arranged in the structures like the speaker assembly 10 and the functional assembly 20 to improve the structural strength of the acoustic output device 100.

Based on the above description, the metal body 31 may not only be set as an antenna for acoustic output device 100 at the supporting structure 50 (e.g., the rear mount assembly 30 and/or ear-mounted assembly 40), but also may be used to set up each acoustic output device 100 each Inside assemblies (e.g., acoustic assemblies 10, functional assemblies 20, supporting structure 50) to improve the structural strength of acoustic output device 100. In addition, the metal body 31 set in the supporting structure 50 may further be used as elastic assemblies to provide elasticity for the rear mount assembly 30 and/or ear-mounted assembly 40 Make it support the user's head or ear. The following will be Combining the attached figure to explain the metal body 31 as an elastic piece.

Figure 27:
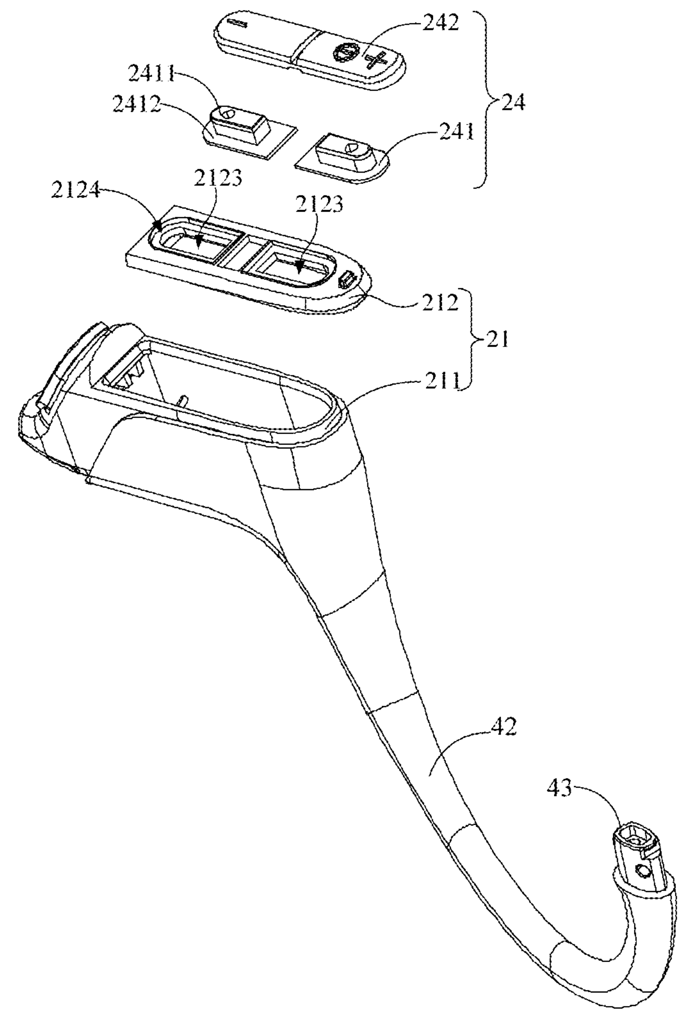
FIG. 27 is a schematic diagram illustrating an exploded view of an integration of a functional assembly and an ear hook according to some embodiments of the present disclosure.

In some embodiments, the ear hook assembly 40 may include the metal body 31, the metal body 31 may not only be used as the antenna of the acoustic output device 100, but also as an elastic piece to provide elasticity and rigidity for ear hanger assembly 40. FIG. 27 is a schematic diagram illustrating an exploded view of an integration of a functional assembly and an ear hook according to some embodiments of the present disclosure. As shown in FIG. 27 and FIG. 1, FIG. 2, a functional assembly 20 may include an accommodating cavity 21, an ear hook assemblies 40 may include a bending transition part 42 and a fixed part 43. The accommodating cavity 21 of the functional assembly 20 may be used to accommodate a main control circuit board 60 or a battery 70, and the fixed part 43 of the ear hook assembly 40 may be used to fix the speaker assembly 10, and the bending transition part 42 may be used to connect the accommodating cavity 21 and the fixed part 43. In some embodiments, the bending transition part 42 may be arranged in a bent shape to facilitate an ear hanging assembly 40, the functional assembly 20 and a speaker assembly 10 hanging between the user's ears and the head.

In some embodiments, the accommodating cavity 21 and the fixed party 43 may be plastic parts, the metal body 31 may be arranged in the bending transition part 42. The metal body 31 may be an elastic metal wire, the elastic metal wire and the plastic part may be connected as a whole with the help of a metal insert. In some embodiments, one end of the metal body 31 facing the functional assembly 20 may have a metal connector, and the metal body 31 may be electrically connected to the main control circuit board 60 electricity on the functional assembly 20 through connecting with the functional assembly 20 by the metal connector, so that it may be the antenna of the acoustic output device 100. At the same time, the metal body 31 further provides elasticity and rigidity for the ear hook assembly 40, so that the ear hook assembly 40 may adapt to deformations and support on the user's ears. In some embodiments, the surfaces of the ear hook assembly 40 and the functional assembly 20 may be an elastic cover to improve the wearing comfort of the acoustic output device 100.

Figure 28:
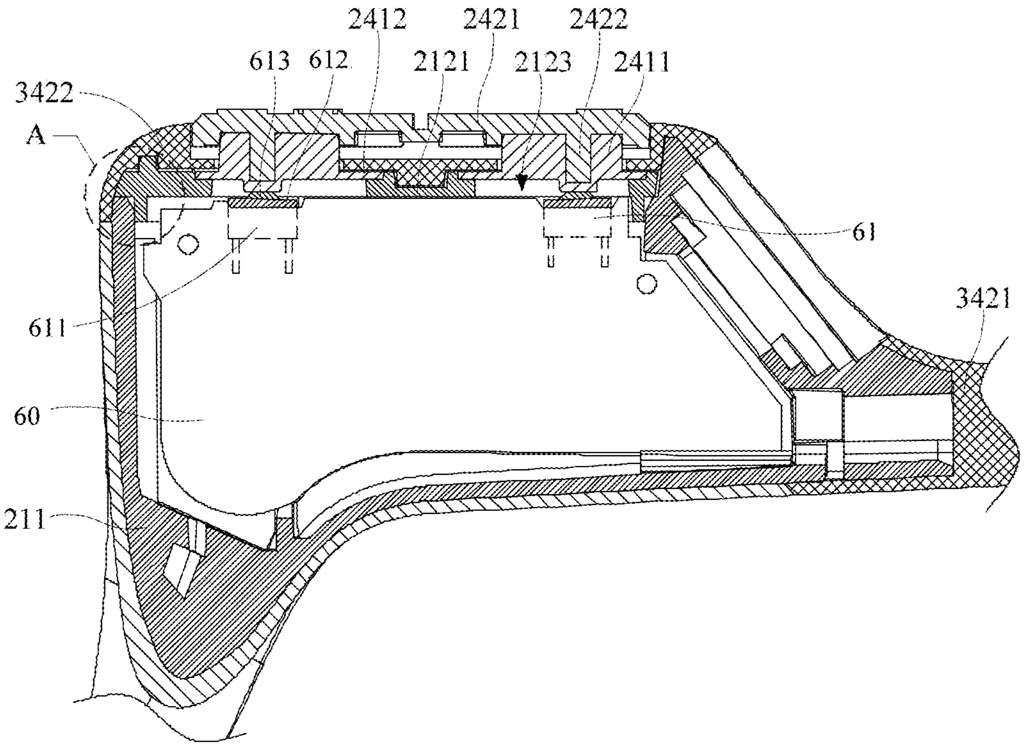
FIG. 28 is a schematic diagram illustrating an exemplary functional assembly according to some embodiments of the present disclosure.
Figure 29:
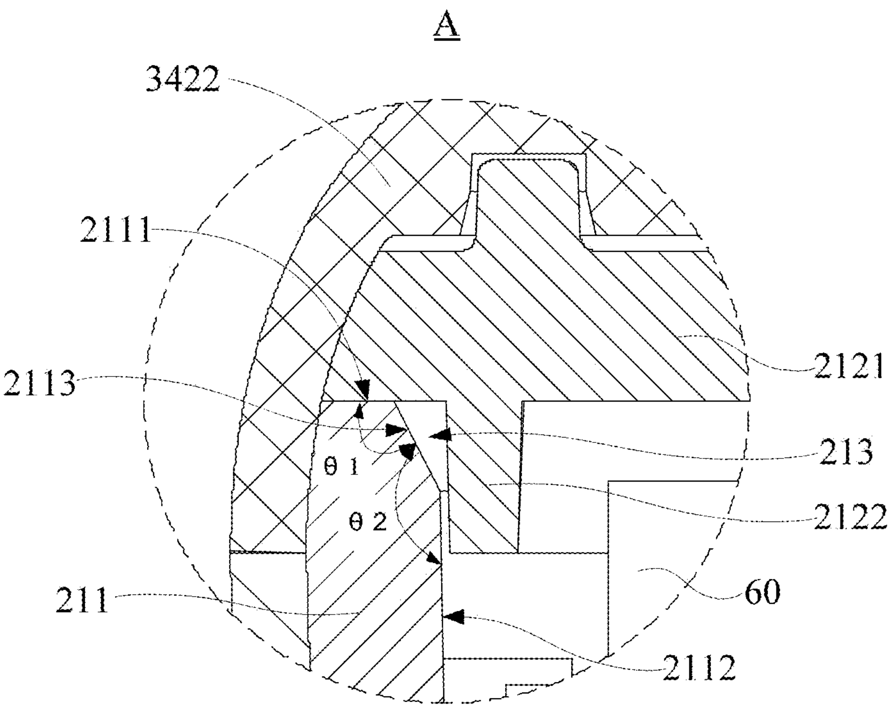
FIG. 29 is a schematic diagram illustrating a partly enlarged view of Area A in FIG. 28.

FIG. 28 is a schematic diagram illustrating an exemplary functional assembly according to some embodiments of the present disclosure. In some embodiments, an accommodating cavity 21 may include a main cavity body 211 and a cover plate 212. As shown in FIG. 28, the main cavity body 211 may be used to form an accommodating space with an open end that opens at one end (not marked in the figure). The cover plate 212 may be covered at the opening end of the main cavity body 211. FIG. 29 is a schematic diagram illustrating a partly enlarged view of Area A in FIG. 28. In some embodiments, as shown in FIG. 29, the opening end of the main cavity body 211 may be arranged with an outer end surface face 2111, an inside surface 2112, and a transitional surface 2113 of the outer end surface face 2111 and the inside surface 2112. When the cover plate 212 is covered at the opening end of the main cavity body 211, the cover plate 212 and at least part of an area of the transitional surface 2113 may be spaced apart to form a colloid space 213 for accommodating the colloid. At this time, the cover plate 212 and the main cavity body 211 may be connected through the colloid (not shown in the figure) within the colloid space 213. In this way, while meeting the requirement for dispensing, the structural strength of the opening end of the main cavity body 211 may be ensured to the greatest extent, which helps to make the overall structure of the main cavity body 211 lighter and thinner. The wall thickness of the opening end of the main cavity body 211 may be between 0.6 mm and 1.0 mm. Of course, in some embodiments, when the cover plate 212 is covered at the opening end of the main cavity body 211, the cover plate 212 and the outer end surface face 2111 may be connected through welding. At this time, the opening end of the main cavity body 211 may not be configured with the transitional surface 2113. In some embodiments, an annular dispensing stand may further be configured between the outer end surface face 2111 and the inside surface 2112 which is generally perpendicular to the inside surface 2112.

In some embodiments, the transitional surface 2113 may be a plane, and may be respectively connected to the outer end surface face 2111 and the inside surface 2112 in an obtuse angle. The obtuse angle between the transitional surface 2113 and the outer end surface 2111 (e.g., θ1) may be less than that between the transitional surface 2113 and the inside surface 2112 (e.g., θ2). In this way, while ensuring that the volume of the colloid space 213 meets the requirements of dispensing, the partial wall thickness of the opening end of the main cavity body 211 may further be ensured to the greatest extent, thereby improving the structural strength of the opening end of the main cavity body 211. In some embodiments, the obtuse angle between the transitional surface 2113 and the outer end surface 2111 may be between 110 and 135 degrees; alternatively, the obtuse angle between the transitional surface 2113 and the inside surface 2112 may be between 135 degrees and 160 degrees.

In some embodiments, the transitional surface 2113 may further be configured with a knurled structure to increase its touching area with the colloid, thereby improving the adhesive intensity between the cover of the cover plate 212 and the main cavity body 211.

In some embodiments, as shown in FIG. 28 and FIG. 29, the cover plate 212 may include a main cover body 2121 and a collar flange 2122 connected to the main cover body 2121. The main cover body 2121 may be covered on the outer end surface 2111 and touch the outer surface 2111 for limiting. The collar flange 2122 stretches into the main cavity body 211. At this time, the colloid space 213 may be formed between a lower surfaces of the transitional surface 2113 and the main cover body 2121 and the outside surface of the collar flange 2122. In some embodiments, the main cavity body 211 and the cover plate 212 may be assembled in an inverted manner. For example, first an appropriate amount of colloid may be dispensed between the lower surface of the main cover body 2121 and the outside surface of the collar flange 2122 along the circumferential direction of the cover plate 212 with a dispenser, then the functional assembly 20 may be reversed through the main cavity body 211 on the cover plate 212 to prevent the colloid from overflowing toward the interior of the main cavity body 211.

In some embodiments, as shown in FIG. 28, a main control circuit board 60 may be arranged within the accommodating cavity 21, and a switch assembly 61 may be arranged on the main control circuit board 60. The switch assembly 61 may include a first fixed part 611, a second fixed part 612 and a switching body 613, the second fixed part 612 may be connected to the first fixed department 611 by bending, and the switching body 613 may be configured on the second fixed part 612. In some embodiments, the first fixed part 611 may be attached to the main surface of the main control circuit board 60. The first fixed part 611 and the main control circuit board 60 may be welded together. The second fixed part 612 may be attached to the side surface of the main control circuit board 60, and the switch body 613 may be located on the side of the second fixed part 612 that departs from the main control circuit board.

In some embodiments, the main cover body 2121 may have at least one key hole 2123, and the key hole 2123 may be surrounded by the collar flange 2122. Correspondingly, the functional assembly 20 may further include a key assembly 24 fixed on the side of the main cover body 2121 departing from the collar flange 2122. The key assembly 24 may be configured to receive a pressure imposed by the user, and triggers the switch assembly 61 through a key hole 2123. At this time, a pressing direction of the key assembly 24 to the switch assembly 61 may be parallel to the main surface of the main control circuit board 60 to avoid deformation of the main control circuit board 60 in the direction perpendicular to its main surface.

In some embodiments, as shown in FIG. 28 and FIG. 29, the side of the main cover body 2121 departing from the collar flange 2122 may further be partially depressed facing the collar flange 2122 to form a drop area 2124, and the key hole 2123 may be arranged in the drop area 2124. Correspondingly, the key assembly 24 may include soft keys 241 and hard keys 242 connected to the soft keys 241. The soft keys 241 may be arranged in the drop area 2124 and cover key holes 2123. At this time, the user deforms the soft keys 241 by pressing the hard keys 242, and under the avoidance of the key hole 2123, a stroke may be generated into the interior of the accommodating cavity 21, which then acts on the switch body 613 to trigger the switch assembly 61.

In some embodiments, the soft keys 241 may include an integrated middle convex part 2411 and an edge connection part 2412, the edge connection part 2412 may be used to connect with the main cover 2121, and the middle convex part 2411 may be used to connect with the hard keys 242. The depth of the drop area 2124 may be greater than the thickness of the edge connection part 2412 and less than the thickness of the middle convex part 2411. At this time, the soft keys 241 and the cover plate 212 may be integrated by two-color injection molding process. As the depth the drop area 2124 is greater than the thickness of the edge connection part 2412, the colloid overflow may be avoided in the forming process. In some embodiments, the side of the main cover body 2121 departing from the collar flange 2122 may further include an annular bone position surrounding the drop area 2124. The height of the annular bone protruding from the main cover body 2121 may be about 0.05 mm, and its width may be about 0.2 mm, so that it may be used as a colloid resisting wall in the molding process, and it may further avoid colloid overflow.

In some embodiments, as shown in FIG. 29, there may be two of switch assembly 61, keyholes 2123, and soft keys 241, they are set in a manner of a one-to-one correspondence. The middle convex part 2411 of each soft keys 241 may have a blind hole (not marked in the figure). Correspondingly, the hard key 242 may include an integrated pressing part 2421 and inserted column 2422. The count of insert columns 2422 may further be two, each insert column 2422 may be inlaid in a blind hole, respectively. In some embodiments, the two switch assemblies 61 may respectively correspond to the volume up key and the volume down key of an acoustic output device 100, wherein any of the two may be expanded as the power key of the acoustic output device 100.

In some embodiments, when a supporting structure 50 of the acoustic output device 100 includes a rear hook assembly 30, the rear hook assembly 30 may include a metal body 31, the metal body 31 may not only be used as an antenna of the acoustic output device 100, but also be used as an elastic piece to provide elasticity and rigidity for the rear hook assembly 30, so that the rear hook assembly 30 may adapt to deformation and support on the user's head.

Figure 30:
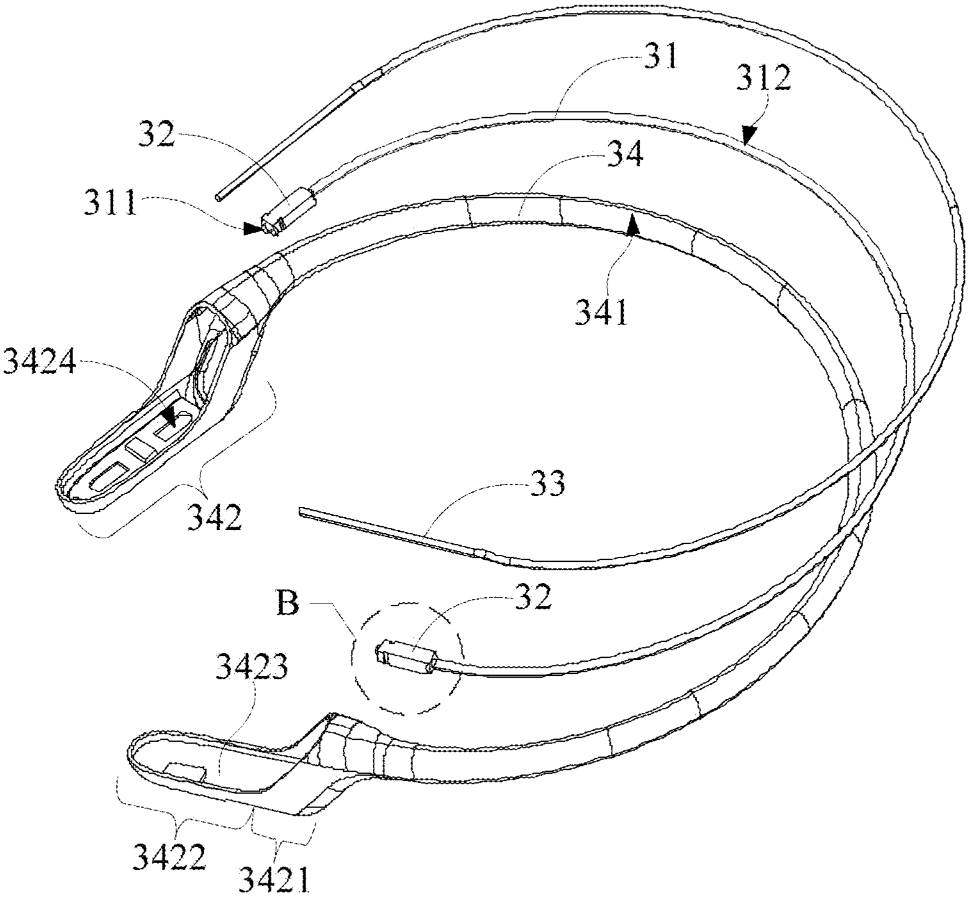
FIG. 30 is a schematic diagram illustrating an exploded view of a rear hook assembly according to some embodiments of the present disclosure.
Figure 31:
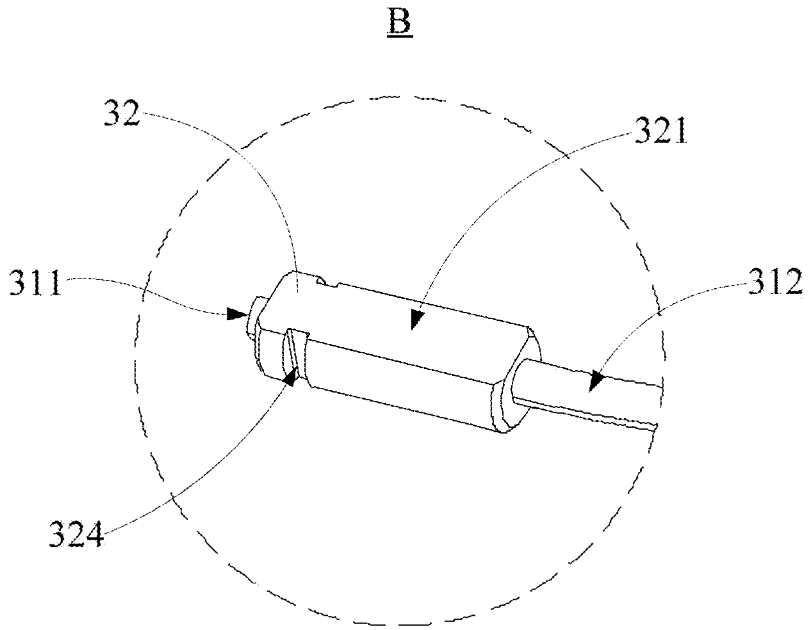
FIG. 31 is a schematic diagram illustrating a partly enlarged view of Area B in FIG. 30.

FIG. 30 is a schematic diagram illustrating an exploded view of a rear hook assembly according to some embodiments of the present disclosure. FIG. 31 is a schematic diagram illustrating a partly enlarged view of Area B in FIG. 30. As shown in FIG. 30 and FIG. 31, a rear hook assembly 30 may include a metal body 31 and metal connectors 32, the metal connectors 32 may be sleeved and fixed on both ends of the metal body 31 respectively. At this time, the two ends of the metal body 31 may be respectively connected to an end of a functional assembly 20 (such as its accommodating cavity 21) through the metal connectors 32, so that the two ends of the rear hanging assembly 30 may respectively be connected to the two functional assemblies 20 to provide elasticity for the rear hanging assembly 30 to adapt to deformations and provide rigidity, so that the rear hanging assembly 30 may support the user's head. At the same time, the metal body 31 may achieve electrical connection with a main control circuit board 60 in an accommodating cavity 21 of the functional assembly 20 as an antenna for an acoustic output device 100. In some embodiments, the metal body 31 may be an elastic metal wire. In some embodiments, elastic metal wires may be titanium wire. In some embodiments, elastic metal wires may further be metals such as spring steel, titanium alloy, titanium-nickel alloy, or chrome-molybdenum steel, etc.

In some embodiments, as the metal connectors 32 are sleeved on the end part of the metal body 31, a part of the metal body 31 may be located in a metal connector 32. In some embodiments, the deformation of a first part 311 of the metal body 31 inside the metal connector 32 may be less than or equal to a first deformation threshold compared to the second part of the metal body located outside the metal connector. In some embodiments, the first deformation threshold may be determined according to an elastic coefficient of the metal body 31 or the maximum deformation of the metal body 31. The maximum deformation of the metal body 31 may refer to the maximum variable of the metal body 31 within the range of elastic deformation. In some embodiments, the range of the first deformation threshold may include 0~10%. In some embodiments, the range of the first deformation threshold may include 0~5%. In some embodiments, the range of the first deformation threshold may include 0~2%. In some embodiments, the first deformation threshold may be 10%, that is, the deformation of the first part 311 of the metal body 31 inside the metal connector 32 may be less than or equal to 10% compared to the second part 312 of the metal body 31 located outside the metal connector 32. Through sleeving the metal connector 32 on the two ends of the metal body 31 to connect the metal body 31 with the functional assembly 20, the two ends of the metal body 31 may not be deformed (or may be deformed slightly), thereby avoiding embrittlement of both ends of the metal body 31 due to deformation, and increasing the reliability of the rear hook assembly 30. In addition, the metal connector 32 has excellent structural strength which may improve the structural strength of the acoustic output device 100. In some alternative embodiments, plastic connectors may be used instead of metal connectors 32. For example, the ends of the metal body may be flattened first, and then plastic connectors may be formed by injection molding at both ends of the metal body.

In some embodiments, the deformation of the first part 311 of the metal body 31 inside the metal connector 32 relative to the second part 312 of the metal body 31 located outside the metal connector 32 may be determined based on a first cross-sectional dimension φ1 and a second cross-sectional dimension φ2, wherein the first cross-sectional dimension φ1 is a dimension of a cross-section of the first part 311 along a direction that passes a geometric center of the cross-section of the first part 311, and the second cross-sectional dimension φ2 is a dimension of a cross-section of the second part 312 along the same direction that passes a geometric center of the cross-section of the second part 312. For example, the deformation may be calculated in the following way: $|\varphi 1-\varphi 2|/\varphi 2$. In some embodiments, when the metal body 31 is a wire and is not deformed, the φ1 and φ2 may correspond to the line diameter of the first part 311 and the second part 312.

In some embodiments, for the metal body 31, the second part 312 may be bent compared to the first part 311, so that the rear hook assembly 30 may surround the back side of the user's head. In some embodiments, the material of the metal body 31 may be titanium, spring steel, titanium alloy, titanium-nickel alloy, chromium-molybdenum steel, etc. In some embodiments, the material of the metal connector 45 may be titanium alloy (such as nickel-titanium alloy, titanium alloy, β titanium, etc.), steel alloy (such as stainless steel, carbon steel, iron, etc.), copper alloy (such as Copper, Brass, Bronze, and cupronickel), aluminum alloy, etc.

In some embodiments, the metal connector 32 may include an installation hole (not marked in the figure). At this time, the metal body 31 may be inserted into the installation hole and the metal body 31 may be connected to the metal connector 32 by welding. As shown in FIG. 31, the end of the metal body 31 may be further exposed from the outer surface of the metal connector 32. A welding point between the metal body 31 and the metal connector 45 may be formed between the exposed part of the metal body 31 and the outside end of the metal connector 32. In short, the metal connector 32 may be sleeved on the metal body 31 and may expose the end of the metal body 31, so that the ends of the metal connector 32 and the metal body 31 may be welded, and the metal body 31 may be welded on the main control circuit board 60 of the functional assembly 20 at the part exposed from the metal connector 32 (e.g., weld through the welding metal layer configured at the end part) when the metal body 31 is the antenna of the acoustic output device 10, thereby realizing the electrically connection between the metal body 31 and the functional assemblies 20.

In some embodiments, the metal connector 32 may be connected to the metal body 31 by die casting. Compared with the above welding connection, the die casting connection may make the metal connector 32 directly wrap on the metal body 31, which is similar to plastic injection molding.

In some embodiments, whether it is welding or die casting connection, to increase the intensity between the metal body 31 and the metal connector 32, the outer surface of the first part 311 may be configured with a knurled structure (not shown in the figure), to increase the touching area between the metal body 31 and the metal connector 32. In addition, the knurled structure may increase the friction coefficient of the first part 431 on the outer surface, thereby increasing the friction between the metal body 31 and the metal connector 32, and increase the combination intensity between the metal body 31 and the metal connector 32. In some embodiments, the ratio between the depth of the knurled structure and the cross-section size of the first part 311 may be less than or equal to a first ratio threshold. In some embodiments, as the depth of the knurled structure will affect the elastic deformation of the first part 311, the larger the depth of the knurled structure is, the easier for the first part 311 to deform or the larger the elastic deform will be. Therefore, the first ratio threshold may be determined according to the first deformation threshold of the deformation of the first part 311 relative to the second part 312. For example, the maximum deformation amount of the first part 311 in the elastic deformation range may be determined by the first deformation threshold, the ratio between the depth of the knurled structure corresponding to the maximum deformation of the first part 311 within the deformation range and the cross-sectional size of the first part 311 may be the first ratio threshold. For example, the first ratio threshold may be 10%, that is, the ratio between the depth of the knurled structure and the cross-sectional size of the first part 311 may be less than or equal to 10%. For another example, the first ratio threshold may be 5%, that is, the ratio between the depth of the knurled structure and the cross-sectional size of the first part 311 may be less than or equal to 5%. For another example, the depth of the knurled structure may be between 0.2 mm and 0.3 mm.

Figure 32:
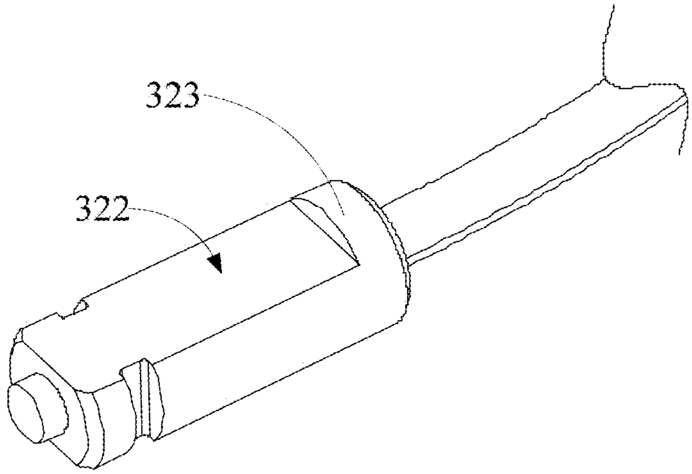
FIG. 32 is a schematic diagram illustrating an exemplary contact side of a metal connector and a wire.
Figure 33:
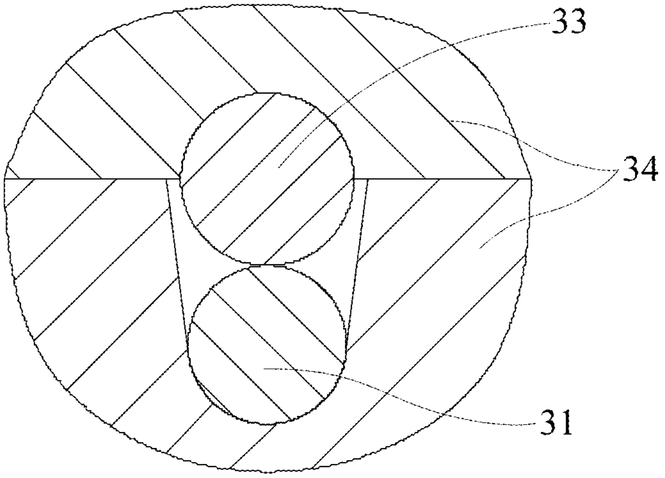
FIG. 33 is a schematic diagram illustrating an exemplary part of a rear hook assembly in FIG. 30.

FIG. 32 is a schematic diagram illustrating an exemplary contact side of a metal connector and a wire. FIG. 33 is a schematic diagram illustrating an exemplary part of a rear hook assembly in FIG. 30. In some embodiments, As shown in FIG. 32 and FIG. 33, a metal connector 32 may be set up as a column, and may have a mounting surface 321 parallel to the axis direction of the metal connector 32. The mounting surface 321 may be configured as a plane and penetrate both ends of the metal connector 32 along the above axis direction. In this way, as the wire 33 mentioned in the later description is generally a wire, whose cross section is generally round, the metal connector 32 may be assembled with the wire 33 through the flat mounting surface 321, so as to facilitate the setting of the wiring of the rear hanging assembly 30.

In some embodiments, the metal connector 32 may further have an anti-rotation surface 322 parallel to the mounting surface 321. In this way, after the rear hanging assembly 30 is connected to the functional assembly 20 (e.g., its accommodating compartment 21) through the metal connector 32, the rear hanging assembly 30 and the functional assembly 20 may not easily rotate relative to each other. The anti-rotation surface 322 only penetrates one end of the metal connector 32 close to the end of the metal body 31 in the above axial direction, so that one end of the metal connector 32 can form a stop flange 323 connected to the anti-rotation surface 322. In this way, when the rear hook assembly 30 connects with the functional assembly 20 (e.g., its accommodating cavity 21) through the metal connector 32, the metal connector 32 may be limited by the abutment of the stop flange 323 with the end surface of the functional assembly 20.

In some embodiments, the other end of the metal connector 32 departing from the stop flange 323 may be set with a stop slot 324. The stop slot 324 may run through the mounting surface 321 and the anti-rotation surface 322 along a radial direction of the metal connector 32, and two stop slots 324 may be arranged opposite to each other along the other radial direction of the metal connector 32. In this way, the metal connector 32 and the functional assembly 20 (e.g., its accommodating cavity 21) may form a snap fit, thereby avoiding the separation of the rear hanging assembly 30 and the functional assembly 20 after assembled.

In some embodiments, as shown in FIG. 33 and FIG. 30, the rear hanging assembly 30 may further include a wire 33 and an elastic covering body 34. The length of the wire 33 may be greater than the length of the metal body 31, and may extend from one end of the metal body 31 to the other end. In some embodiments, the elastic covering body 34 may be made of softer materials (such as silicone), and may cover wire 33, metal body 31 and both ends of the metal connector 32 to improve the wearing comfort of the acoustic output device 100.

In some embodiments, the elastic covering body 34 may include a threading channel (not marked in the figure), the metal body 31 and the wire 33 may pass through the threading channel. In some embodiments, to facilitate the threading, a size of the threading channel may be configured to allow the metal body 31 and the wire 33 to move in the threading channel. For example, the cross-sectional area of the threading channel may be greater than the sum of the cross-sectional areas of the metal body 31 and the wire 33.

In some embodiments, the elastic covering body 34 may cover the wires 33 through injection molding and may include a threading channel. The metal body 31 may pass through the threading channel. In some embodiments, to facilitate the threading, the size of the threading channel may be configured to allow the metal body 31 to move in the threading channel. For example, the cross-sectional area of the threading channel may be greater than the cross-sectional area of the metal body 31.

In some embodiments, as shown in FIG. 30 and FIG. 1, FIG. 2, the elastic covering body 34 may include an integrated rear hanging covering part 341 and cavity covering part 342. The rear hanging covering part 341 may be used to cover the metal body 31 and the wire 33, and the cavity covering part 342 may be used to cover at least part of an accommodating cavity 21 after the metal connector 32 and the accommodating cavity 21 are connected.

In some embodiments, the cavity covering part 342 may at least partly cover the accommodating cavity 21, and may include a first covering part 3421 near the metal connector 32 and a second covering part 3422 away from the metal connector 32. The first covering part 3421 and the second covering part 3422 may respectively be bonded and fixed, and the bonding strength between the second covering part 3422 and the accommodating cavity 21 may be greater than that between the first covering part 3421 and the accommodating cavity 21. In this way, using the difference in bonding strength, the relative locations of the cavity covering part 342 and the accommodating cavity 21 may be adjusted in the bonding process to eliminate the assembly error between the two and further improve the appearance quality of the acoustic output device 100. In some embodiments, the first covering part 3421 may be fixedly connected to the accommodating cavity 21 through a first colloid (not shown in the figure), the second covering part 3422 may be fixedly connected fixed with the accommodating cavity 21 through a first colloid (not shown in the figure), and a curing speed of the second colloid may be greater than a curing speed of the first colloid. In some embodiments, the first colloid may be silicone colloid or other soft colloids, while the second colloid may be colloids such as instantaneous adhesive, structural adhesive, PUR adhesive, etc. The second colloid may be mainly applied to the end of the second covering part 3422 departing from the end of the first covering part 3421 to prefix them.

Based on the above descriptions, the accommodating cavity 21 may be plastic parts, and the elastic covering body 34 may be silicone parts. Due to the large differences between the materials of the two, undesirable phenomena like degumming may appear easily after direct bonding between the two. For this reason, as shown in FIG. 30, the second covering part 3422 may be internally injection-molded with a transition piece 3423, the bonding strength between the transition piece 3423 and the accommodating cavity 21 may be greater than that between the second covering part 3422 and the accommodating cavity 21, so that it may be bonded with the accommodating cavity 21 instead of the second covering part 3422. The transition connector 3423 may be metal parts or plastic parts; and when the transition piece 3423 is a plastic part, its material may be the same as the accommodating cavity 21.

In some embodiments, as shown in FIG. 30 and FIG. 27, for the cavity covering part 342, the first covering part 3421 may be configured like a sleeve, and the second covering part 3422 may be configured like a strip. In this way, after the metal connector 32 is connected to the accommodating cavity 21, and the cavity covering part 342 covers the accommodating cavity 21, the first covering part 3421 may be sleeved on a periphery of a main cavity body 211 and a cover plate 212, and the second covering part 3422 may cover the cover plate 212, and may further cover the gap between the cover plate 212 and the main cavity body 211, so that the waterproof performance of the acoustic output device 100 may be improved.

In some embodiments, as shown in FIG. 30 and FIG. 28, avoidance holes 3424 corresponding to the key holes 2123 may be configured on the second covering part 3422, so that the middle convex part 2411 of each soft key 241 may be exposed via the avoidance hole 3424, and further connected to a hard key 2442. The edge connection part 2412 of each soft key 241 may be located between the main cover body 2121 and the second covering part 3422, and a pressing part 2421 may be located on the side of the second covering part 3422 departing from the main cover body 2121. In this way, the waterproof performance of the acoustic output device 100 may be improved.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms “one embodiment,” “an embodiment,” and/or “some embodiments” mean that a particular feature, structure, or characteristic described in connection with the embodiment is included in at least one embodiment of the present disclosure. Therefore, it is emphasized and should be appreciated that two or more references to “an embodiment” or “one embodiment” or “an alternative embodiment” in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes combined together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic output device, comprising:

a speaker assembly, configured to convert audio signals into vibration signals;

a functional assembly electrically connected to the speaker assembly; and a supporting structure, configured to be connected to the speaker assembly and the functional assembly, wherein the supporting structure includes a metal body therein, and the metal body is electrically connected to the functional assembly, wherein the functional assembly includes two sub-functional assemblies, wherein the supporting structure includes an ear hook assembly and a rear hook assembly, the ear hook assembly is connected between the speaker assembly and the functional assembly, and the rear hook assembly is connected between the two sub-functional assemblies; and the metal body is an antenna of the acoustics output device, the metal body includes a first sub-antenna and a second sub-antenna, the first sub-antenna and the second sub-antenna are respectively electrically connected to a sub-functional assembly of the two sub-functional assemblies, and the first sub-antenna and the second sub-antenna are spaced apart.

2. The acoustic output device of claim 1, wherein a metal body is positioned within the rear hook assembly, and at least one end of the metal body is electrically connected to the functional assembly.

3. The acoustic output device of claim 2, two ends of the metal body are respectively electrically connected to the two sub-functional assemblies.

4. The acoustic output device of claim 2, wherein a Length of the metal body is greater than or equal to a Length threshold.

5. The acoustic output device of claim 1, wherein a metal body is positioned inside the ear hook assembly, and one end of the metal body is electrically connected to the functional assembly.

6. The acoustic output device of claim 1, wherein the supporting structure is connected between the speaker assembly and the functional assembly to form the ear hook assembly of the acoustic output device, and the ear hook assembly is configured to straddle and be supported on an ear of a user when the user is wearing the acoustic output device.

7. The acoustic output device of claim 1, wherein an end of the metal body is covered with a welding metal layer, and the metal body is welded on a main control circuit board of the functional assembly through the welding metal layer.

8. The acoustic output device of claim 7, wherein the welding metal layer is a zinc plating layer.

9. The acoustic output device of claim 1, wherein the rear hook assembly includes the metal body and metal connectors, and the metal connectors are respectively sleeved and fixed on two ends of the metal body.

10. The acoustic output device of claim 9, wherein a deformation of a first part of the metal body located inside a metal connector relative to a second part of the metal body located outside the metal connector is less than or equal to a first deformation threshold.

11. The acoustic output device of claim 10, wherein the deformation is determined based on a first cross-sectional dimension $\varphi 1$ and a second cross-sectional dimension $\varphi 2$, wherein the first cross-sectional dimension $\varphi 1$ is a dimension of a cross-section of the first part along a direction that passes a geometric center of the cross-section of the first part, and the second cross-sectional dimension $\varphi 2$ is a dimension of a cross-section of the second part along the same direction that passes a geometric center of the cross-section of the second part.

12. The acoustic output device of claim 10, wherein an outer surface of the first part includes a knurled structure.

13. The acoustic output device of claim 10, wherein the metal connector includes an installation hole, the metal body is inserted into the installation hole, and the metal body is connected to the metal connector by welding.

14. The acoustic output device of claim 9, wherein the metal connector is connected to the metal body by die casting.

15. The acoustic output device of claim 9, wherein the rear hook assembly further includes an elastic covering body, the elastic covering body is configured to cover the metal body and further form a cavity covering part, at least part of the cavity covering part is configured to cover an accommodating cavity, and the accommodating cavity is configured to accommodate a battery or the main control circuit board.

16. The acoustic output device of claim 15, wherein the rear hook assembly further includes a wire, a Length of the wire is greater than a Length of the metal body, and the wire extends from an end of the metal body to the other end of the metal body;

the elastic covering body covers the wire by injection molding and includes a threading channel, the metal body passes through the threading channel, and a size of the threading channel is configured to allow the metal body to move in the threading channel; or, the elastic covering body includes a threading channel, the metal body and the wire pass through the threading channel, and the size of the threading channel is configured to allow the metal body and the wire to move in the threading channel.

17. The acoustic output device of claim 15, wherein the cavity covering part includes a first covering part close to the metal connector and a second covering part departing from the metal connector, the first cover part and the second cover part are respectively bonded to and fixed with the accommodating cavity, and a bonding strength between the second covering part and the accommodating cavity is greater than that between the first covering part and the accommodating cavity.

* * * * *